(12) United States Patent
Saito et al.

(10) Patent No.: US 7,725,698 B2
(45) Date of Patent: May 25, 2010

(54) OPERATION APPARATUS HAVING SEQUENCER CONTROLLING STATES OF PLURALITY OF OPERATION UNITS AND OPERATION APPARATUS CONTROL METHOD THEREFOR

(75) Inventors: Miyoshi Saito, Kawasaki (JP); Hisanori Fujisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 11/042,333

(22) Filed: Jan. 26, 2005

(65) Prior Publication Data
US 2006/0004999 A1    Jan. 5, 2006

(30) Foreign Application Priority Data
Jun. 30, 2004    (JP) ............................. 2004-194798

(51) Int. Cl.
    *G06F 9/32* (2006.01)
(52) U.S. Cl. ...................................... 712/245; 712/248
(58) Field of Classification Search ......... 712/233–240, 712/245, 248
    See application file for complete search history.

(56) References Cited

U.S. PATENT DOCUMENTS

| | | | | |
|---|---|---|---|---|
| 4,338,661 A | * | 7/1982 | Tredennick et al. ......... | 712/234 |
| 4,370,711 A | * | 1/1983 | Smith ......................... | 712/240 |
| 5,203,006 A | * | 4/1993 | Taniai ......................... | 711/213 |
| 5,265,213 A | * | 11/1993 | Weiser et al. ............... | 712/240 |
| 5,394,529 A | * | 2/1995 | Brown et al. ................ | 712/240 |
| 5,471,597 A | * | 11/1995 | Byers et al. ................. | 711/215 |
| 5,764,941 A | | 6/1998 | Goto et al. | |
| 5,848,269 A | * | 12/1998 | Hara .......................... | 712/239 |
| 6,108,777 A | * | 8/2000 | Puziol et al. ................ | 712/240 |
| 2001/0018733 A1 | * | 8/2001 | Fujii et al. .................... | 712/16 |

FOREIGN PATENT DOCUMENTS

| JP | 09-034703 A | 2/1997 |
|---|---|---|
| JP | 2001-312481 | 11/2001 |

OTHER PUBLICATIONS

Hauck et al., "The Chimaera Reconfigurable Functional Unit", IEEE Symposium non FPGAs for Custom Computing Machines, Apr. 16-18, 1997, pp. 87-96.*

* cited by examiner

*Primary Examiner*—William M Treat
(74) *Attorney, Agent, or Firm*—Arent Fox LLP

(57) ABSTRACT

An operation apparatus includes a plurality of operation device units; a configuration memory storing setting information provided for each predetermined state of the plurality of operation device units; and a sequencer controlling the plurality of operation device units by outputting transition destination addresses designating relevant information from configuration information comprising the setting information provided for each state of the operation device units stored in the configuration memory, wherein the sequencer carries out operation based on task information previously loaded and a change-over condition signal output from the plurality of operation device units, and generates the transition destination address to output to the configuration memory.

17 Claims, 54 Drawing Sheets

FIG.8

| OPCODE | TRANSITION DESTINATION ADDRESS |
|---|---|
| 00 | "CURRENT STATE NUMBER + 1" |
| 01 | UNCONDITIONALLY "JUMP ADDRESS OFFSET VALUE" |
| 10 | -UPON FULFILLMENT OF BRANCH CONDITION : "JUMP ADDRESS OFFSET + CHANGE-OVER CONDITION CODE" <br> -UPON UN-FULFILLMENT OF BRANCH CONDITION : "CURRENT STATE NUMBER + 1" |

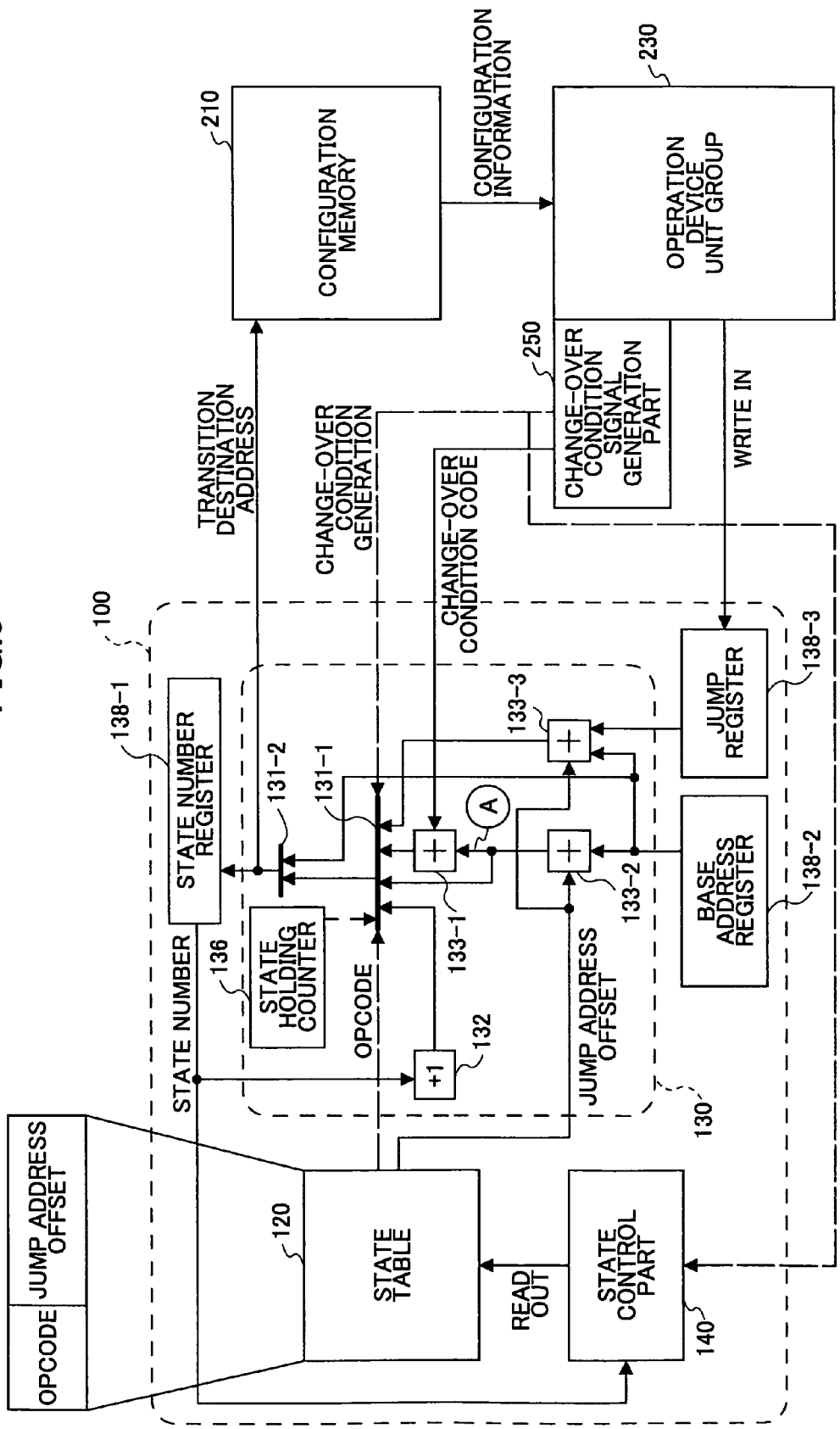

FIG.10

| OPCODE | TRANSITION DESTINATION ADDRESS DETERMINATION OPERATION |
|---|---|
| 000 | SEQUENTIAL EXECUTION MODE:<br>TRANSITION DESTINATION ADDRESS IS "STATE NUMBER + 1".<br>TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |
| 001 | UNCONDITIONAL JUMP MODE (1):<br>TRANSITION DESTINATION ADDRESS IS "JUMP ADDRESS OFFSET + BASE ADDRESS".<br>TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |
| 010 | CONDITIONAL BRANCH EXECUTION MODE (1):<br>● UPON FULFILLMENT OF BRANCH CONDITION BY OPERATION INSIDE OF OPERATION DEVICE UNIT GROUP:<br>TRANSITION DESTINATION ADDRESS IS "JUMP ADDRESS OFFSET + BASE ADDRESS + CHANGE-OVER CONDITION CODE". UPON RECEPTION OF "CHANGE-OVER CONDITION GENERATION" SIGNAL FROM STATE CODE GENERATOR, TRANSITION DESTINATION ADDRESS IS OUTPUT, AND STATE TRANSITION IS CAUSED (= CONFIGURATION CHANGE-OVER START).<br>● UPON UN-FULFILLMENT OF CONDITION:<br>TRANSITION DESTINATION ADDRESS IS "STATE NUMBER + 1".<br>TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |
| 011 | CONDITIONAL BRANCH EXECUTION MODE (2):<br>● UPON FULFILLMENT OF BRANCH CONDITION BY OPERATION INSIDE OF OPERATION DEVICE UNIT GROUP:<br>TRANSITION DESTINATION ADDRESS IS "JUMP ADDRESS OFFSET + BASE ADDRESS + JUMP REGISTER VALUE". UPON RECEPTION OF "CHANGE-OVER CONDITION GENERATION" SIGNAL FROM STATE CODE GENERATOR, TRANSITION DESTINATION ADDRESS IS OUTPUT, AND STATE TRANSITION IS CAUSED (= CONFIGURATION CHANGE-OVER START).<br>● UPON UN-FULFILLMENT OF CONDITION:<br>TRANSITION DESTINATION ADDRESS IS "STATE NUMBER + 1".<br>TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |
| 101 | UNCONDITIONAL JUMP MODE (2):<br>TRANSITION DESTINATION ADDRESS IS "JUMP ADDRESS OFFSET + BASE ADDRESS + JUMP ADDRESS REGISTER VALUE". TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |

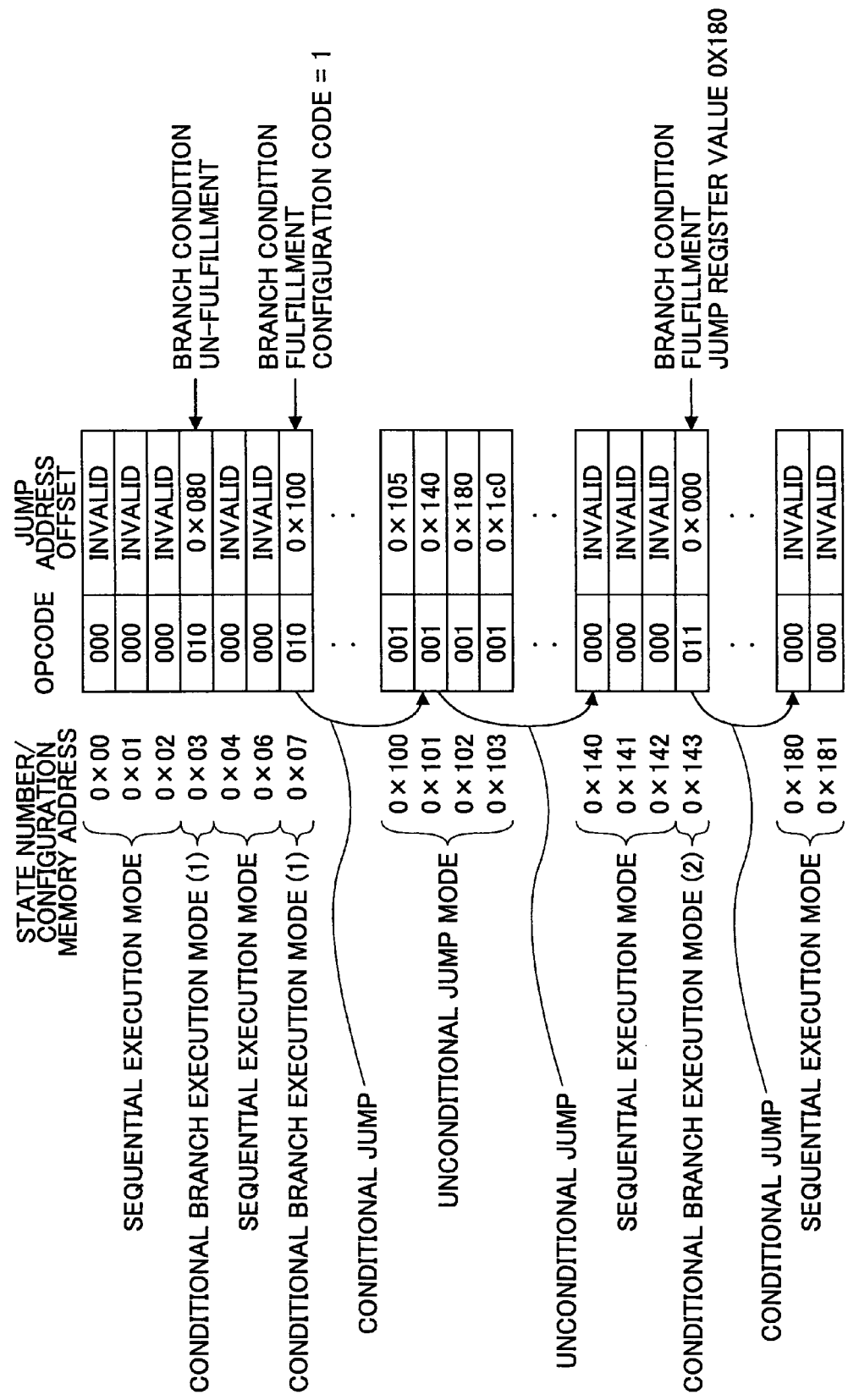

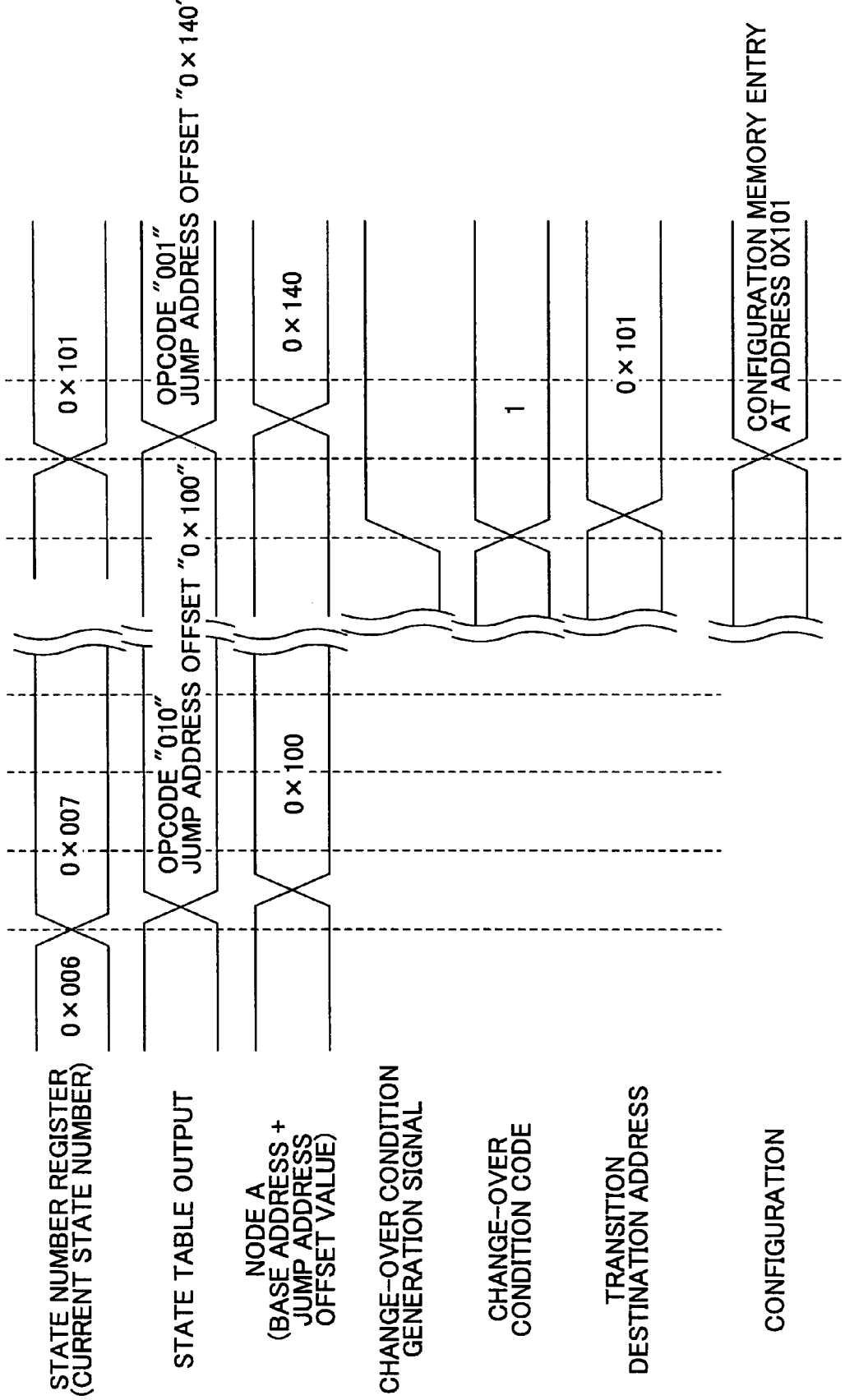

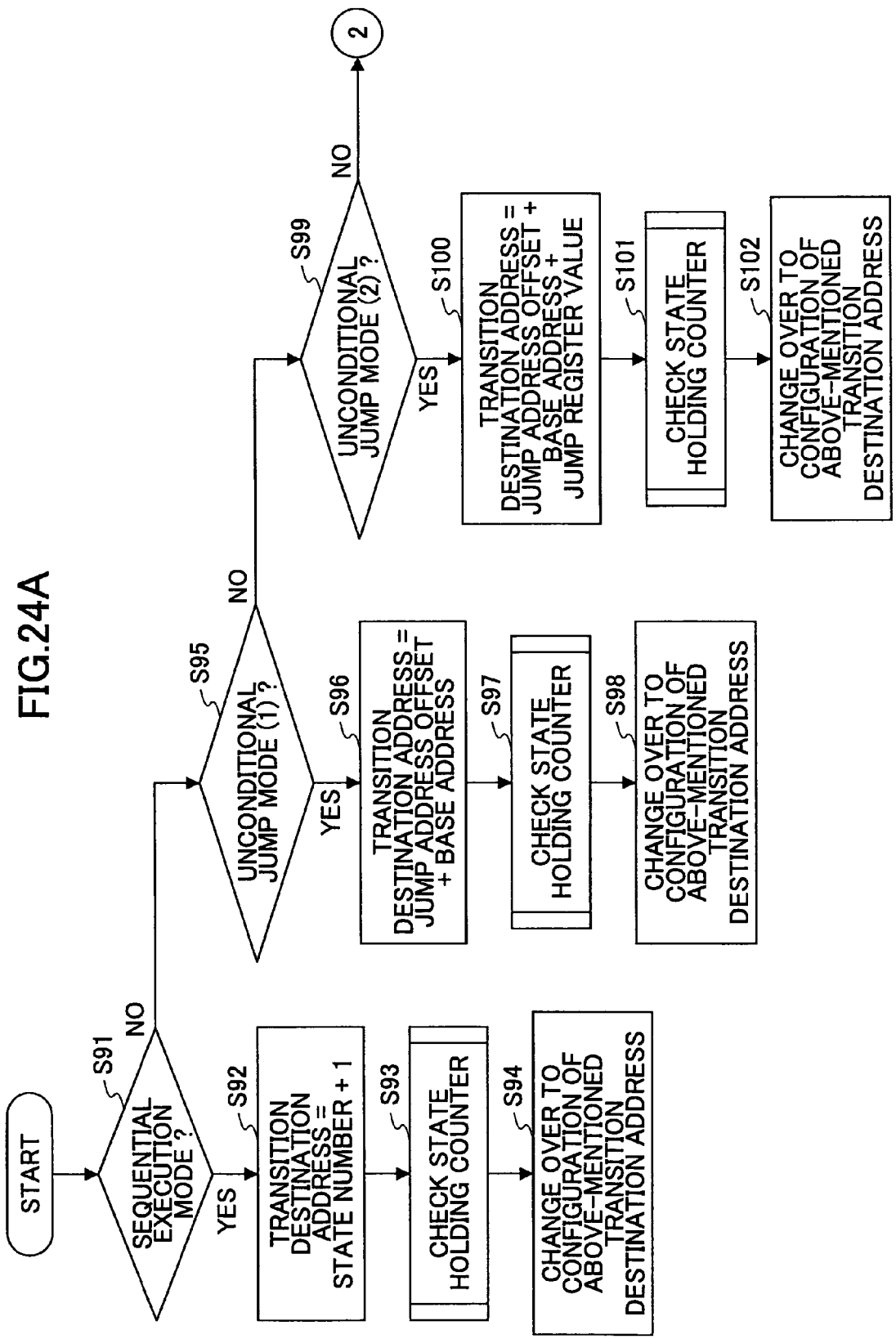

FIG.27A

| OPCODE | TRANSITION DESTINATION ADDRESS DETERMINATION OPERATION |
|---|---|
| 0000 | SEQUENTIAL EXECUTION MODE (1):<br>TRANSITION DESTINATION ADDRESS IS "STATE NUMBER + 1".<br>TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |
| 0001 | UNCONDITIONAL JUMP MODE (1):<br>TRANSITION DESTINATION ADDRESS IS "JUMP ADDRESS OFFSET + BASE ADDRESS".<br>TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |
| 0010 | CONDITIONAL BRANCH EXECUTION MODE (1):<br>●UPON FULFILLMENT OF BRANCH CONDITION BY OPERATION INSIDE OF OPERATION DEVICE UNIT GROUP:<br>TRANSITION DESTINATION ADDRESS IS "JUMP ADDRESS OFFSET + BASE ADDRESS + CHANGE-OVER CONDITION CODE". UPON RECEPTION OF "CHANGE-OVER CONDITION GENERATION" SIGNAL FROM STATE CODE GENERATOR, TRANSITION DESTINATION ADDRESS IS OUTPUT, AND STATE TRANSITION IS CAUSED (= CONFIGURATION CHANGE-OVER START).<br>●UPON UN-FULFILLMENT OF CONDITION:<br>TRANSITION DESTINATION ADDRESS IS "STATE NUMBER + 1".<br>TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |
| 0011 | CONDITIONAL BRANCH EXECUTION MODE (2):<br>●UPON FULFILLMENT OF BRANCH CONDITION BY OPERATION INSIDE OF OPERATION DEVICE UNIT GROUP:<br>TRANSITION DESTINATION ADDRESS IS "JUMP ADDRESS OFFSET + BASE ADDRESS + JUMP REGISTER VALUE". UPON RECEPTION OF "CHANGE-OVER CONDITION GENERATION" SIGNAL FROM STATE CODE GENERATOR, TRANSITION DESTINATION ADDRESS IS OUTPUT, AND STATE TRANSITION IS CAUSED (= CONFIGURATION CHANGE-OVER START).<br>●UPON UN-FULFILLMENT OF CONDITION:<br>TRANSITION DESTINATION ADDRESS IS "STATE NUMBER + 1".<br>TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |
| 0101 | UNCONDITIONAL JUMP MODE (2):<br>TRANSITION DESTINATION ADDRESS IS "JUMP ADDRESS OFFSET + BASE ADDRESS + JUMP ADDRESS REGISTER VALUE". TRANSITION DESTINATION ADDRESS IS OUTPUT WHEN STATE HOLDING COUNTER HAS ZERO, AND STATE TRANSITION IS CAUSED (= CONFIGURATION CHANGE-OVER START). |

FIG.27B

| OPCODE | TRANSITION DESTINATION ADDRESS DETERMINATION OPERATION |
|---|---|
| 1000 | SEQUENTIAL EXECUTION MODE (2): TRANSITION DESTINATION ADDRESS IS "STATE NUMBER + 1". TRANSITION DESTINATION ADDRESS IS OUTPUT UPON RECEPTION OF LOOP END SIGNAL, AND STATE TRANSITION IS CAUSED (= CONFIGURATION CHANGE-OVER START). |
| 1001 | UNCONDITIONAL JUMP MODE (3): TRANSITION DESTINATION ADDRESS IS "JUMP ADDRESS OFFSET + BASE ADDRESS". TRANSITION DESTINATION ADDRESS IS OUTPUT UPON RECEPTION OF LOOP END SIGNAL, AND STATE TRANSITION IS CAUSED (= CONFIGURATION CHANGE-OVER START). |
| 1010 | CONDITIONAL BRANCH EXECUTION MODE (3):<br>● UPON FULFILLMENT OF BRANCH CONDITION BY OPERATION INSIDE OF OPERATION DEVICE UNIT GROUP: TRANSITION DESTINATION ADDRESS IS "JUMP ADDRESS OFFSET + BASE ADDRESS + CHANGE-OVER CONDITION CODE". UPON RECEPTION OF "CHANGE-OVER CONDITION GENERATION" SIGNAL FROM STATE CODE GENERATOR, TRANSITION DESTINATION ADDRESS IS OUTPUT, AND STATE TRANSITION IS CAUSED (= CONFIGURATION CHANGE-OVER START).<br>● UPON UN-FULFILLMENT OF CONDITION: TRANSITION DESTINATION ADDRESS IS "STATE NUMBER + 1". TRANSITION DESTINATION ADDRESS IS OUTPUT UPON RECEPTION OF LOOP END SIGNAL, AND STATE TRANSITION IS CAUSED (= CONFIGURATION CHANGE-OVER START). |
| 1011 | CONDITIONAL BRANCH EXECUTION MODE (4):<br>● UPON FULFILLMENT OF BRANCH CONDITION BY OPERATION INSIDE OF OPERATION DEVICE UNIT GROUP: TRANSITION DESTINATION ADDRESS IS "JUMP ADDRESS OFFSET + BASE ADDRESS + JUMP REGISTER VALUE". UPON RECEPTION OF "CHANGE-OVER CONDITION GENERATION" SIGNAL FROM STATE CODE GENERATOR, TRANSITION DESTINATION ADDRESS IS OUTPUT, AND STATE TRANSITION IS CAUSED (= CONFIGURATION CHANGE-OVER START).<br>● UPON UN-FULFILLMENT OF CONDITION: TRANSITION DESTINATION ADDRESS IS "STATE NUMBER + 1". TRANSITION DESTINATION ADDRESS IS OUTPUT UPON RECEPTION OF LOOP END SIGNAL, AND STATE TRANSITION IS CAUSED (= CONFIGURATION CHANGE-OVER START). |
| 1101 | UNCONDITIONAL JUMP MODE (4): TRANSITION DESTINATION ADDRESS IS "JUMP ADDRESS OFFSET + BASE ADDRESS + JUMP ADDRESS REGISTER VALUE". TRANSITION DESTINATION ADDRESS IS OUTPUT UPON RECEPTION OF LOOP END SIGNAL, AND STATE TRANSITION IS CAUSED (= CONFIGURATION CHANGE-OVER START). |

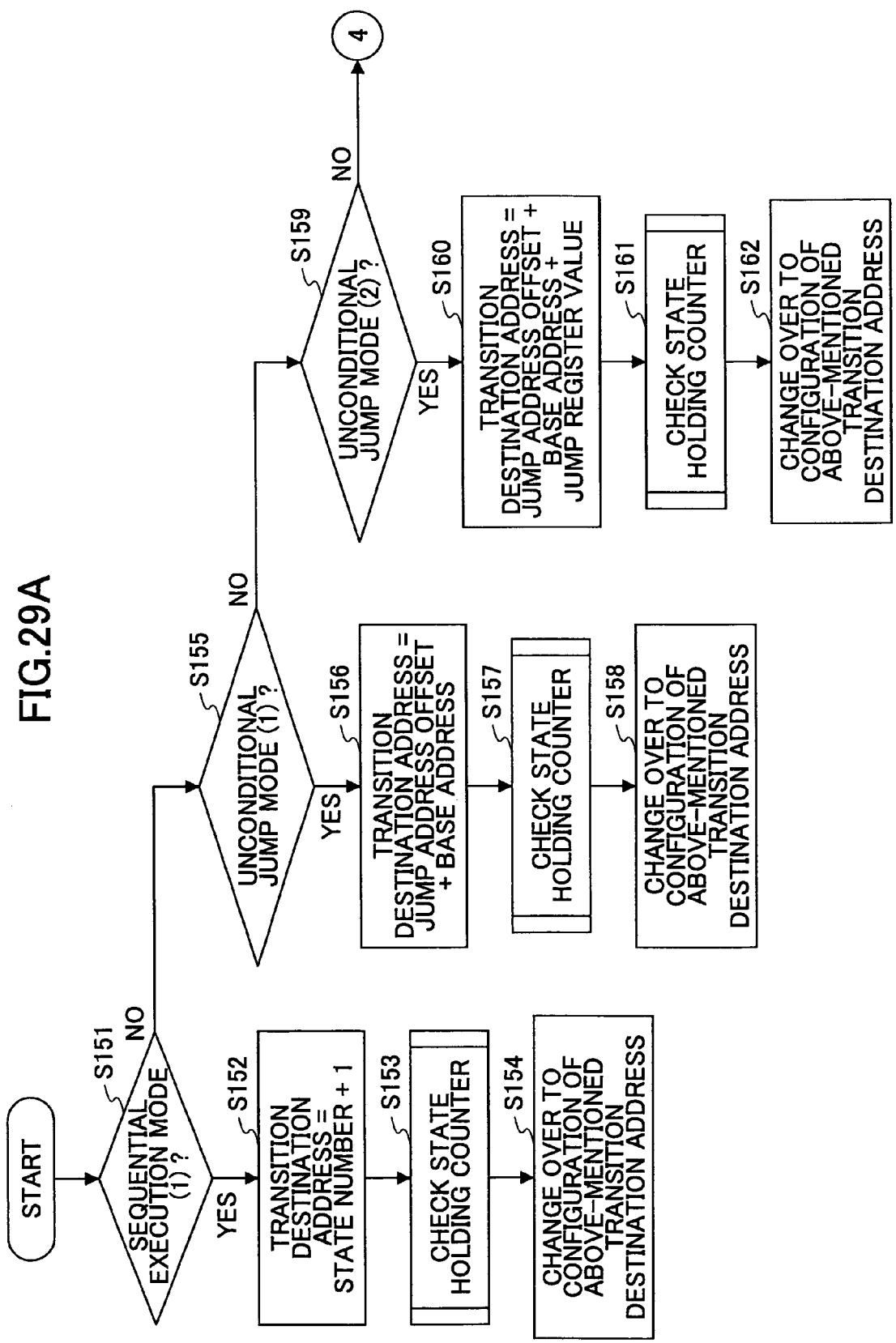

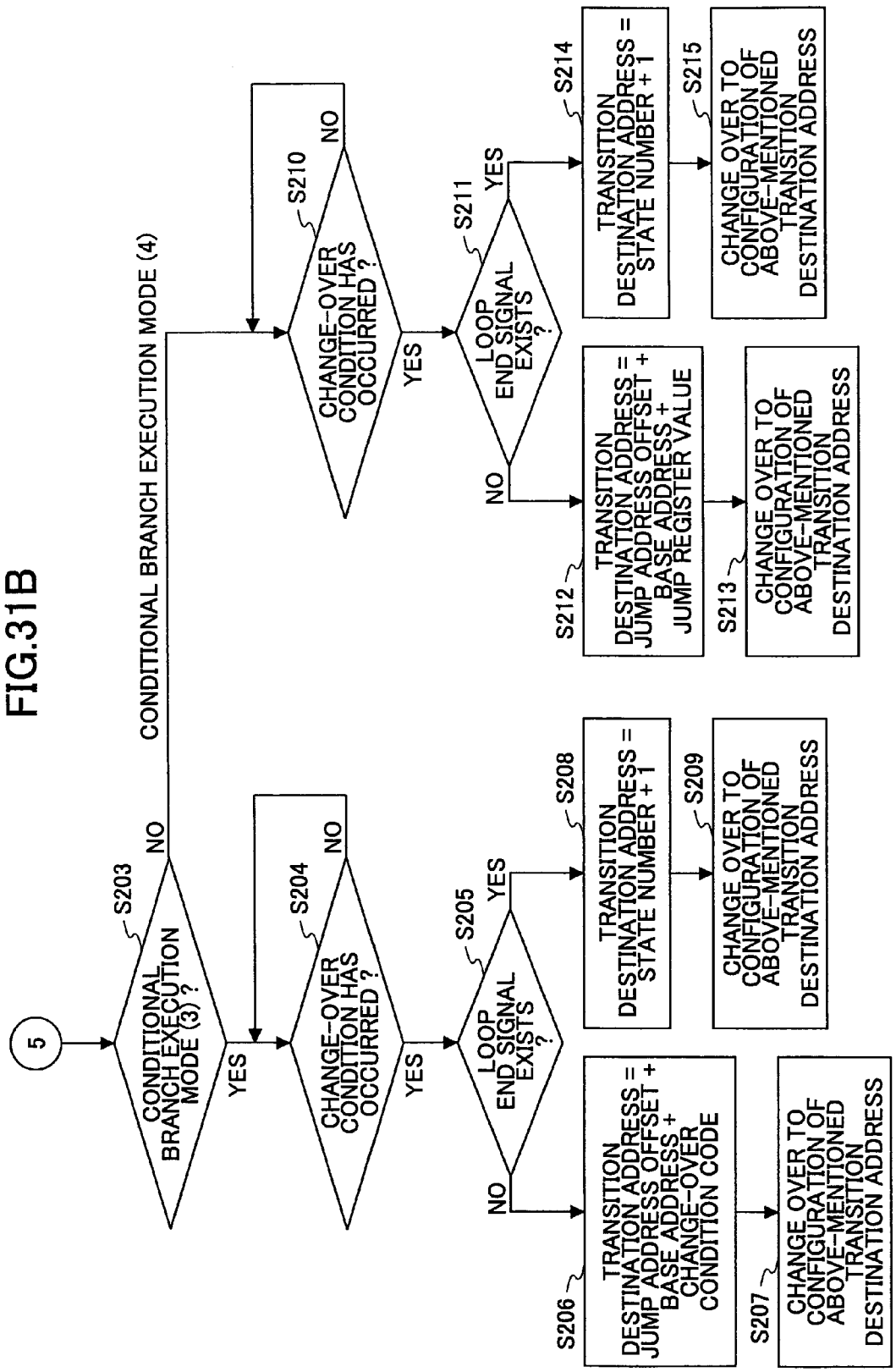

FIG.46A

| OPERATION MODE A | OPERATION MODE B | OPERATION MODE C | INPUT SELECTION INFORMATION | OUTPUT SELECTION INFORMATION | ACC MODE | IMMEDIATE VALUE A | IMMEDIATE VALUE B | CONTROL INFORMATION |

OPERATION APPARATUS HAVING SEQUENCER CONTROLLING STATES OF PLURALITY OF OPERATION UNITS AND OPERATION APPARATUS CONTROL METHOD THEREFOR

BACKGROUND OF THE INVENTION

1. Field of the Invention

The present invention relates to an operation apparatus and an operation apparatus control method, and, in particular, to a state transition destination determining method for a so-called reconfigurable operation device unit group for which a sequencer controls states of the operation device unit group so that operation processing contents carried out by the operation device unit group may be controlled, and to an operation apparatus including the reconfigurable operation device unit group carrying out the above-mentioned state transition destination determining method.

2. Description of the Related Art

As an operation apparatus including such a reconfigurable operation device unit group, Japanese Laid-open Patent Application No. 2001-312481 discloses an array-type processor. In the art disclosed there, when a subsequent state of an operation device unit group is generated, a so-called CAM (context address memory) is used, and the subsequent state of the operation device unit group is determined by an output value of the CAM.

FIG. 1 shows this array-type processor. As shown, the array-type processor 1 includes a state transition management part to which an operation control bus 2103, an event notification bus 2104 and an external event bus 2107 are electrically connected; and a data path part 2102 in which a plurality of processor elements (PE) 2105 which carry out operation processing under control from the state transition management part 2101 and a plurality of programmable switch elements (PSE) 2106 carrying out electrical connection are electrically connected together so as to form a two-dimensional array. The above-mentioned state transition management part 2101 and the data path part 2102 are separately provided. The state transition management part 2101 acts as state transition means for managing transition of the operation state.

FIG. 3 shows an example of state transition written in a state transition table memory 2202 of the above-mentioned array-type processor, as shown in FIG. 2. This example of state transition is described next. First, according to FIG. 3, when a current state number 2204 is ST-01 (see FIG. 3), a subsequent state number 2205 is unconditionally determined as ST-02. In order to describe this state transition in the state transition table 2202, an entry is created in which the contents 'current state number 2204 is ST-01; and subsequent state number 1107 is ST-02' are written in the default state transition table 1102.

Upon actual operation, since no corresponding entry exists in an event state transition table 1101 when the current state number 2204 is ST-01, an event coincidence signal 1104 is not output, while the entry having the current state number 2204 of ST-01 is made effective in the default state transition table 1102 without fail, and the subsequent state number 1107 thus becomes ST-02, which is then output as the subsequent state number 2205.

Then, when the current state number is ST-02, a subsequent state number should become any one of ST-02, ST-03, ST-05 or ST-11 according to given conditions, as shown in FIG. 3. The state should be changed to ST-03 when an event EV-10 is input. In order to achieve this state transition, an entry is created in which 'the contents current state number 2204 is ST-02; event identification code 2206 is EV-10; and subsequent state number 1106 is ST-03' are written.

Similarly, the state should be changed to ST-05 when an event EV-18 is input. In order to achieve this state transition, an entry is created in which the contents 'current state number 2204 is ST-02; event identification code 2206 is EV-18; and subsequent state number 1106 is ST-05' are written. Similarly, the state should be changed to ST-11 when an event EV-21 is input. In order to achieve this state transition, an entry is created in which the contents 'current state number 2204 is ST-02; event identification code 2206 is EV-21; and subsequent state number 1106 is ST-11' are written. These entries are created in the event state transition table 1101 shown in FIG. 2.

In the other case, the state should be changed to ST-02, as shown in FIG. 3. In order to achieve this state transition, an entry is created in the default state transition table 1102 in which 'current state number 2204 is ST-02; and subsequent state number 1107 is ST-02' are written.

According to the table description described above, when EV-21 is input to an event identification code 2206 in a condition in which the current state number 2204 is ST-02, an entry coincident with a combination of these two is made effective in the event state transition table 1101. As a result, the entry having ST-11 lead thereto is made effective, and thus, ST-11 is output as the subsequent state number 2205. At this time, since coincidence has occurred in the event state transition table 1101, an event coincidence signal 1104 is output, and as a result, a subsequent sate number ST-02 lead from ST-02 (current state number 2204) in the default state transition table 1102 is discarded.

On the other hand, in the condition in which the current state number is ST-02 and none of EV-10, EV-18 and EV-21 is input to the event identification code 2206, no event coincidence signal 1104 is output, and as a result, the subsequent sate number ST-02 lead from ST-02 (current state number 2204) in the default state transition table 1102 is output therefrom as the subsequent state number 2205.

Further, in any of the above-mentioned cases, if IRQ-01 is input to a forcible event identification code 2210, ST-01 corresponding to IRQ-01 in a forcible state transition table 1103 is output as a subsequent state number 2205 (see FIG. 2). In this case, a forcible coincidence signal 1105 is output, and thereby, the output of the event state transition table 1101 and the output of the default state transition table 1102 are discarded, and only ST-01 of the subsequent state number 1109 from the forcible state transition table 1103 is made effective.

SUMMARY OF THE INVENTION

In the above-described prior art, the CAM is utilized as described with reference to FIG. 2 for the purpose of determining a state transition destination of a processor element. However, generally speaking, such a CAM has a very large size as a memory, and as a result, it may cost much. Furthermore, generally speaking such a CAM has a lower access rate than that of an ordinary memory such as ROM or RAM. As a result, latency required for determining a subsequent state in an operation device unit group may increase problematically.

The present invention has been devised for the purpose of solving this problem, and an object of the present invention is to provide a state transition destination determination method for a reconfigurable operation device unit group in which a memory having a large size such as a CAM for which improvement of an access rate may be difficult in general is not applied for determining a state transition destination of the reconfigurable operation device unit group, but, an ordinary memory such as a RAM, ROM or such is applied for the same purpose, as well as a predetermined scheme is applied in which a transition destination address is determined by means of logical operation, so that rapid determination of state transition destination may be achieved with a relatively simple configuration. Another object of the present invention is to provide an operation apparatus which carries out this method.

According to the present invention, a sequencer which controls state transition in an operation device unit group has a function to output a transition destination address which designates information from configuration information which is provided for designating a state of the operation device unit group for the purpose of carrying out a given task, and the configuration information is provided for each predetermined state of the operation device unit group. The configuration information is previously stored in a configuration memory. That is, the sequencer carries out operation, for the purpose of carrying out a given task, based on previously registered information (operation codes (which may be simply referred to as 'opcodes', hereinafter) or such stored in a state table or such) and a change-over condition signal output from the operation device unit group. Thereby, the sequencer generates the transition destination address to output to the configuration memory.

By this scheme, the transition destination address output to the configuration memory is originally generated from operation carried out based on the previously registered information and the change-over condition signal output from the operation device unit group, for the purpose of carrying out the given task. Accordingly, it is possible to avoid application of a large-size memory such as a CAM, it is possible to rapidly determine the state transition destination address, it is possible to simplify a configuration of the sequencer, it is possible to reduce the size of the entire operation apparatus, and thus, it is possible to reduce the cost therefor accordingly.

BRIEF DESCRIPTION OF THE DRAWINGS

Other objects and further features of the present invention will become more apparent from the following detailed description when read in conjunction with the accompanying drawings:

FIG. 8 illustrates functions of opcodes applied to the first embodiment of the present invention;

FIG. 9 shows a block diagram illustrating a general configuration of an operation apparatus according to a second embodiment of the present invention;

FIG. 10 illustrates functions of opcodes applied to the second embodiment of the present invention;

FIG. 11 illustrates an operation example of address transition according to an embodiment of the present invention;

FIG. 12 shows an operation time chart of a transition destination address generation part according to an embodiment of the present invention;

FIGS. 24A, 24B and 25 show flow charts of operations including application of a determined transition destination address, in addition to FIGS. 23A and 23B;

FIGS. 27A and 27B illustrate functions of opcodes applied to the fourth embodiment of the present invention;

FIGS. 29A, 29B, 30, 31A, 31B and 32 show flow charts of operations including application of a determined transition destination address, in addition to FIGS. 28A and 28B;

FIGS. 46A, 46B, 47A and 47B illustrate examples of configuration information applicable to each embodiment of the present invention.

DETAILED DESCRIPTION OF THE PREFERRED EMBODIMENTS

Figure 4:
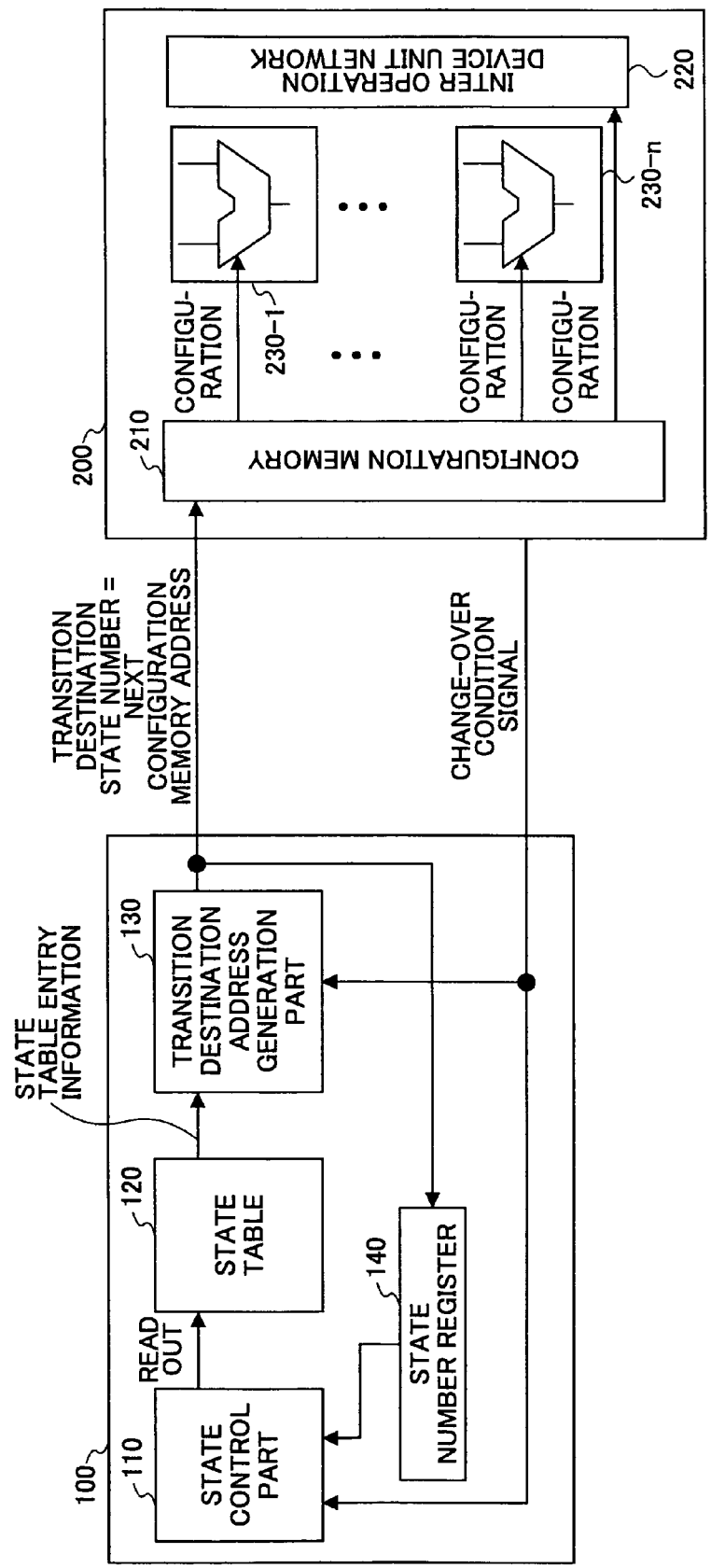
FIG. 4 shows a block diagram illustrating a basic configuration of an operation apparatus according to an embodiment of the present invention.

FIG. 4 shows a block diagram of an operation apparatus including a reconfigurable operation device unit group according to an embodiment of the present invention. As shown, this operation apparatus includes an operation device part 200 including an operation device unit group 230-1 through 230-$n$ which actually carry out given operation processing; and a sequencer 100 which carries out controlling a state of the above-mentioned operation device unit group, i.e., carrying out control such as to determine, for each operation device unit, to change a state, by which the operation device unit group is configured to carry out the predetermined operation processing. Each operation device unit 230-$i$ included in the operation device unit group 230-1 through 230-$n$ has a so-called reconfigurable configuration, a state of which is changeable in response to external instructions (referred to as configuration information), and as a result, a single operation device unit may selectively carry out various sorts of operation processing in any timing, i.e., may carry out addition/subtraction operation, multiplication/dividing operation, or such, selectively (described later with reference to FIGS. 46A through 47B).

Further, in addition to the operation device unit group 230-1 through 230-$n$, the operation device part 200 includes an inter operation device unit connection network 220 which selectively and controllably carries out electrical connection among these operation device units. Further, the operation device part 200 includes a configuration memory 210. The configuration memory 210 has the configuration information previously stored therein at each address for controlling the states of the operation device part 200 including states of the operation device unit group 230-1 through 230-n and the inter operation device unit connection network 220. In response to address instructions, i.e., instructions for a transition destination address, the configuration information stored at the relevant address is supplied to the operation device unit group 230-1 through 230-n or the inter operation device unit connection network 220 therefrom so that the relevant configuration is applied thereto actually.

A state of each of the operation device units 230-1 through 230-n is determined by the above-mentioned configuration information so that the operation device unit may carry out a predetermined type of operation processing, or may start the operation processing actually. Simultaneously, by the configuration information, electric connection states of the inter operation device unit connection network 220 among the respective operation device units 230-1 through 230-n are determined. As a result, the operation device part 200 enters a state such that the respective operation device units 230-1 through 230-n may cooperatively carry out a series of or a plurality of processes of operation processing for the purpose of achieving the given task, or further, actually initiating execution thereof. Execution of the operation processing for the purpose of achieving the task is initiated and proceeded with by the configuration information as mentioned above, or is initiated and proceeded with in response to externally given data as a trigger.

The sequencer 100 includes a state table 120 in which information for each of one or a plurality of given tasks is stored; a transition destination address generation part 130 which carries out logical operation based on the task information read out from the state table 120 and outputs a transition destination address of the configuration memory; a state number register 140 which stores a state number of a state which is currently applied in the operation device part 200 according to the configuration information output from the above-mentioned transition destination address of the configuration memory; and a state control part 110 which reads predetermined condition information from the state table 120 and supplies it to the transition destination address generation part 130. The state control part 110 reads the condition information concerning the predetermined task stored in the state table 120 based on a predetermined change-over condition signal (described later with reference to FIG. 14 and subsequent figures) and the above-mentioned state number, and supplies the thus-read condition information to the transition destination address generation part 130.

Figure 1:
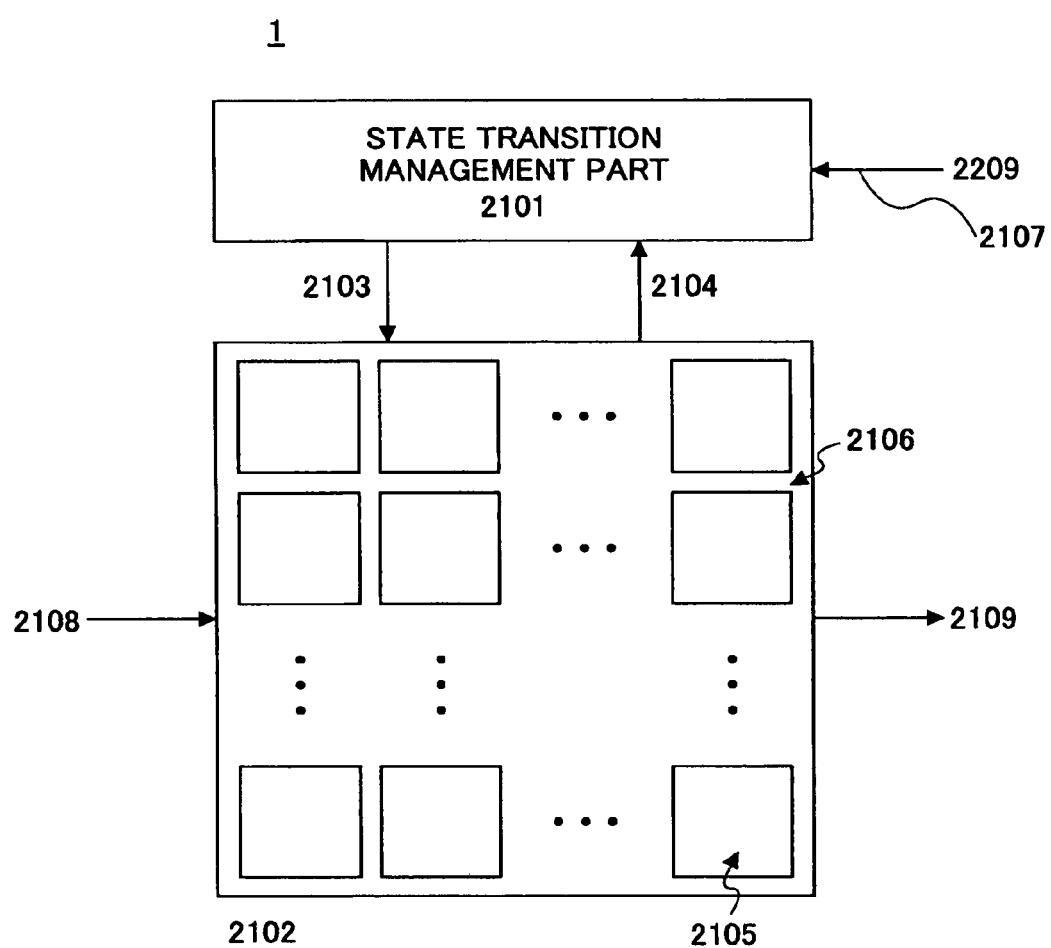
FIG. 1 shows a block diagram of an array-type processor in one example of the prior art.
Figure 2:
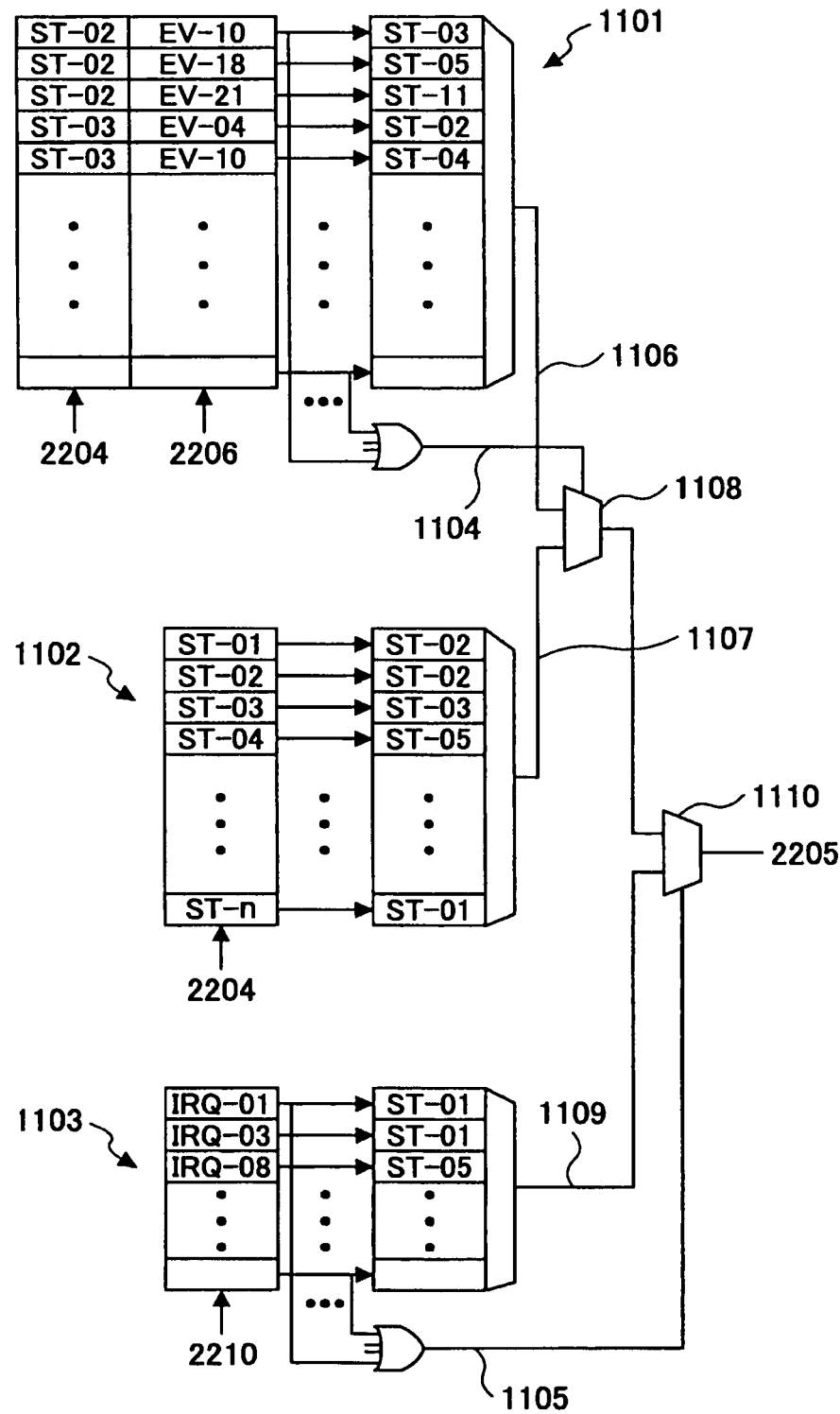
FIG. 2 shows contents set in a state transition table memory (CAM) included in a state management part shown in FIG. 1.
Figure 3:
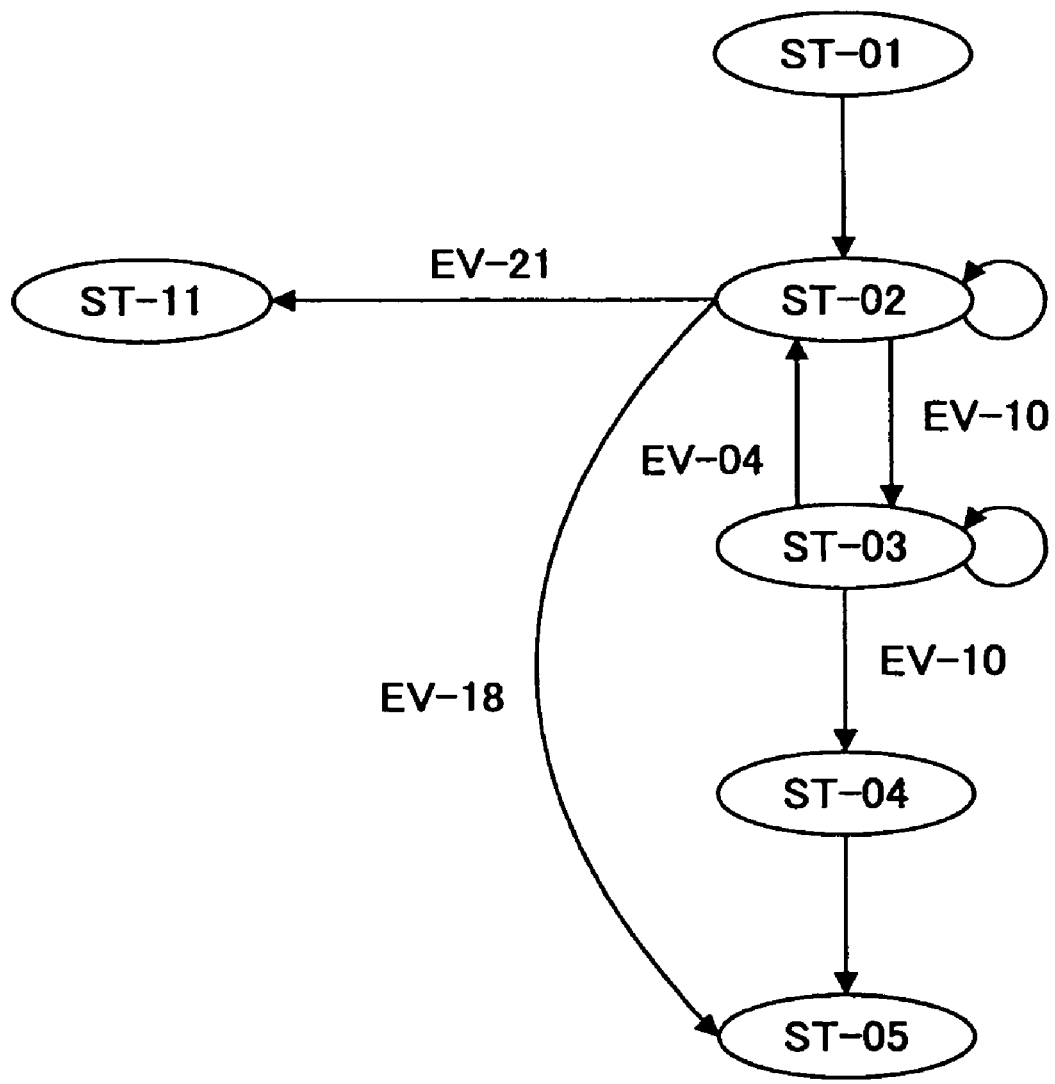
FIG. 3 shows an example of state transition set in the state transition memory shown in FIG. 2.
Figure 5:
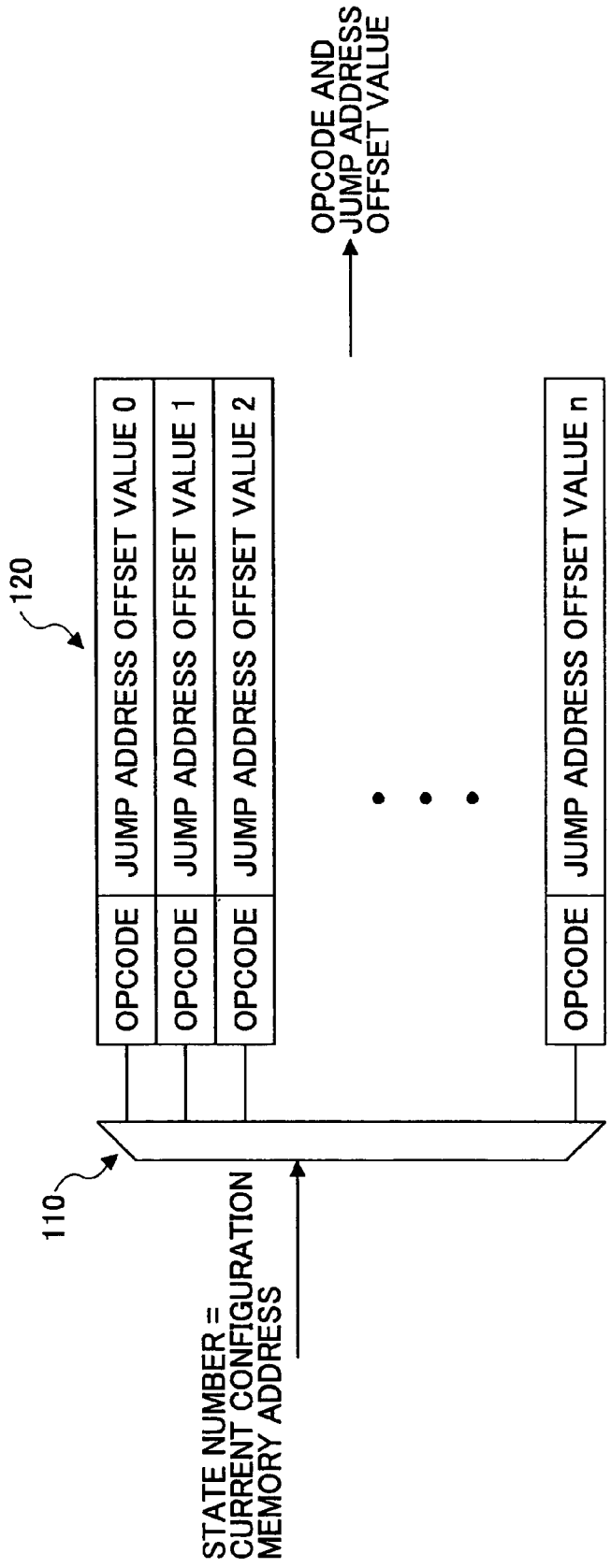
FIG. 5 illustrates a configuration of a state transition table shown in FIG. 4.
Figure 6:
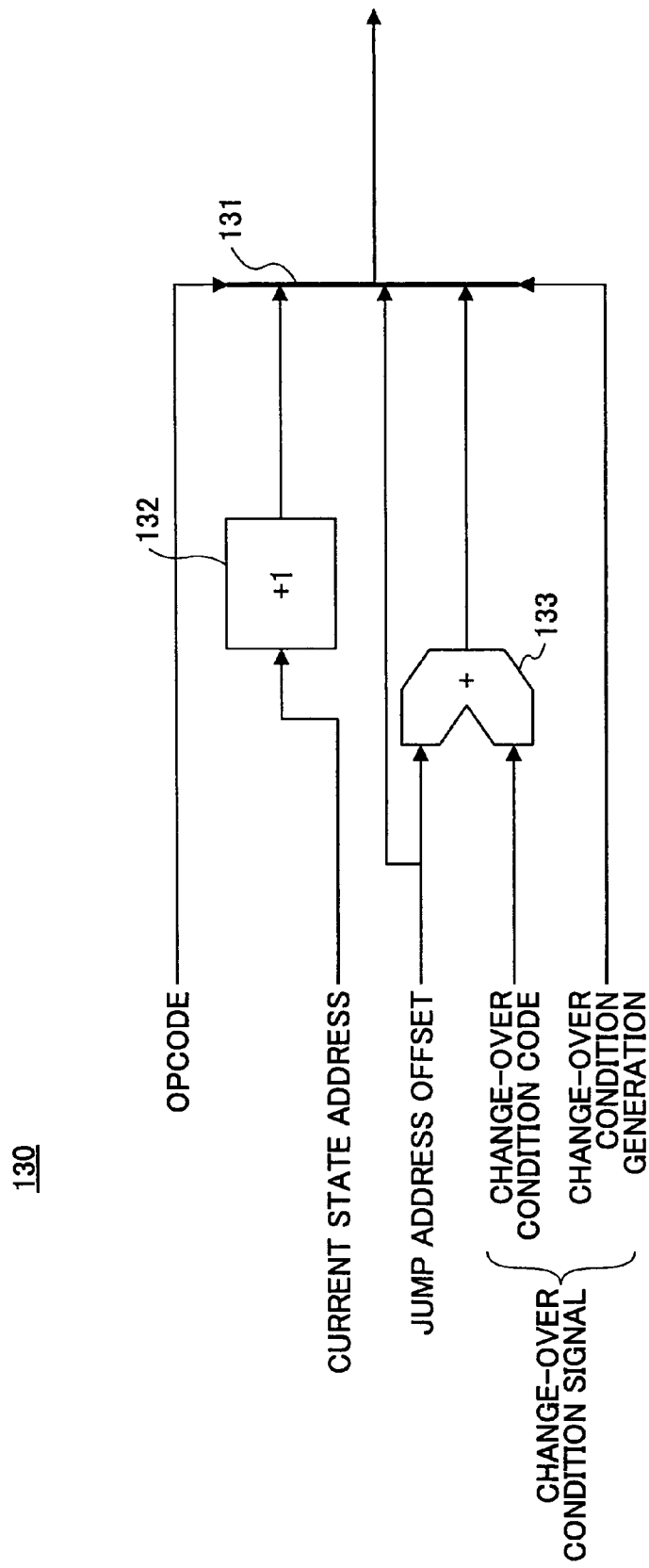
FIG. 6 illustrates a configuration of a transition destination address generation part shown in FIG. 4.

Next, operation of each part is described in further detail. FIG. 5 illustrates a configuration of the state table 120, and FIG. 6 illustrates a configuration of the transition destination address generation part 130. According to the embodiment of the present invention, different from the prior art described above with reference to FIGS. 1 through 3, a CAM is not used, but a transition destination address in the configuration memory indicating a current state, i.e., an output of the state number register 140 is used as an address given to the state table 120 for the purpose of determining a subsequent state of the operation device unit group 230-1 through 230-n. Then, according to the embodiment of the present invention, in order enable selection of a state transition destination among a plurality of ones according to the thus-given current state address, the transition destination address generation part 130 carries out logical operation so as to generate the transition destination address.

As shown in FIG. 5, each entry of the state table 120 has an opcode and a jump address offset value. The opcode means a code for designating a transition mode. Specifically, for example, the opcode designates any one of three transition modes, i.e., (a) increment; (b) unconditional jump; and (c) conditional branch. Herein, the (a) increment mode corresponds to a sequential execution mode, and, in this mode, one is added to a current state number, and thus, an immediately subsequent-number transition destination address is selected to be actually applied. The (b) unconditional jump mode is a mode in which the address is incremented by a given jump offset value unconditionally, and the thus-obtained address is applied as the transition destination address. The (c) conditional branch execution is a mode in which, when a predetermined condition is fulfilled, the same branch as that in the above-mentioned (b) mode is carried out (described later in detail with reference to FIG. 14 and subsequent figures), while, when the predetermined condition is not fulfilled, simply the address is incremented as in the above-mentioned (a) mode.

The jump address offset value indicates a base address which is applied as a base of a transition destination address when the above-mentioned conditional branch occurs (in the above-mentioned (b) or (c) mode), or indicates an unconditional jump destination address. In the above-mentioned (c) conditional branch execution, a branch destination address when the branch condition is fulfilled is calculated as a summation between the base address (jump address offset value) which is described in the relevant entry of the state transition table 120 and is applied as a base of the transition destination address, and a coded branch condition signal value (for example, a change-over condition code included in a 'change-over condition signal' shown in FIG. 4). On the other hand, when the branch condition is not fulfilled, simply, operation of 'state number+1' is carried out (sequential execution mode).

Next, operation of the state table 120 and the transition destination address generation part 130 is described in further detail with reference to FIG. 6. In the state table 120, as mentioned above, the opcode and the jump address offset value are registered in each entry. An address decoder acting as the above-mentioned state control part 110 reads a current state number (configuration memory address) from the state number register 140, and, according thereto, designates a relevant entry of the state table 120.

The state table 120 responds thereto and thus supplies the opcode and the jump address offset value from the relevant entry, to the transition destination address generation part 130. Further, the change-over condition code and the change-over condition generation signal included in the change-over condition signal supplied from the operation device part 200 are also supplied to the transition destination address generation part 130 (see FIG. 6). Furthermore, the current state number (current state address) is supplied to the transition destination address generation part 130 from the state number register 140.

The transition destination address generation part 130 receives the data, and a selector 131 shown in FIG. 6 determines which of the above-mentioned transition modes (a), (b) and (c) should be applied according to the given opcode. If the sequential execution mode (a) results therefrom, '1' is added to the current state address by an adder 132, and the result is output to the configuration memory 210 from the selector 131, as it is, as the transition destination address designating a subsequent state.

On the other hand, if the unconditional jump mode (b) results from the given opcode, the selector 131 outputs the supplied jump address offset value to the configuration memory 210 as the transition destination address designating a subsequent state.

On the other hand, if the conditional branch execution (c) results from the given opcode, an adder 133 adds the supplied jump address offset value and a value indicated by the change-over condition code included in the above-mentioned change-over condition signal together, and the selector 131 outputs this result, to the configuration memory 210 as the transition destination address designating a subsequent state. At this time, the thus-obtained transition destination address is output to the configuration memory 210 in response to reception of the change-over condition generation signal included in the change-over condition signal. This change-over condition generation signal is generated when a predetermined condition is fulfilled in a process of operation processing in the operation device part 200 (described later).

Generation of the above-mentioned change-over condition signal is described in further detail with reference to FIG. 14 and subsequent figures later.

Figure 7:
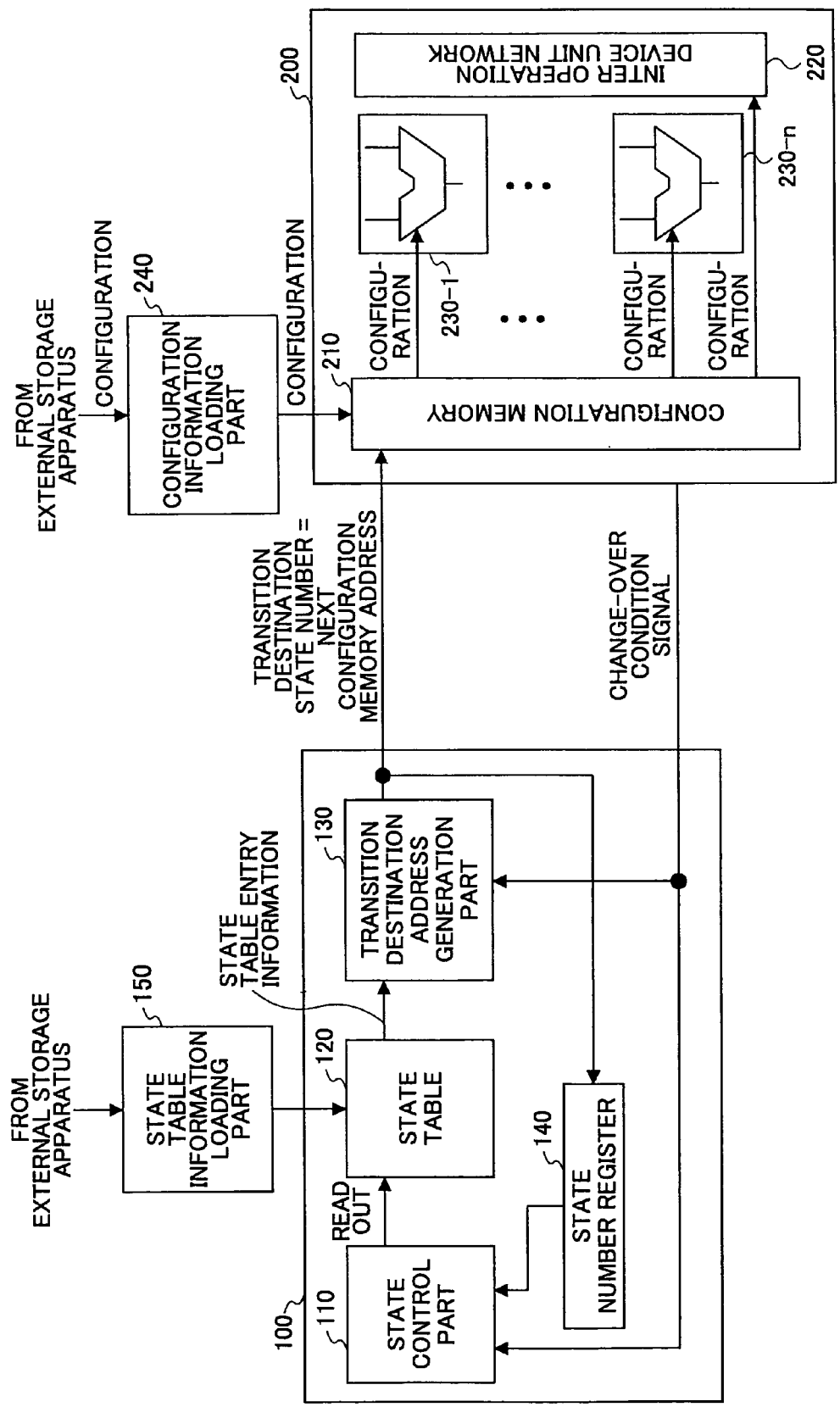
FIG. 7 shows a block diagram illustrating a general configuration of an operation apparatus according to a first embodiment of the present invention.

FIG. 7 shows a configuration of an operation apparatus according to a first embodiment of the present invention. In the configuration shown, the same reference numerals are given to the same parts as those already described above with reference to FIG. 4, and the duplicated description is omitted. Also in this example, the same as in the case of FIG. 4, a sequencer 100, an operation device unit group 230-1 through 230-n, and a configuration memory 210 are provided.

The same as the above, the sequencer 100 includes a state control part 110, a state table 120, a state number register 140 and a transition destination address generation part 130. The state table 120 has an input terminal for taking state table information (the above-mentioned task information) externally, and the state table information is loaded by a predetermined state table information loading part 150 shown.

Also, for the configuration memory 210, the configuration information may be externally loaded in via a configuration memory loading part 240.

The operation device part 200 includes a plurality of operation device units 230-1 through 230-n as well as a network 220 electrically connecting between these operation device units. Further, although indication is omitted, basic elements such as a data memory, a data I/O and so forth, which are commonly required for basic data processing are also included.

As mentioned above, operation modes of the respective operation device units 230-1 through 230-n and connection states between the operation device units are set by the configuration information. The configuration information is read out from the configuration memory 210, is supplied to the respective ones of the operation device units 230-1 through 230-n as well as the network 220, and as a result, specific operation modes of the respective operation device units and the connection states in the network 220 are settled. The reading timing and the configuration memory address from which the configuration information is read are generated by the sequencer 100 as described above (also as will be described later).

Also, from the operation device unit group, the above-mentioned change-over condition signal generated in the operation device unit group is output. As will be described later, the change-over condition signal is output when a predetermined branch condition occurs, when predetermined loop processing is completed, or such, in the operation device unit group. The configuration of the state table 120 shown in FIG. 5 also shows a configuration of the state table 120 according to the first embodiment of the present invention.

Further, FIG. 8 shows a transition destination address generation method with the use of the opcode according to the first embodiment of the present invention. Further, the configuration of the transition destination address generation part 130 shown in FIG. 6 also shows a configuration of the transition destination address generation part 130 according to the first embodiment of the present invention.

In the configuration shown in FIG. 7, the transition destination address in the configuration memory currently applied is read out from the state number register 140 by the state control part 110, and, according thereto, the opcode and the jump address offset value registered at the relevant address of the state table 120 are read. The thus-read opcode and the jump address offset value are supplied to the transition destination address generation part 130 shown in FIG. 6.

The transition address generation part 130 carries out logical operation on the given information, i.e., the transition destination address in the configuration memory currently applied (current state address), the above-mentioned jump address offset value and the change-over condition signal, according to the given instructions, and outputs the operation result to the configuration memory 210. Specifically, as shown in FIG. 8, when the opcode is 00, '1' is added to the current state address, and thus, the subsequent address is output. When the opcode is 01, a value of a branch destination address according to the jump address offset value is output unconditionally. When the opcode is 11, as described above, a value of a branch destination address obtained from adding the change-over condition code value to the jump adders offset value is output when the predetermined branch condition is fulfilled, while, the same as in the case where the opcode is 00, merely '1' is added to the current state address and the result is output (corresponding to the sequential execution mode) when the above-mentioned predetermined branch condition is not fulfilled.

FIG. 9 shows a configuration according to a second embodiment of the present invention. FIG. 9 shows in particular details of a transition destination address generation part 130. According to the second embodiment, in addition to the configuration of the above-mentioned first embodiment, a base address register 138-2 and a jump register 138-3 are added. The base address register 138-2 holds a base address for a currently executed application. Accordingly, even when execution of an application is interrupted as a result of switching being made as to which application should be currently executed temporarily, the application can be re-started from a state at which the interruption occurred after the interruption has been cancelled, as a result of execution being re-started from an address held by the base address register.

The jump register 138-3 is a register in which a result of operation processing carried out by the operation device unit group 230 is written, and therewith, it becomes possible to designate a jump destination dynamically according to the result of the operation processing. Further, the jump register 138-3 may have the above-mentioned change-over condition code value written therein.

FIG. 10 shows an operation example for each opcode according to the second embodiment. When the opcode is 000, a transition destination address to be applied is obtained from adding '1' to the current state address (current state number). At this time, a value in the jump address offset field of the state table is ignored.

When the opcode is 001, an unconditional jump mode (1) is applied. In this case, a transition destination applied is obtained from adding the above-mentioned base address value, i.e., the value of the base address register to the jump address offset value in the state table 120.

When the opcode is 010, a conditional branch execution (1) is applied. In this case, when a predetermined branch condition is fulfilled during processing in the operation device unit group, this information is sent to the above-mentioned change-over condition signal generation part 250. The change-over condition signal generation part 250 has operation, to carry out, set therein, for each predetermined configuration, as will be described later, and based on the set information, generates the above-mentioned change-over condition code signal and change-over condition generation signal. Then, the change-over condition generation signal is sent to the state control part 140 and the transition destination address generation part 130, and also, the change-over condition code is sent therefrom to the transition destination address generation part 130. The transition destination address generation part 130 carries out operation of 'base address+jump address offset+change-over condition code', and thus, calculates a transition destination address to be actually applied. When the branch condition is not met, the same operation as that in the case of the opcode of 000 is carried out (corresponding to the sequential execution mode).

When the opcode is 011, a conditional branch execution (2) is applied. In this case, when a predetermined branch condition is fulfilled during processing in the operation device unit group, this information is sent to the above-mentioned change-over configuration signal generation part 250. As mentioned above, the change-over condition signal generation part 250 has operation, to carry out, set therein, for each predetermined configuration, and based on the set information, generates the change-over condition generation signal. Then, the change-over condition generation signal is sent to the state control part 140 and the transition destination address generation part 130. The transition destination address generation part 130 carries out operation of 'base address+jump address offset+jump register value', and thus, calculates a transition destination address to be actually applied. The jump register value is written in the jump register 138-3 before the branch condition is met or at the same time the branch condition is met, from the side of the operation device unit. When the branch condition is not met, the same operation as that in the case of the opcode of 000 is carried out (corresponding to the sequential execution mode).

When the opcode is 101, an unconditional jump mode (2) is applied. In this case, a transition destination address to be applied is obtained from adding the base address and the jump register value to the jump address offset value.

FIG. 11 shows an example of actual transition of a transition destination address determined in a process. In this example, it is assumed that the base address is 0x000. In FIG. 11, since the opcode is 000 up to the third line, the sequential execution mode is applied, and thus, an address applied to the configuration memory is incremented one by one in sequence (0x00 through 0x02).

Since the opcode is 010 on line 4, the conditional branch execution mode (1) is applied, and, in this case, the predetermined condition is not met in the operation device unit group. As a result, actually the sequential execution mode is applied, the jump offset value 0x080 is ignored, and an address of 0x03 is applied to the configuration memory.

After that, since the opcode is 000 on lines 5 and 6, the sequential execution mode is applied, and as a result, an address applied to the configuration memory is incremented one by one in sequence 0x04 through 0x05. Then, the opcode 010 is given by the state table 120. In this case, the predetermined condition is met in the operation device unit group, and as a result, a transition destination address to be applied is obtained from the operation of 'base address+change-over condition code+jump address offset'. Actually, since '0+1+100'=101, an address of 0x101 is applied (in FIG. 11, see 'CONDITIONAL JUMP'). In this case, any one of addresses 0x100 through 0x103 may be selected according to the 'change-over condition code' given.

Then, the opcode 001 is given, the unconditional jump mode is thus applied, and as a result, a transition destination address to be applied is obtained from operation 'jump address offset+base addresses'. Actually, since 0x140+0=0x140, transition is made for an address of 0x140. Then, the opcode 000 is given, the sequential execution mode is applied, and as a result, an address applied is changed in sequence from 0x140 through 0x143. After that, the opcode 011 is given.

Thereby, the conditional branch execution mode (2) is applied. In this case, a transition destination address is obtained from operation 'jump address offset+base address+jump register value'. In this case, it is assumed that the predetermined condition is met in the operation device unit group, and the jump register (138-3) value at this time is 0x180. As a result, 0x000+0+0x180=0x180. As a result, transition is made for an address 0x180. Then, the sequential execution mode is applied since the opcode is 000, and as a result, an address is changed in sequence from 0x180 to 0x181, as shown in FIG. 11.

FIG. 12 shows one example of an operation flow chart of the above-mentioned transition destination address generation part 130. This corresponds to the example shown in FIG. 11, and shows operation from a time at which the value in the state number register 140, i.e., the current state number is changed from 0x006 to 0x007 (on line 1 of FIG. 12, left end). The state control part 110 reads this value, then reads the opcode 010 and the jump address offset 0x100 from the relevant entry of the state table 120, and supplies them to the transition destination address generation part 130 (on line 2 of the figure). The transition destination address generation part 130 receives them and, as described above, carries out operation thereon. As a result, it obtains a transition destination address 0x101, which is then supplied to the configuration memory 210 (on lines 3 through 6 of the figure). Then, from the configuration memory 210, the configuration information registered in the thus-supplied address is supplied to the operation device unit group 230 (on the bottom line of the figure). As a result, the state of the operation device unit group is changed to a relevant state.

During this operation, the value of the state number register 140 is updated to 0x101 by the output of the transition destination address generation part 130 (returned to the top line of FIG. 12). As a result, the opcode 001 and the jump address offset 0x140 in the relevant entry of the state table 120 are supplied to the transition destination address generation part 130 (on line 2). As a result, through the above-mentioned operation, the transition destination address 0x140 is output from the transition destination address generation part 130 (not shown).

Although the base address register 138-2 is used in the second embodiment, this is unnecessary when operation that necessary information for a plurality of applications are simultaneously set in the state table as well as in the configuration memory is not carried out. Further, although the jump address offset value is defined as one to be added to the base address, it is also possible to apply a different manner in which the jump address offset value is added to the current state address so as to obtain a transition destination address.

Figure 13:
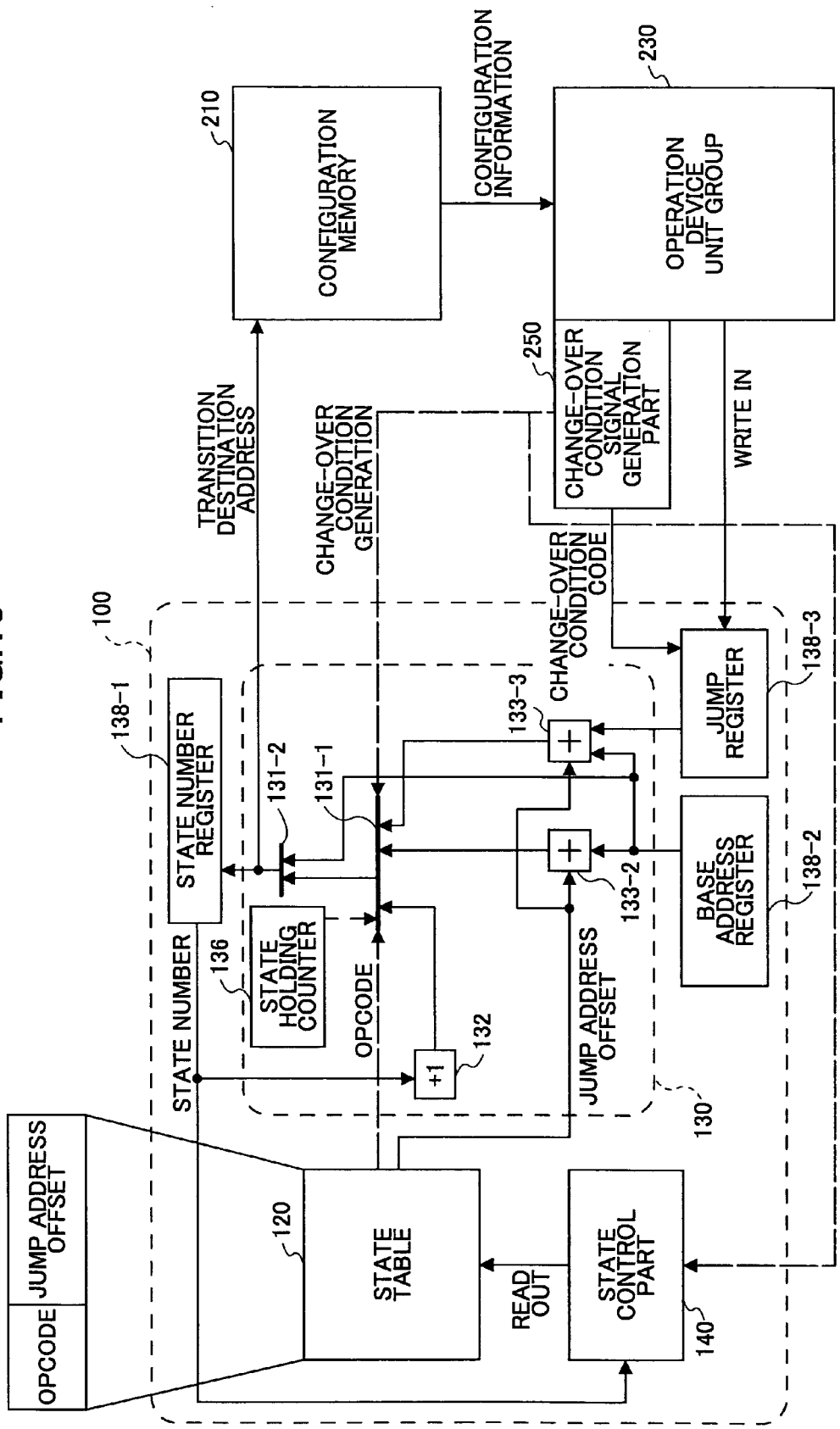
FIG. 13 shows a block diagram illustrating a general configuration of an operation apparatus according to a third embodiment of the present invention.

FIG. 13 shows a third embodiment of the present invention. In this embodiment, different from the second embodiment shown in FIG. 9, as mentioned above, the change-over condition signal is input to the jump register 138-3. An operation mode determined by the opcode in this case is a combination between the mode of the opcode 010 and the mode of the opcode 011. That is, in this case, a transition destination address is obtained from a result of operation 'base address+ jump address offset+jump register value'.

Specific configuration examples of the change-over condition signal generation part 250 in each embodiment are described with reference to FIGS. 14 through 18. FIG. 14 shows a first configuration example for branch condition occurrence detection and change-over condition code generation, applicable to each embodiment. In this example, no special operation device unit is provided for the purpose of branch condition occurrence detection and change-over condition code generation, but, by means of setting of configuration information stored in the configuration memory 210, predetermined operation device units 230-*a*, 230-*b* and 230-*c* included in the operation device unit group 230 as well as a switch (for which a switch included in the inter operation device unit network 220 may be utilized) are applied for this purpose. In this case, it is not necessary to provide a special/additional function/device in the operation device unit group 230.

Figure 15:
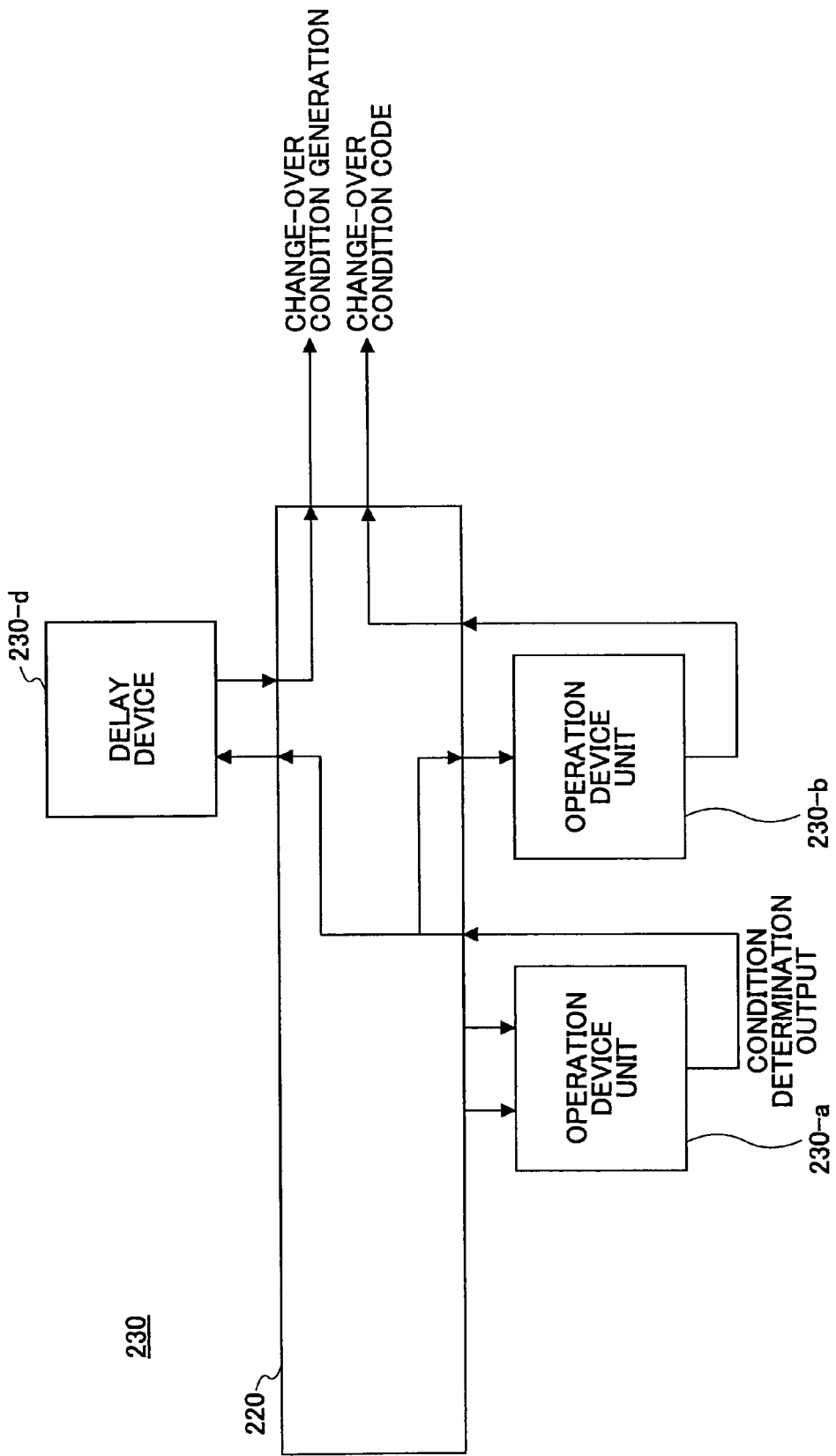

FIG. 15 shows a second configuration example for branch condition occurrence detection and change-over condition code generation applicable to each embodiment. In this example, a condition determination function is provided in a predetermined operation device unit (230-*a*), and with the use thereof, branch condition occurrence detection and change-over condition code generation are carried out. For example, a configuration such that when an operation result becomes zero, a condition determination output is supplied therefrom, is provided in the operation device unit 230-*a*.

Figure 16:
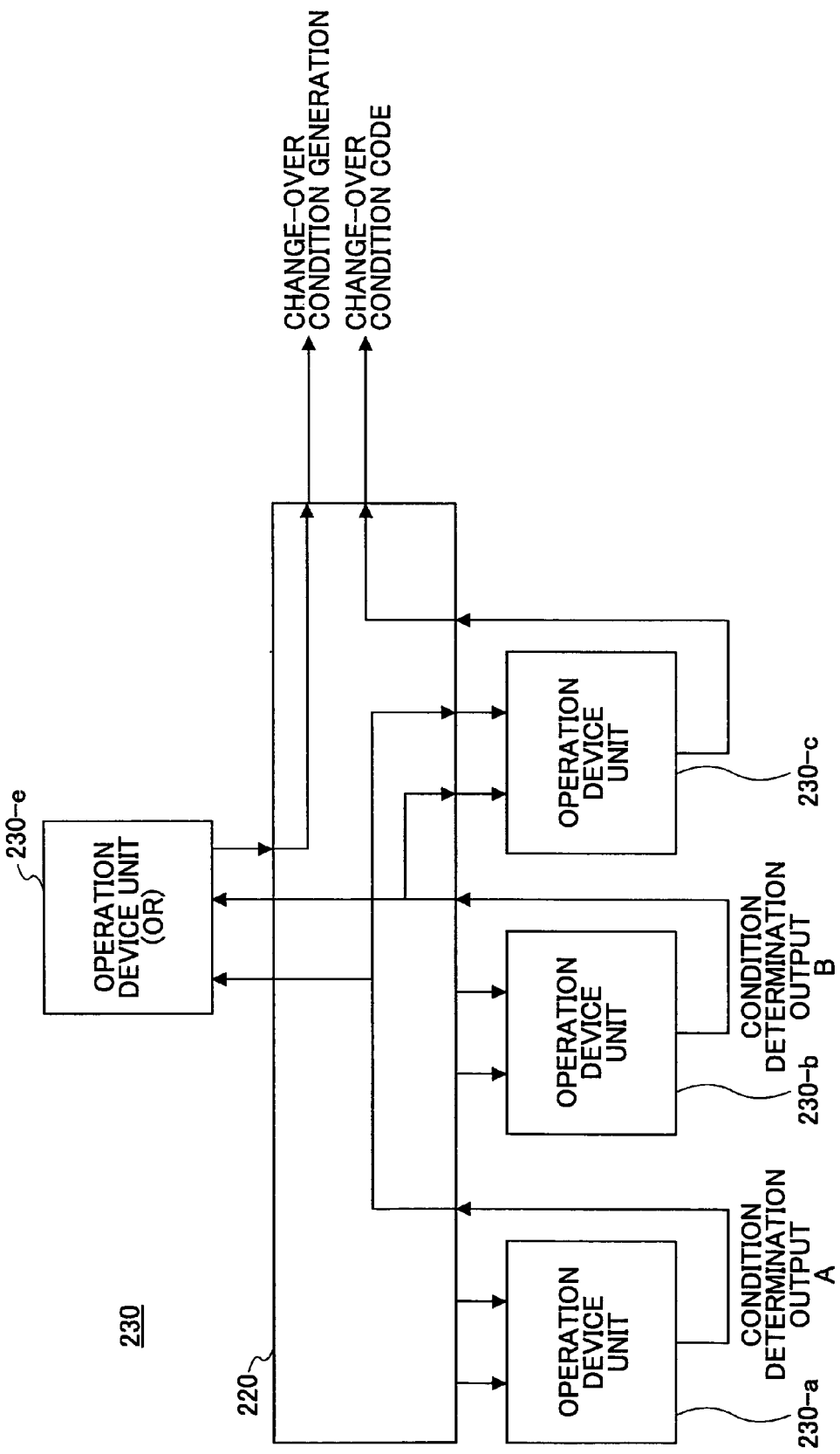

FIG. 16 shows a third configuration example for branch condition occurrence detection and change-over condition code generation applicable to each embodiment. In this example, the same as in the above-mentioned second example, a condition determination function is provided in predetermined operation device units 230-*a* and 230-*b*, and, with the use thereof, branch condition occurrence detection and change-over condition code generation are carried out. However, in this example, the condition determination outputs from the plurality of operation device units 230-*a* and 230-*b* are monitored. Then, an operation device unit 230-*c* selectively generates different change-over condition codes depending on which of the sources the relevant condition determination output has been supplied from.

Figure 17:
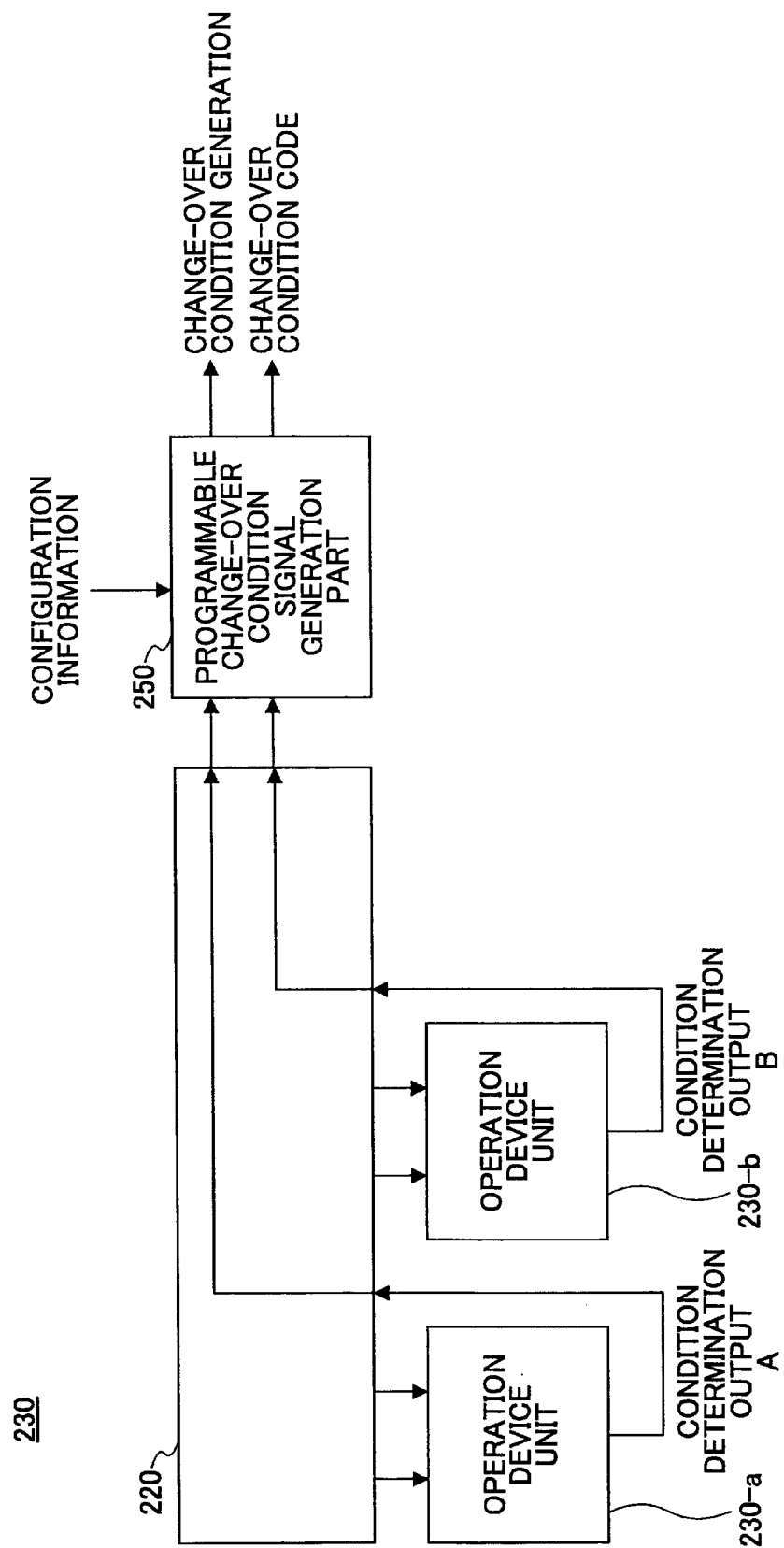

FIG. 17 shows a fourth configuration example for branch condition occurrence detection and change-over condition code generation applicable to each embodiment. In this example, different from the above-mentioned examples, a special change-over condition signal generation part 250 is provided. The change-over condition signal generation part 250 generates the change-over condition code in a manner determined according to the configuration information applied, in response to a given condition determination output A or B.

Figure 18:
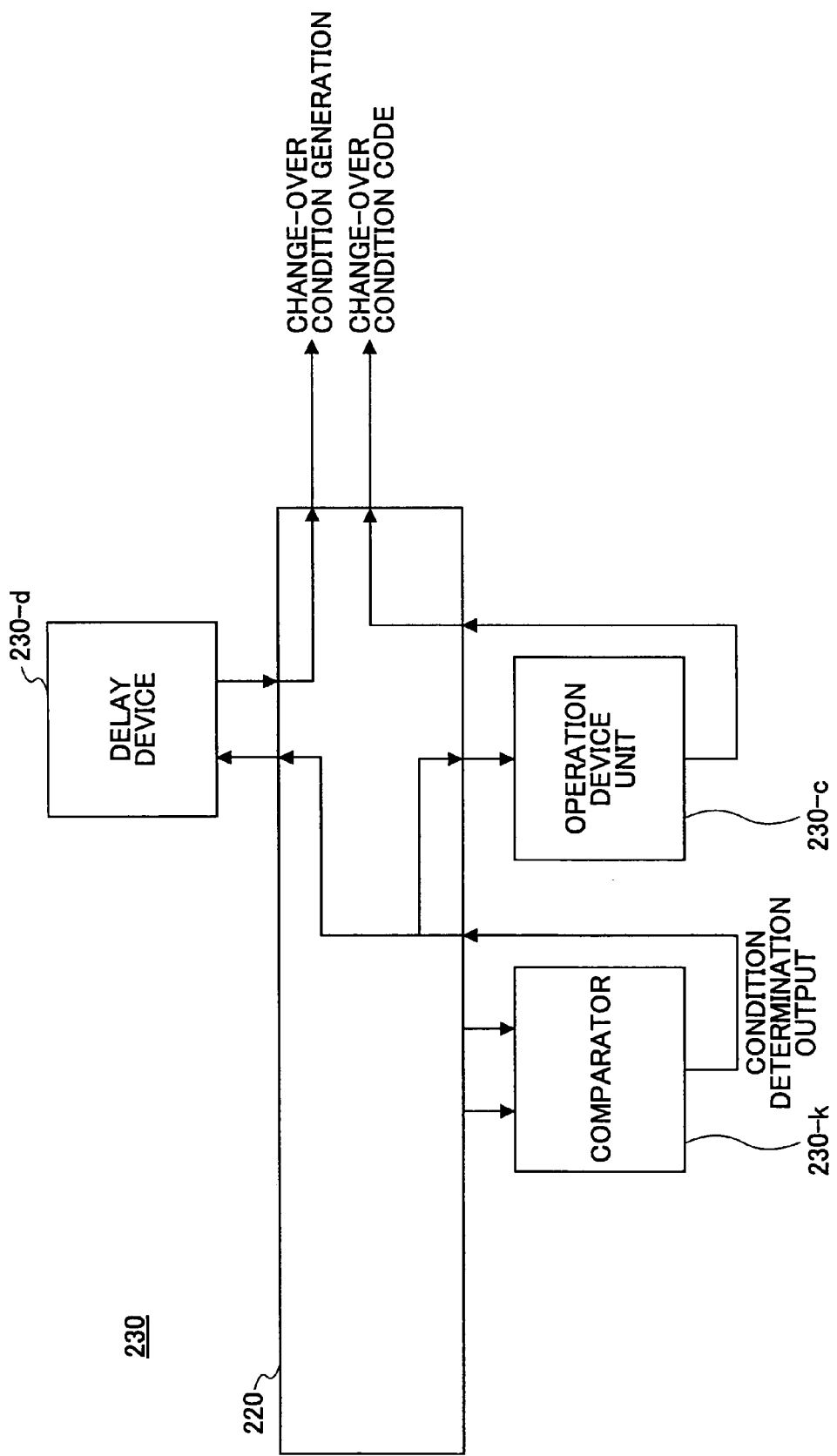

FIG. 18 shows a fifth configuration example for branch condition occurrence detection and change-over condition code generation applicable to each embodiment. In this example, a special comparator unit 230-*k* is applied for the purpose of branch condition occurrence detection. According to this example, it becomes possible to reduce the total number of required operation device units for this purpose.

Figure 19:
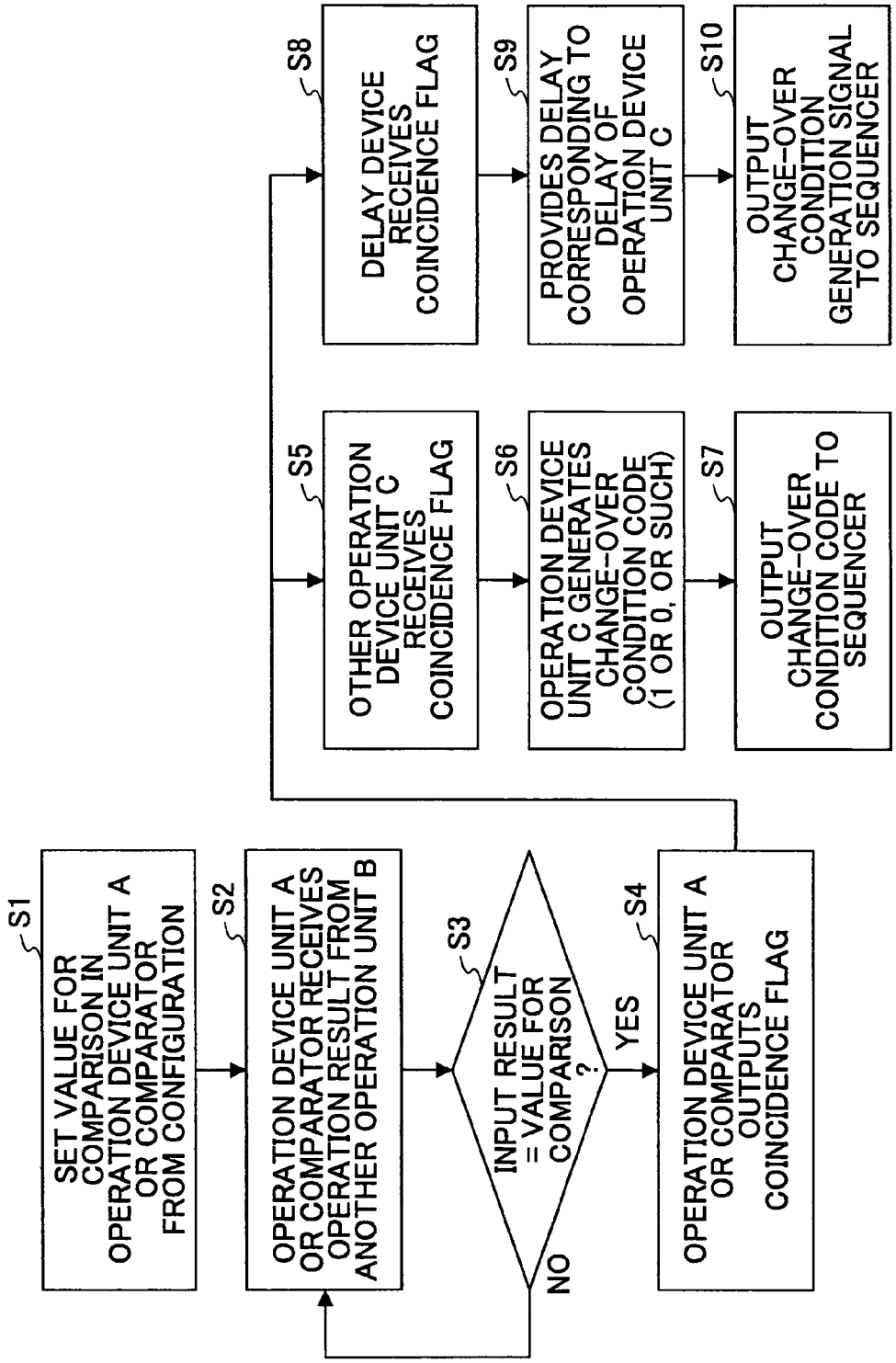
FIGS. 19 through 22 show flow charts of operations of the configuration examples shown in FIGS. 14 through 18.
Figure 20:
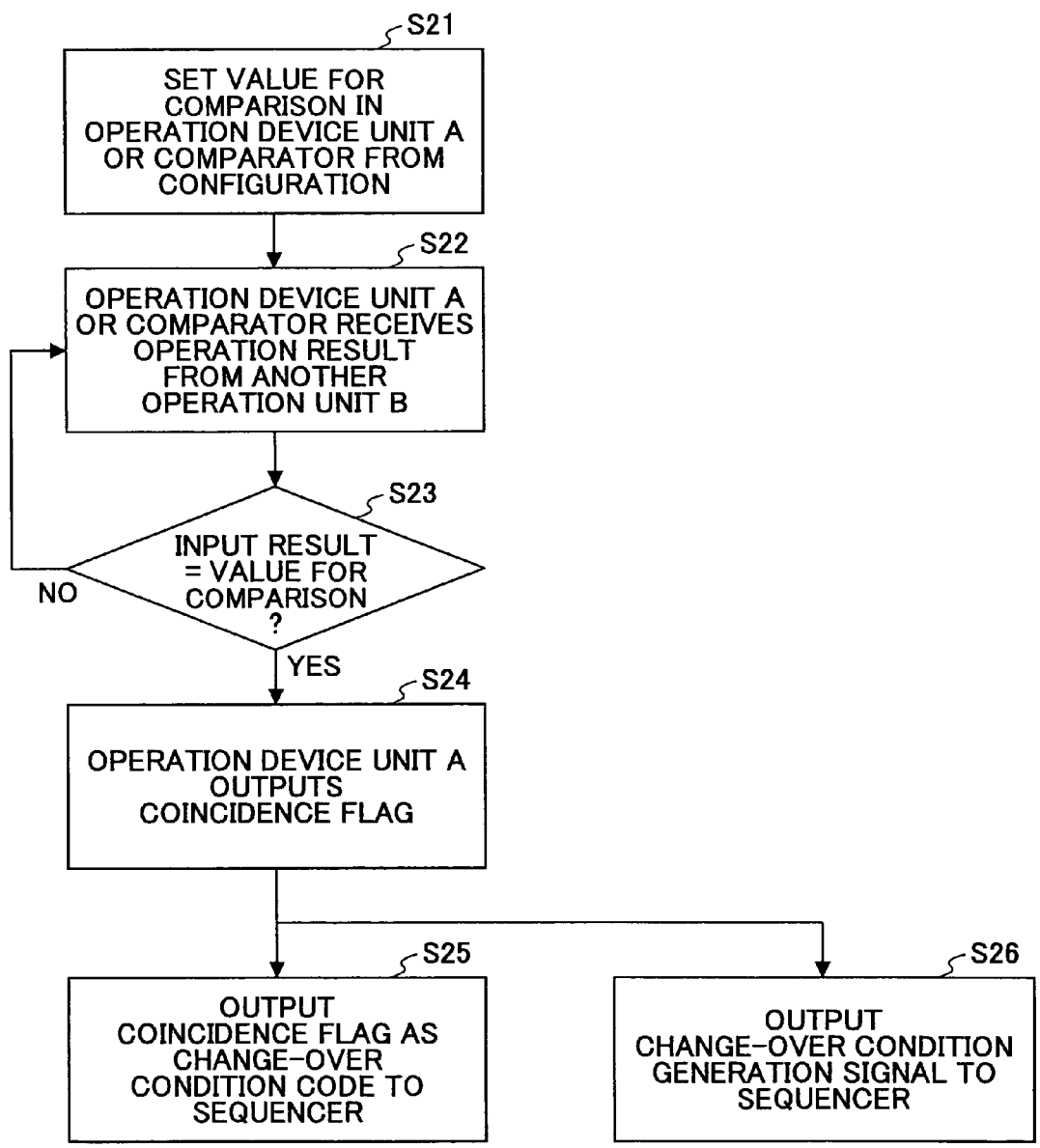

Operation flow in the configuration examples described with reference to FIGS. 14 through 18 is described next, with reference to figures. FIG. 19 shows an operation flow chart for a case where a single condition determination unit is applied, i.e., for the cases of FIGS. 14, 15 and 18. FIG. 20 shows an operation flow chart for a case where a single condition determination unit is applied and this unit also acts as a unit outputting the change-over condition code to the sequencer 100.

Figure 14:
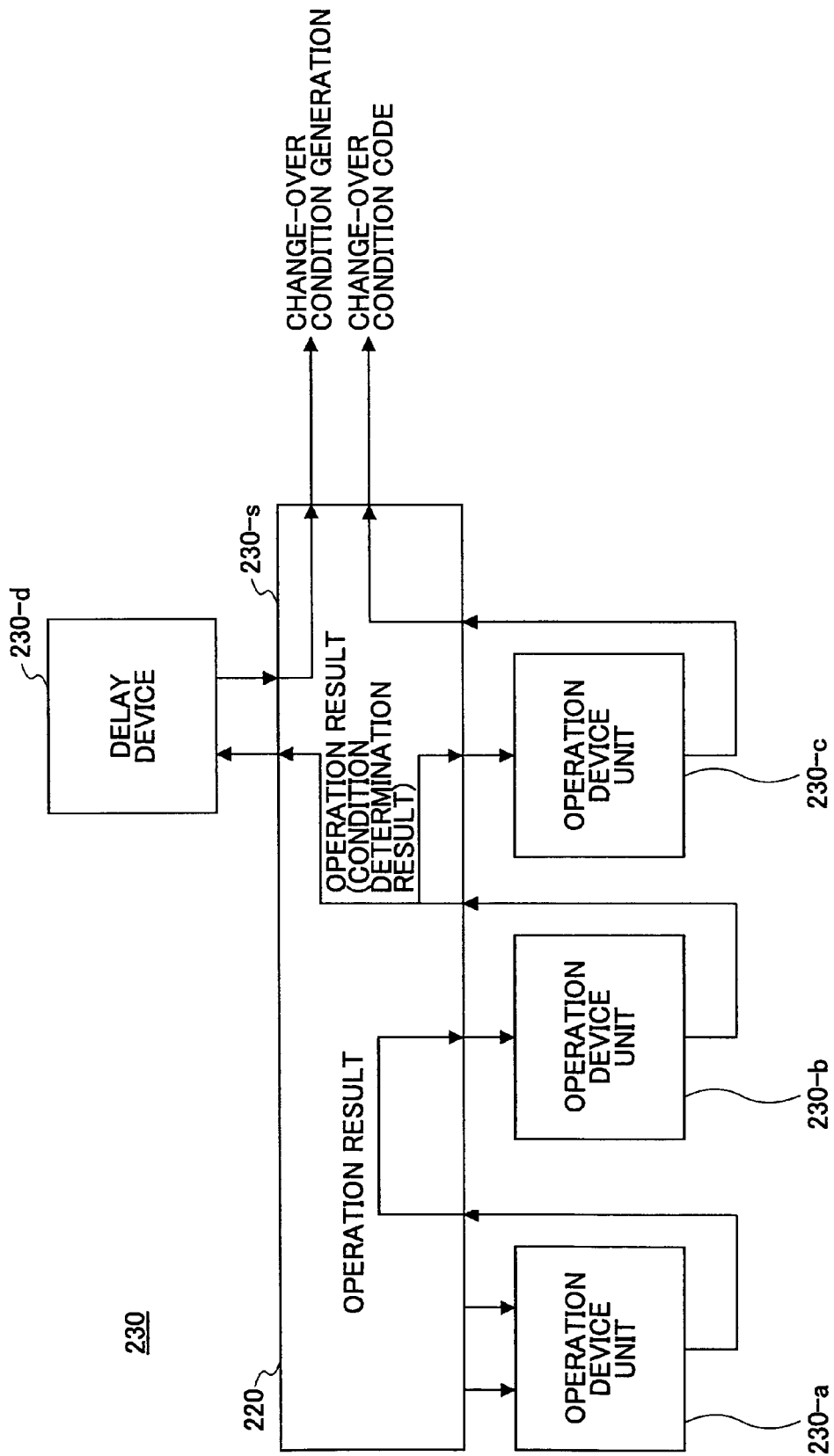
FIGS. 14 through 18 illustrate configurations applied for branch condition occurrence detection and change-over condition code generation occurring therefrom, respectively, according to embodiments of the present invention.

In the case of FIG. 19, in Step S1, for the operation device unit acting as the condition determination unit or the comparator, i.e., the operation device unit 230-*b* or 230-*a* or the comparator 230-*k* respectively for the case of FIG. 14, 15 or 18, a reference value used for comparison is previously set by the configuration information. In Step S2, this operation device unit or the comparator receives a predetermined operation processing result from another operation device unit. In Step S3, the operation device unit or the comparator carries out comparison operation between the operation processing result and the above-mentioned comparison reference value. Then, when the comparison result is 'coincidence', a 'coincidence flag' is output in Step S4.

The other operation device unit, i.e., the operation device unit 230-*c*, 230-*b* or 230-*c* respectively for the case of FIG. 14, 15 or 18, receives this coincidence flag in Step S5. Simultaneously, the delay device 230-*d* also receives this coincidence flag in Step S8. In Step S6, this other operation device unit generates a predetermined change-over condition code, and, in Step S7, outputs the same to the sequencer 100. In Step S9, the delay device generates a delay corresponding to a delay required by the other operation device unit to carry out the change-over condition code generation processing in Steps 6 and 7, and, after the thus-generated delay, the delay device outputs the change-over condition generation signal to the sequencer 100.

In the flow of FIG. 20, operations in Steps S21 through S24 are the same as those in Steps S1 through S4 described above. After that, the operation device unit acting as the condition determination unit directly outputs the coincidence flag as the change-over condition code as well as outputs the change-over condition generation signal, to the sequencer 100, without using the other operation device unit, the delay device or such.

Figure 21:
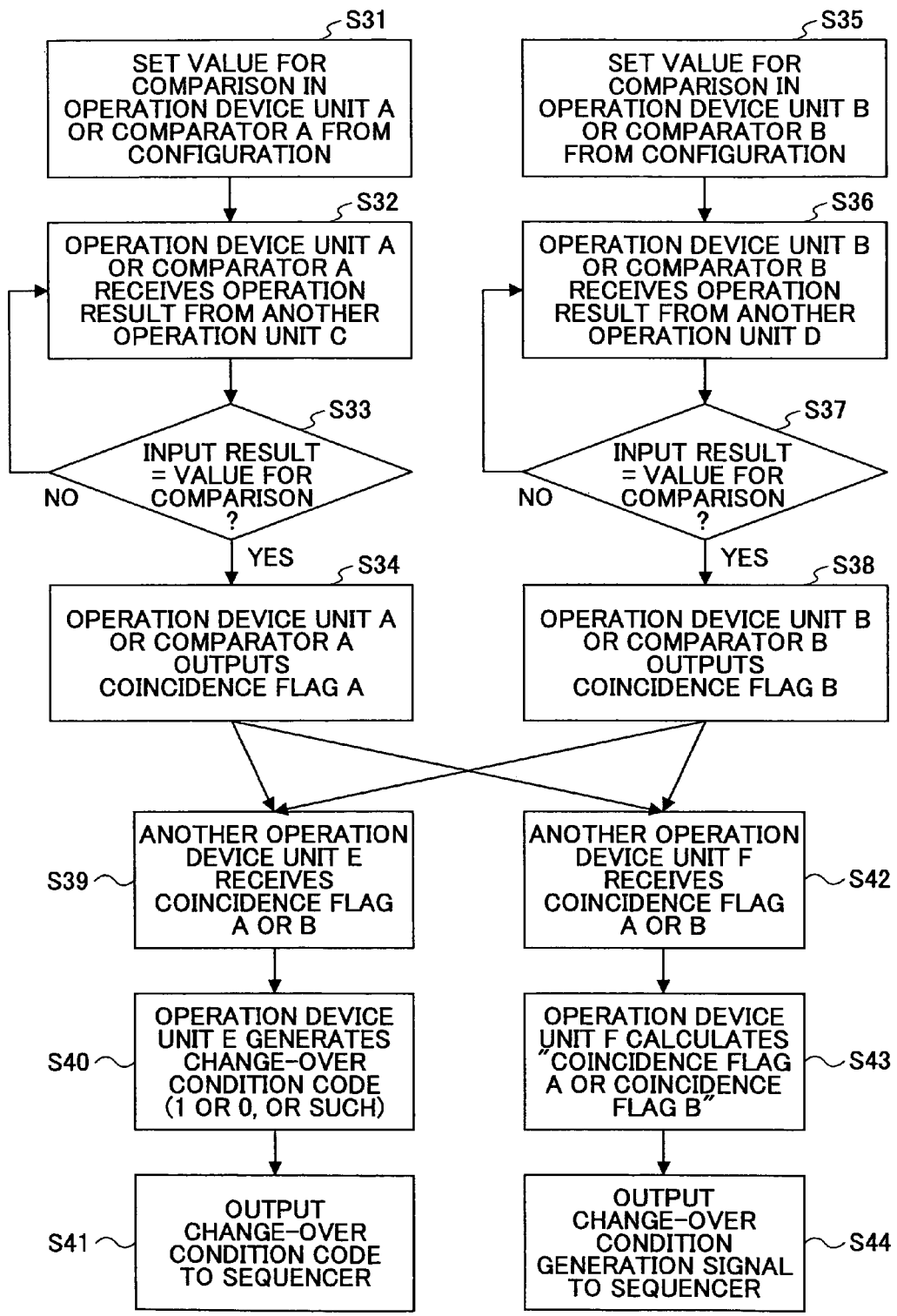
Figure 22:
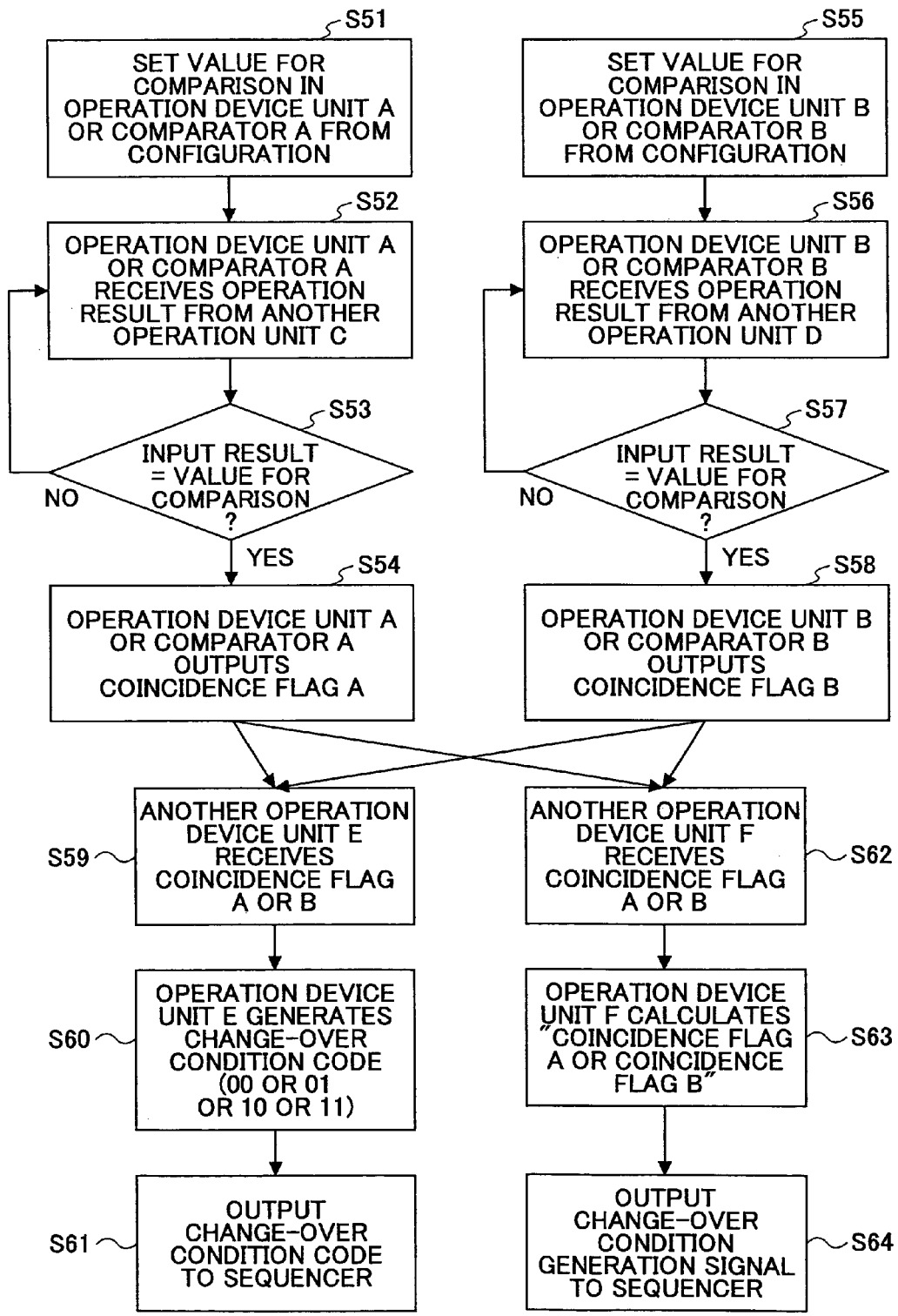

FIGS. 21 and 22 show operation flows for a case where two condition determination units are applied, i.e., for the case of FIG. 16 or 17. In particular, FIG. 21 shows an example in a case where change-over condition fulfillment conditions of these two condition determination units are individual from one another. That is, this case is a case where configuration change-over occurs when branch occurs in processing as shown below:

```
If (x=A) {
...
}
If (y=B) {
...
}
```

On the other hand, FIG. 22 shows an example in which one change-over condition fulfillment condition depends from the other, i.e., different configuration contents are applied depending on a state inside of the nest of 'If . . . else', in processing as shown below:

```
If (x=A) {
    If (y=B) { }
    else { }
    .
    .
    .
}
else {
    If (y = B) { }
    else { }
    .
    .
}
```

In FIGS. 21 and 22, each of processing in Steps S31 through S34, processing in Steps S35 through S38, processing in Steps S51 through S54 and processing in Steps S55 through S58 are the same as the processing in Steps S1 through 4 of FIG. 19. In Step S39, the operation device unit generating the change-over condition code receives a coincidence flag A or B from Step S34 or S38, generates the change-over condition code in Step S40, and supplies the same to the sequencer 100 in Step S41. On the other hand, in Step S42, the operation device unit generating the change-over condition code receives a coincidence flag A or B from Step S34 or S38, carries out operation of 'coincidence flag A OR coincidence flag B', that is, provides a true output when receiving the coincidence flag A or B, in Step S43. In Step S44, in response thereto, the change-over condition generation signal is supplied to the sequencer 100 in the case of the true output obtained from Step S43.

In Steps S59 through S61 and Steps S62 through S64 in FIG. 22 are also basically the same as Steps S39 through S41 and Steps S42 through S44, respectively. However, in a case of FIG. 22, a change-over condition code generation method in the change-over condition code generation operation device unit varies depending on a manner of change-over between the If sentence and the configuration contents occurring after the condition determination. In other words, as mentioned above, different configurations may be applied according to the operation contents occurring inside the nest of 'If . . . else'. Accordingly, the contents of the change-over condition code generation operation can be set variously in Step S60 so that various configurations may be selectively applied accordingly.

Figure 23A:
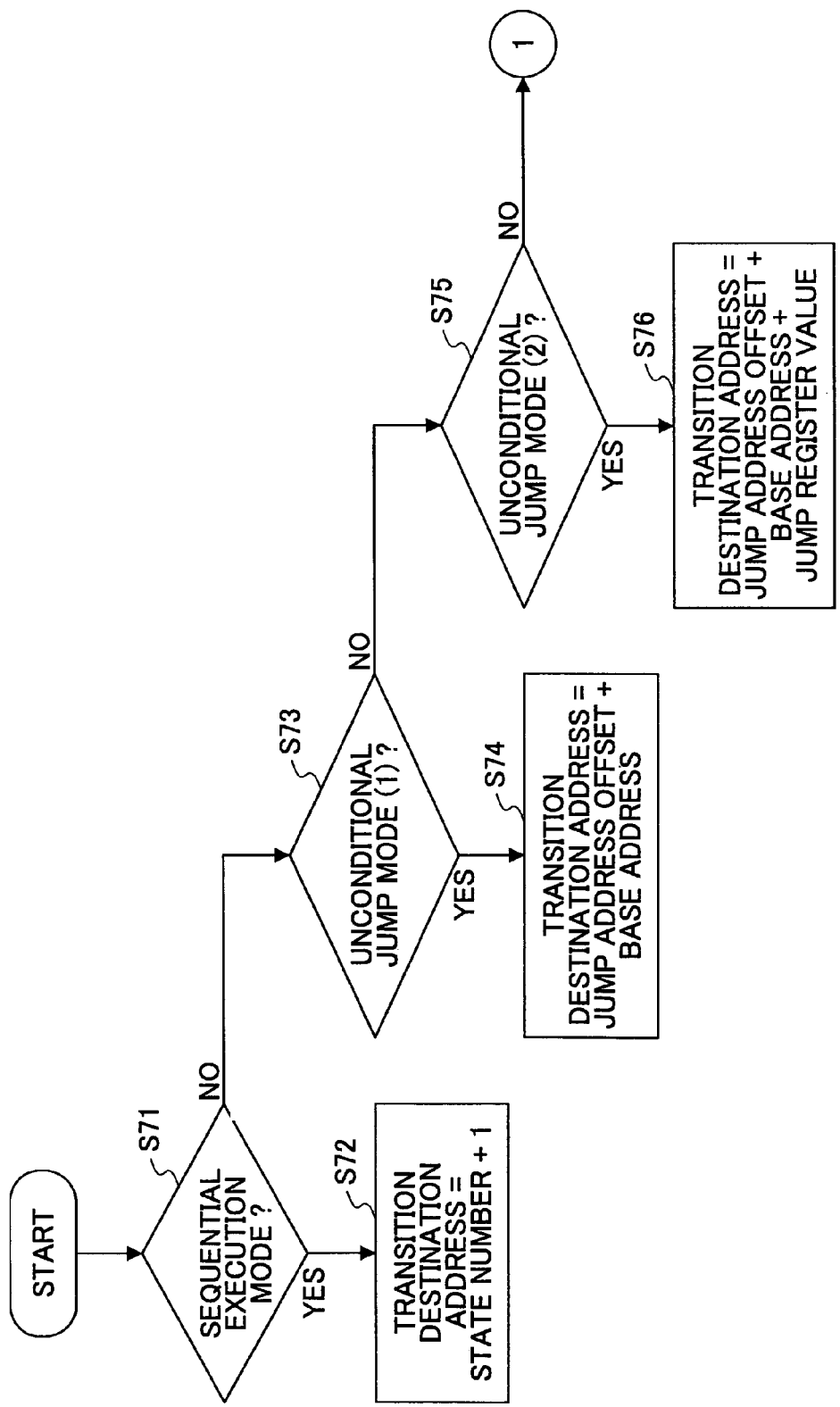
FIGS. 23A and 23B show flow charts of transition destination address determination operation carried out according to the opcodes shown in FIG. 10.
Figure 23B:
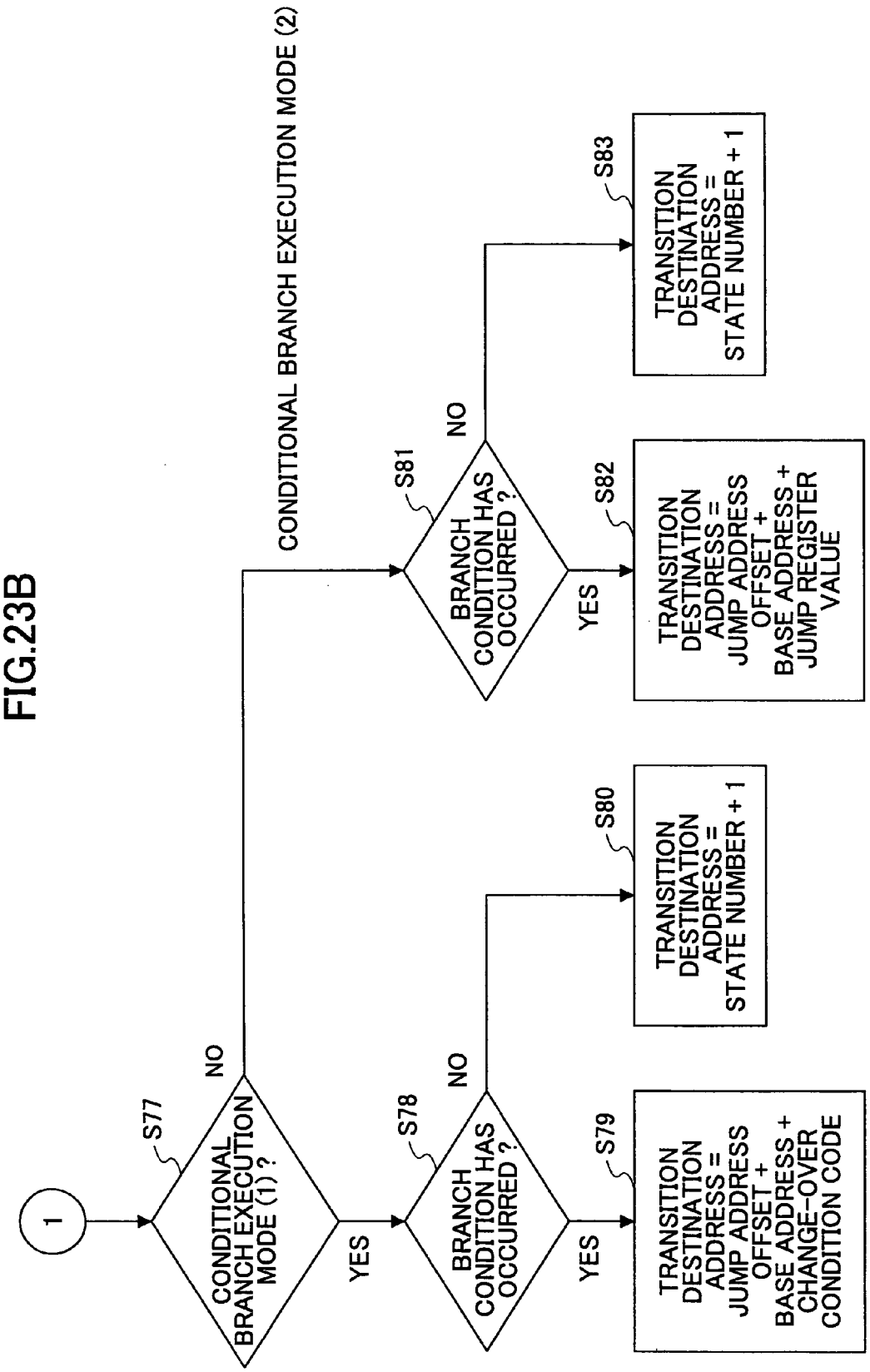

FIGS. 23A and 23B show an operation flow of transition destination address generation operation with the use of the opcode shown in FIG. 10. In Step S71, it is determined whether or not the given opcode indicates the sequential execution mode. If the result is Yes, '1' is added to the configuration memory address currently applied, and thus, a subsequent transmission destination address is obtained in Step S72. If the result is No, it is determined in Step S73 whether or not the opcode indicates the above-mentioned unconditional jump mode (1). If the result is Yes, the subsequent transition destination address is obtained from operation 'jump address offset value+base address value' in Step S74. If the result is No, it is determined in Step S75 whether or not the opcode indicates the above-mentioned unconditional jump mode (2).

If the result is Yes, the subsequent transition destination address is obtained from operation 'jump address offset value+base address value+jump register value' in Step S76. If the result is No, it is determined in Step S77, whether or not the opcode indicates the above-mentioned conditional branch execution mode (1). If the result is Yes, it is determined in Step S78 whether or not a predetermined branch condition has occurred. If the result is Yes, the subsequent transition destination address is obtained from operation 'jump address offset value+base address value+change-over condition code value' in Step S79. If the result is No, the subsequent transition destination address is obtained from adding '1' to the current address in Step S80.

If the result of Step S77 is No, it is determined in Step S81 whether or not the opcode indicates the above-mentioned conditional branch execution mode (2) If the result is Yes, it is determined in Step S81 whether or not the branch condition has occurred. If the result is Yes, the subsequent transition destination address is obtained from operation 'jump address offset value+base address value+jump register value' in Step S82. If the result is No, the subsequent transition destination address is obtained from adding 1 to the current address in Step S83.

Figure 24B:
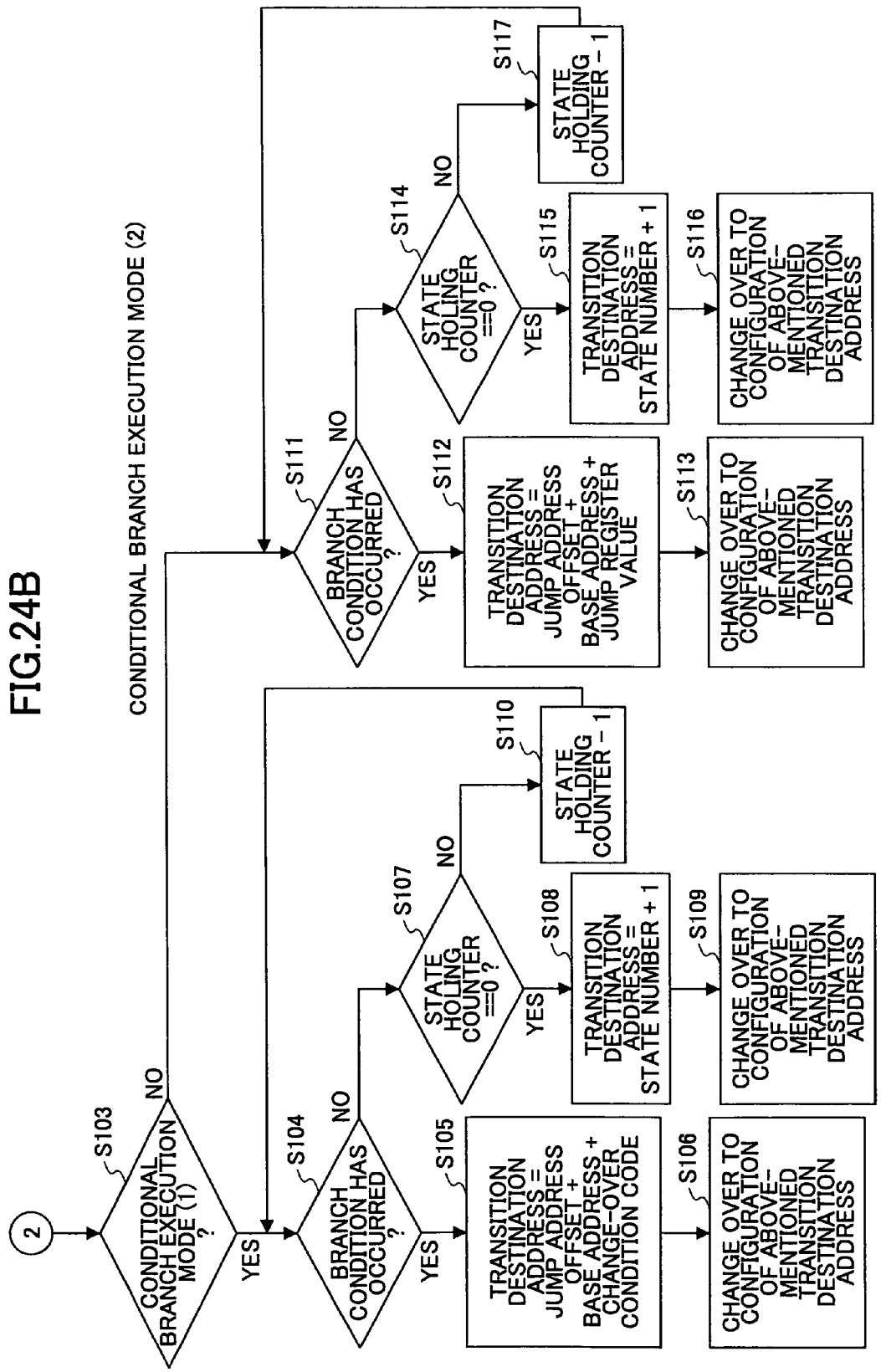
Figure 25:
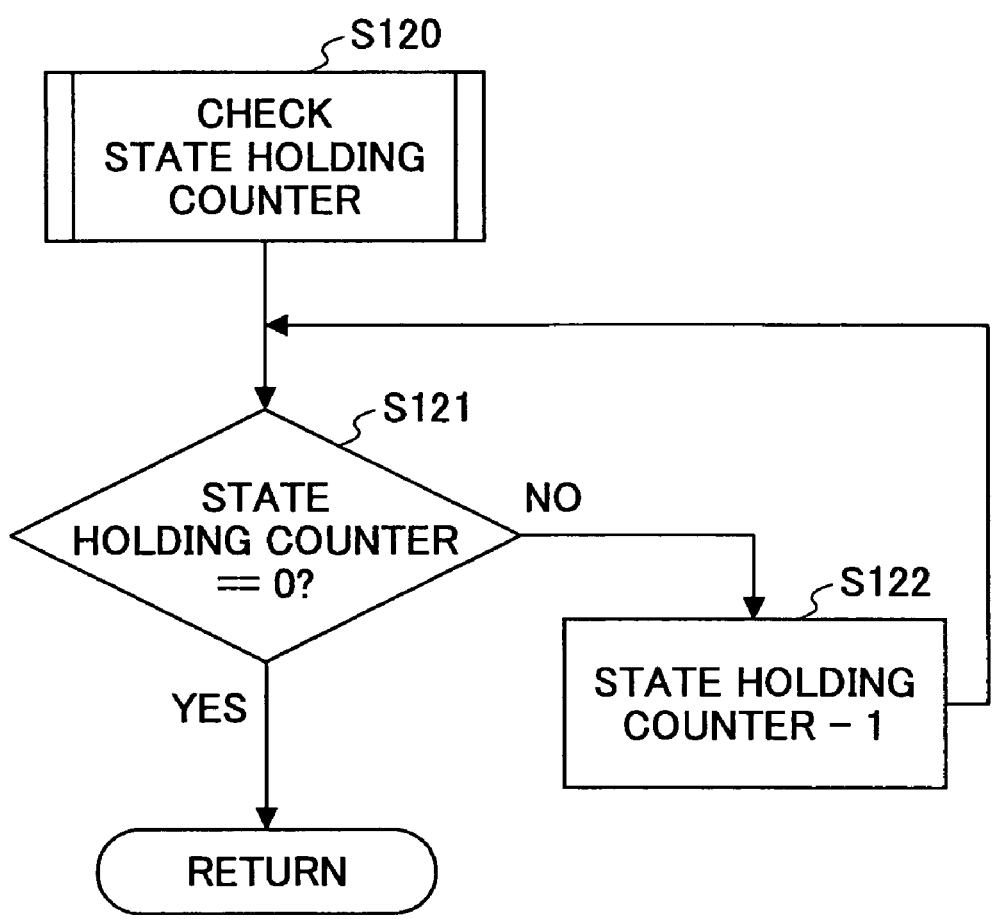

FIGS. 24A, 24B and 25 shows an operation flow including operation of the state holding counter 136 shown in FIG. 9 in addition to the operations included in the operation flow of FIGS. 23A and 23B. In the figures, Steps S91, S92, S95, S99, S100, S103, S104, S105, S108, S111, S112 and S115 are the same as Steps S71 through S83 shown in FIGS. 23A and 23B 24B, respectively. There, after a transition destination address is obtained in Step S92, state holding counter check is carried out in Step S93. That is, in Step S121 of FIG. 25, a numerical value in the state holding counter 136 is referred to, and, when the value is 0, the subsequent step is carried out in FIG. 24A. However, if the value is other than 0, the numerical value of this counter is decremented by one, i.e., '1' is subtracted therefrom (Step S122). A loop of Steps S121 and S122 is repeated until the value in the counter becomes 0. As a result, it is possible to arbitrarily control a timing at which the subsequent transition destination address is actually supplied to the configuration memory 210.

After the above-mentioned state holding counter check processing is thus carried out, the relevant transition destination address is supplied to the configuration memory 210, and as a result, relevant configuration information is supplied therefrom to the predetermined operation device unit 230-n. As a result, the relevant configuration information is actually applied. Also in Step S97, the same state holding counter check processing is carried out, and after that, the relevant transition destination address is actually applied in Step S98.

Steps S107 and S110 are the same as Steps S121 and S122 mentioned above. However, in this case, it is determined in Step S104 whether or not a predetermined branch condition occurs, each time when a numerical value in the state holding counter 136 is decremented. Then, when the predetermined branch condition occurs before the numerical value in the counter becomes zero, predetermined processing to be carried out upon occurrence of the predetermined branch condition is actually carried out in Steps S105 and S106. Similarly, also in a case of Steps S114 and S117, it is determined in Step S111 whether or not a predetermined branch condition occurs, each time when a numerical value in the state holding counter 136 is decremented. Then, when the predetermined branch condition occurs before the numerical value in the counter becomes zero, predetermined processing to be carried out upon occurrence of the predetermined branch condition is actually carried out in Steps S112 and S113.

Figure 26:
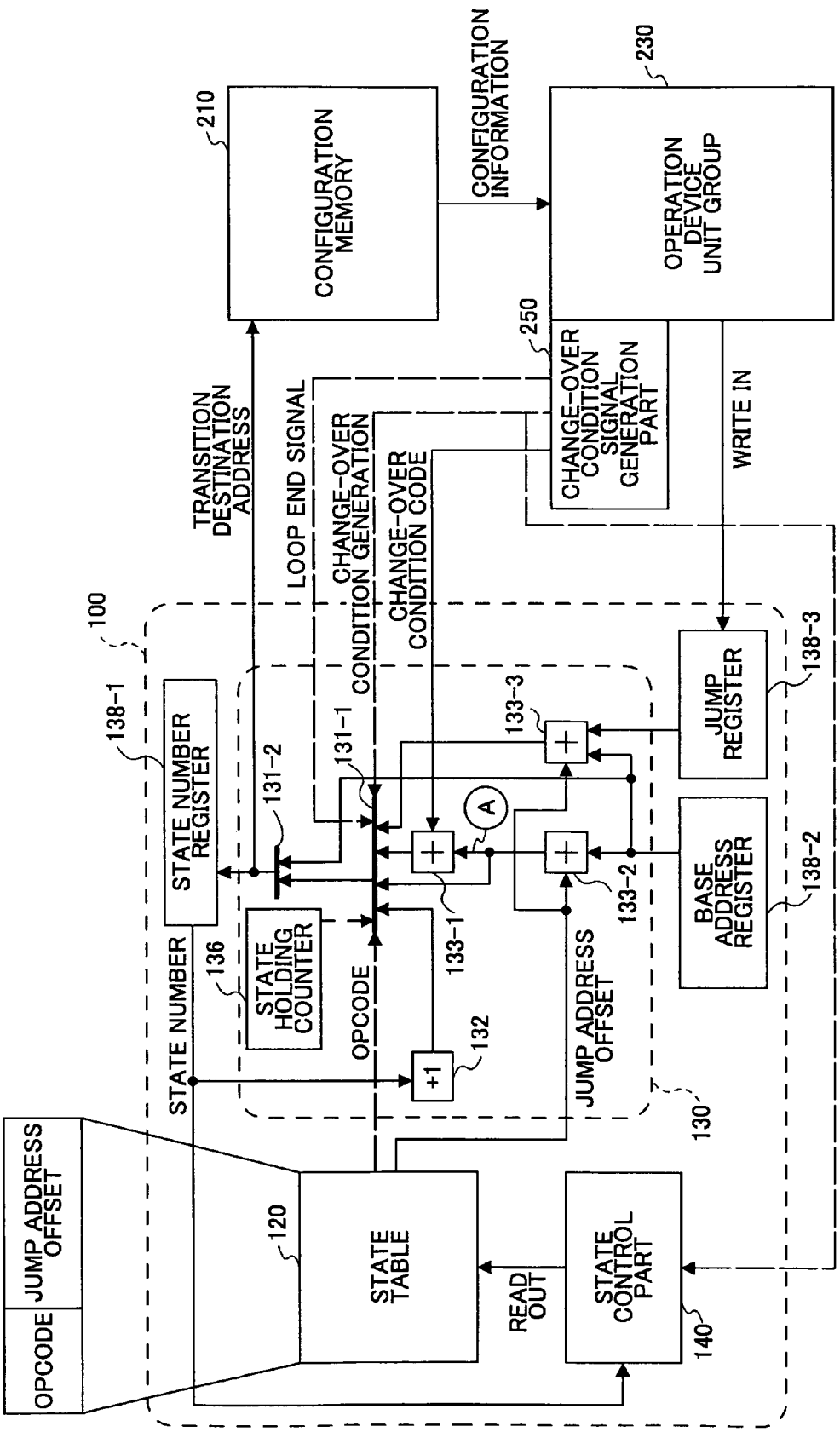
FIG. 26 shows a block diagram illustrating a general configuration of an operation apparatus according to a fourth embodiment of the present invention.

FIG. 26 shows a configuration of an operation apparatus according to a fourth embodiment of the present invention. In this embodiment, different from the third embodiment shown in FIG. 9, a predetermined loop end signal is supplied to the transition destination address generation part 130 in the sequencer 100, from the change-over condition signal generation part 250. FIGS. 27A and 27B illustrate transition destination address determination manners with the use of opcodes according to the fourth embodiment. In FIG. 27A, by the opcode 0000, the sequential execution mode the same as that of the opcode 000 in FIG. 10 is applied. In this case, after it is determined that the state holding counter 136 has the value zero, simply the subsequent transition destination address is actually applied. Respective modes by the opcodes 0001, 010, 0011 and 0101 are the same as the modes by the opcodes 001, 010, 011 and 101 shown in FIG. 10.

On the other hand, by the opcode 1000 shown in FIG. 27B, when the transition destination address generation part 130 has receive the above-mentioned loop end signal, a relevant transition destination address is actually applied. This point is different from the above-mentioned case of the opcode 0000. Similarly, in the respective cases of the opcodes 1001, 1010, 1011 and 1101, what is different from the above-mentioned cases of the opcodes 0001, 0010, 0011 and 0101 is that, instead of 'after it is determined that the state holding counter has zero', the subsequent transition destination address is output 'after the loop end signal has been received'.

Figure 28A:
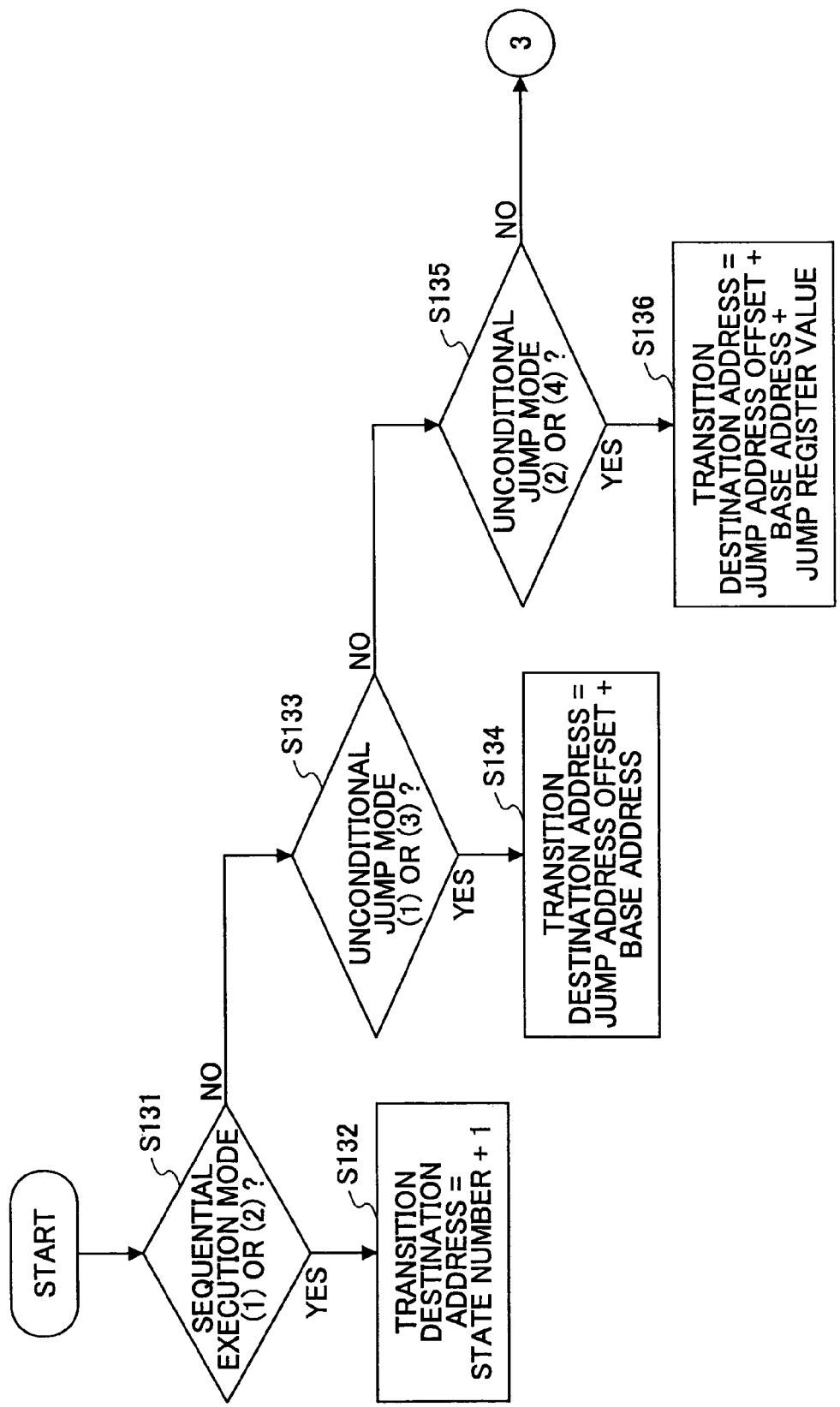
FIGS. 28A and 28B show flow charts of transition destination address determination operation carried out according to the opcodes shown in FIGS. 27A and 27B.
Figure 28B:
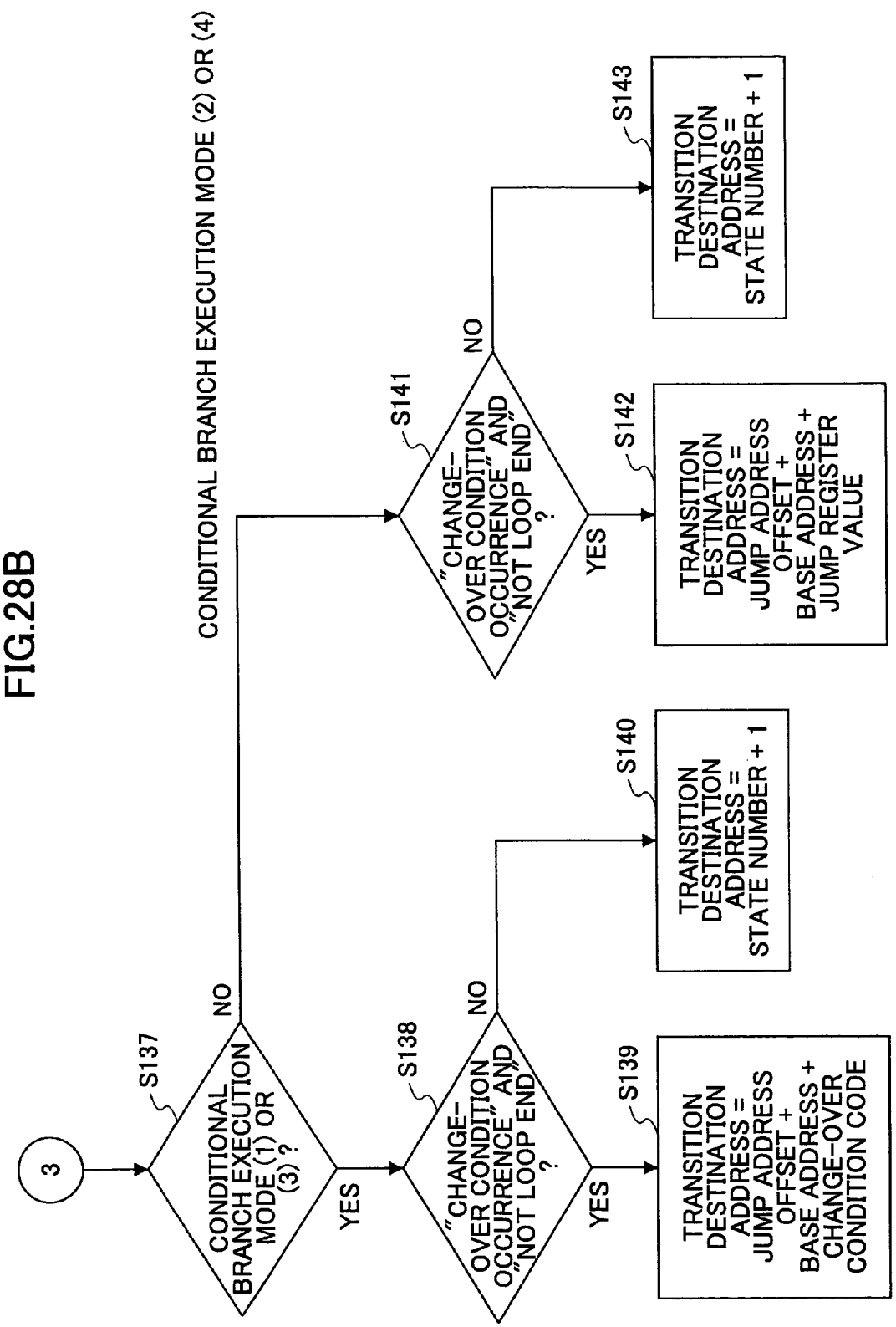
Figure 29B:
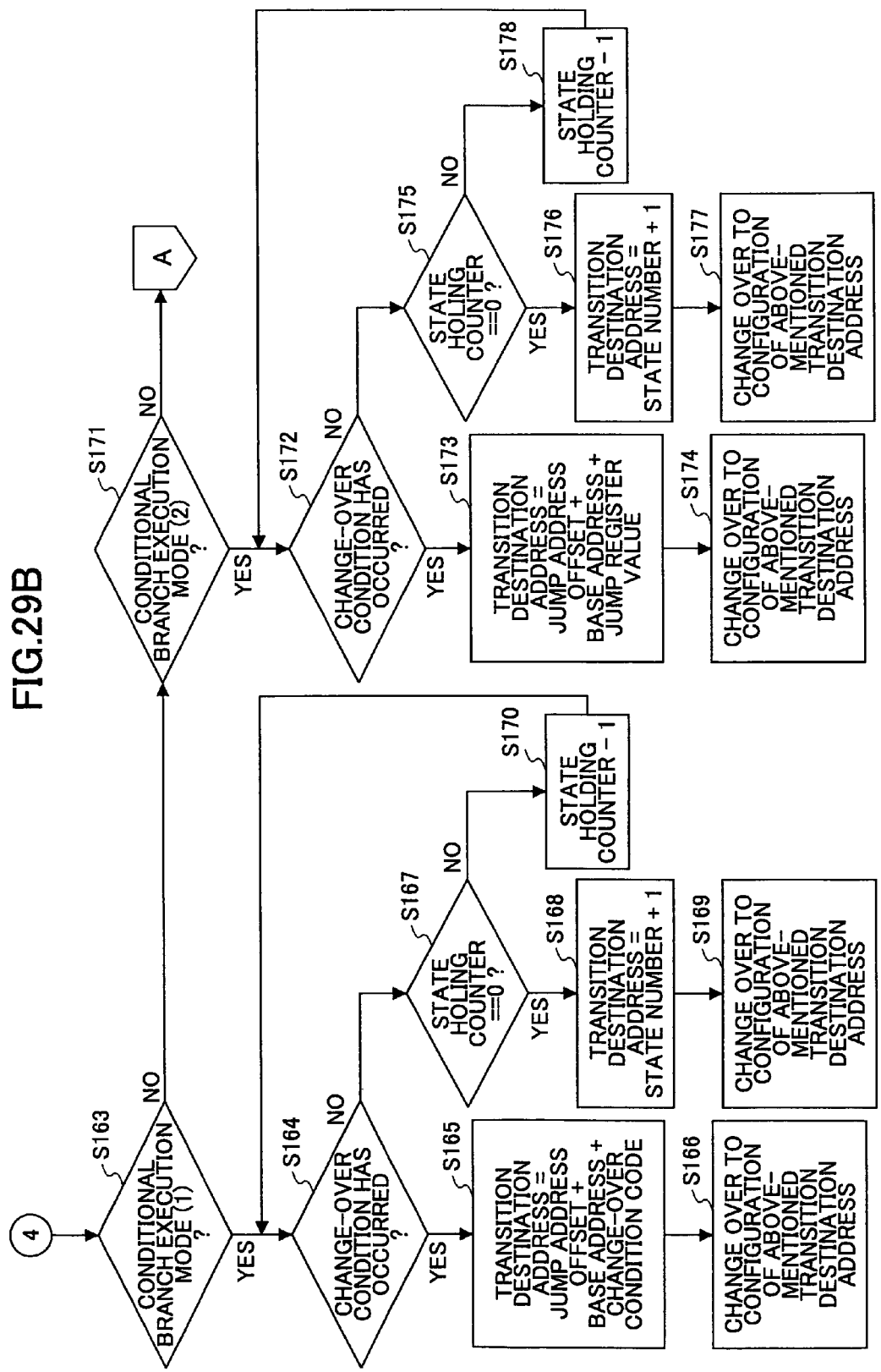

FIGS. 28A, 28B, 29A, 29B, 30, 31A, 31B and 32 show an operation flow for determining a transition destination address and applying it, according to the fourth embodiment. In FIGS. 28A and 28B, Steps S131 through S143 are the same as Steps S71 through S83 in FIGS. 23A and 23B. Except, in Steps S138 and S141, different from Steps S72 and S81, instead of determination as to 'whether or not the branch condition has occurred', it is determined whether or not conditions that a change-over condition has occurred and the loop end signal has not been received' are fulfilled. Then, when the determination result is Yes, the predetermined processing to be carried out when the branch condition is met is carried out in Step S139 or S142. When the result is No, the processing of the sequential execution mode is carried out in Step S140 or S143.

Figure 30:
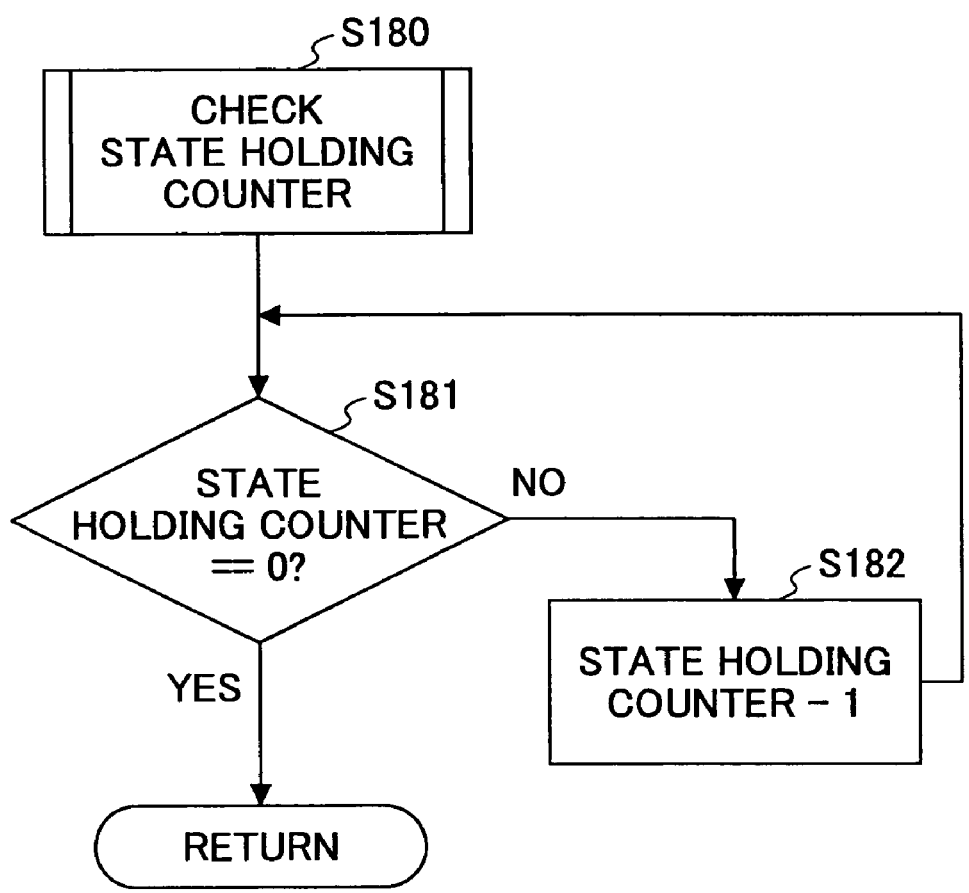

FIGS. 29A, 29B, 30, 31A, 31B and 32 show a processing flow including, in addition to the transition destination address determination operations in Steps 28A and 28B, operations for actually supplying the thus-determined transition destination address to the configuration memory 210 so that relevant configuration information may be set in the operation device unit 230-$n$ and thus may be applied thereto. FIG. 30 is the same as FIG. 25, and the duplicated description therefor is omitted. Further, in FIGS. 29A and 29B, Steps S151 through S170 are the same as Steps S91 through S110 in FIGS. 24A and 24B, respectively, also, Steps S172 through S178 are the same as Steps S111 through S117, respectively, and the duplicated description therefor is omitted.

When it is determined in Step S163 that the opcode does not indicate the conditional branch execution code (1), that is, when it is determined that the opcode is not 0010, Step S171 is executed. In Step S171, it is determined whether or not the opcode indicates the conditional branch execution mode (2), that is, whether or not the opcode is 0011 is determined. When the result thereof is Yes, predetermined processing for the conditional branch execution mode (2) starting from Step S172 is carried out. When the result is No, Step S191 in FIG. 31A is carried out.

Figure 31A:
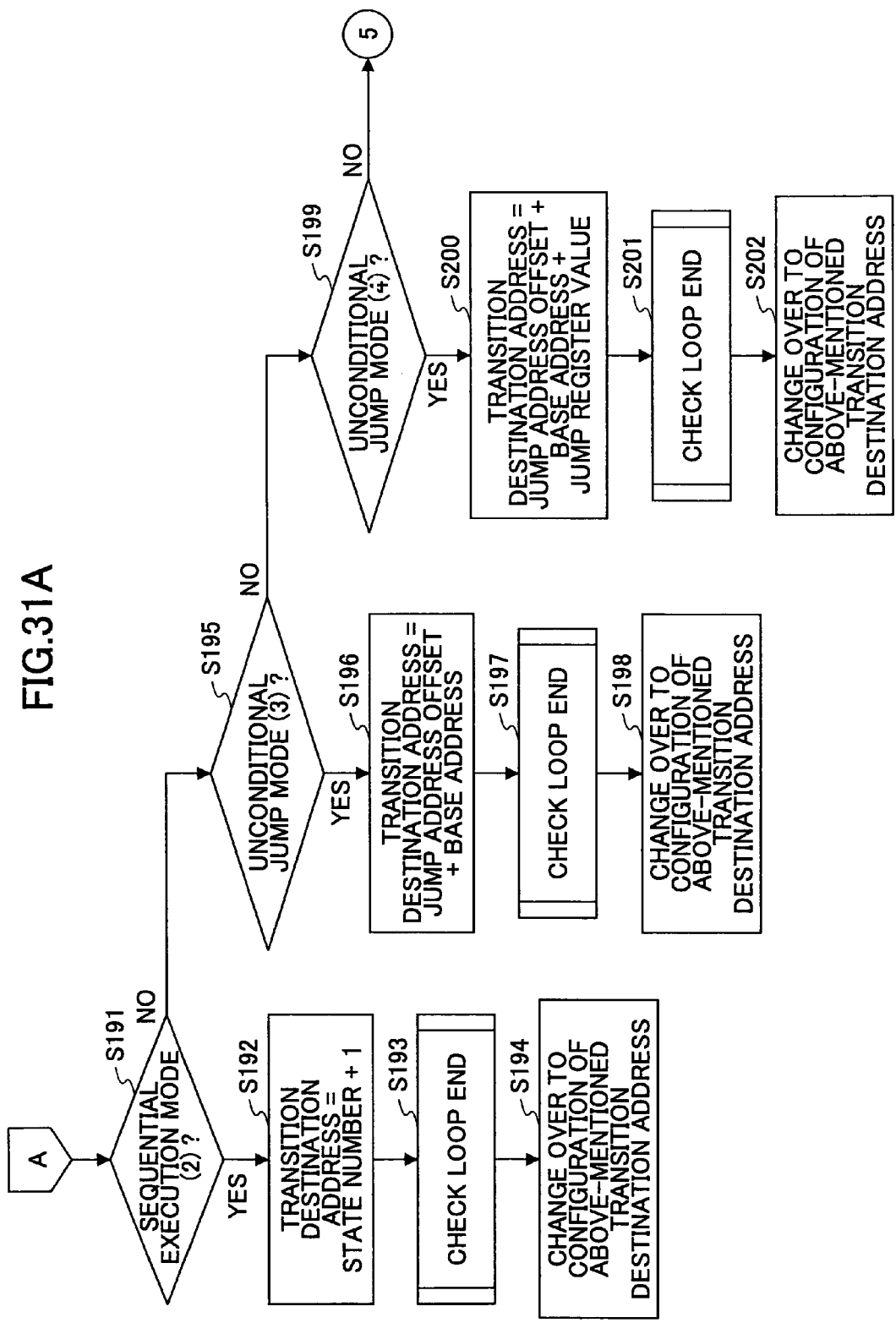
Figure 32:
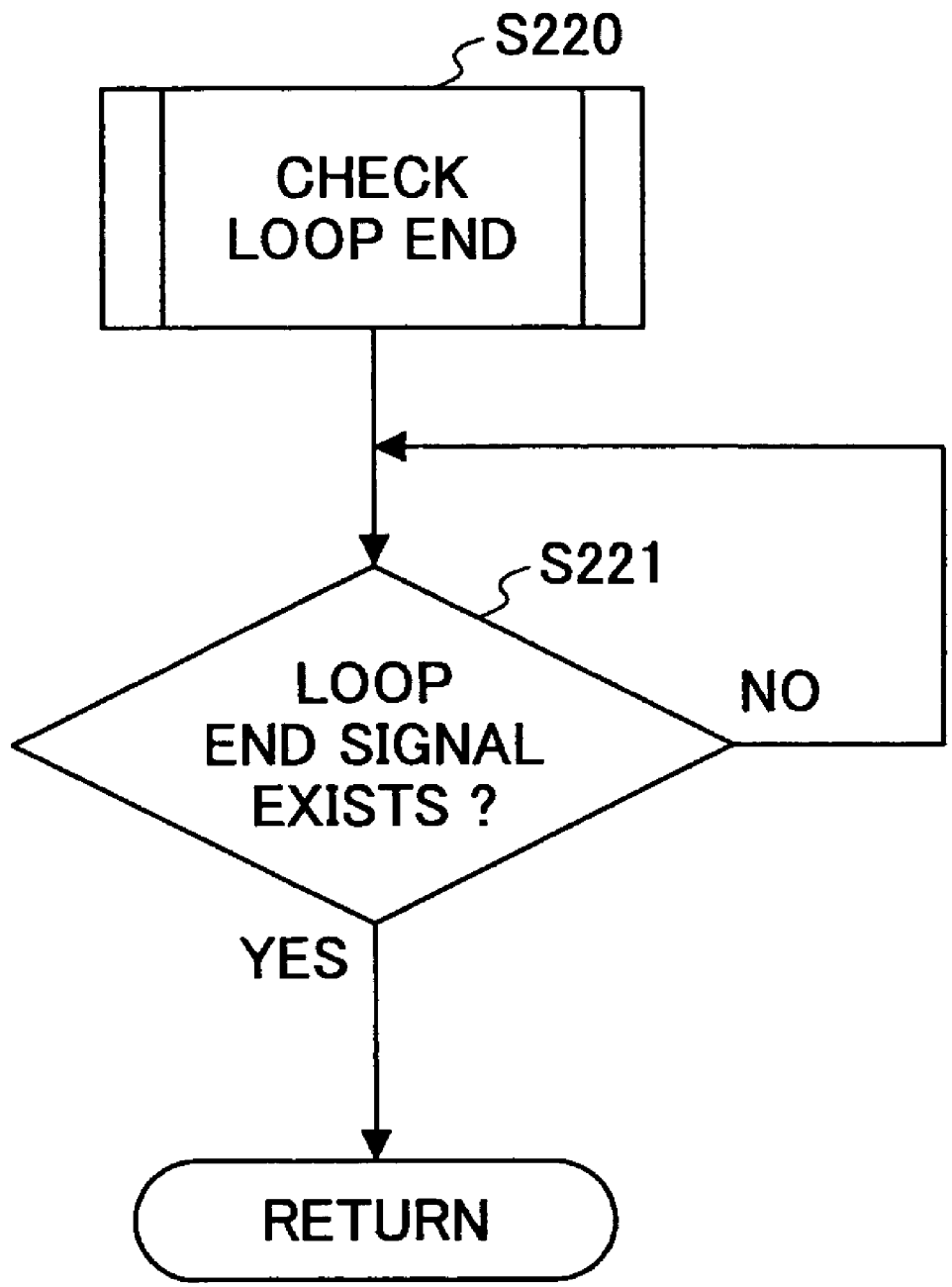

Processing in FIGS. 31A and 31B show operations in the cases of the opcodes of 1000 through 1101 shown in FIG. 27B. Steps S191 through S215 in FIGS. 31A and 31B correspond to the operations in Steps S91 through S117 of FIGS. 24A and 24B, respectively. What is different between 31A-B and 24A-B is described next. That is, instead of checking the state holding counter in Step S93 of FIG. 24A, loop end check processing is carried out in Step S193 of FIG. 31A. This processing is, as shown in FIG. 32, it is determined in Step S221 whether or not the above-mentioned predetermined loop end signal has been received. Then, when the signal has been received, the subsequent step, i.e., Step S194 is carried out, and thus, relevant configuration information is applied by the subsequent transition destination address. The same processing is carried out also in Step S201 corresponding to Step S101.

Furthermore, instead of determining in Step S107 of FIG. 24B whether or not the state holding counter has zero, it is determined in Step S205 whether or not the loop end signal has been received. When the result is that the signal has not been received, the processing following the fulfillment of the branch condition (change-over condition occurrence) is carried out in Steps S206 and S207. On the other hand, when the loop end signal has been received, the processing corresponding to the sequential execution mode is carried out in Steps S208 and S209. Similarly, it is determined in Step S211 whether or not the loop end signal has been received. When the result is that the signal has not been received, the processing following the fulfillment of the branch condition (change-over condition occurrence) is carried out in Steps S212 and S213. When the loop end signal has been received, the processing corresponding to the sequential execution mode is carried out in Steps S214 and S215.

Figure 33:
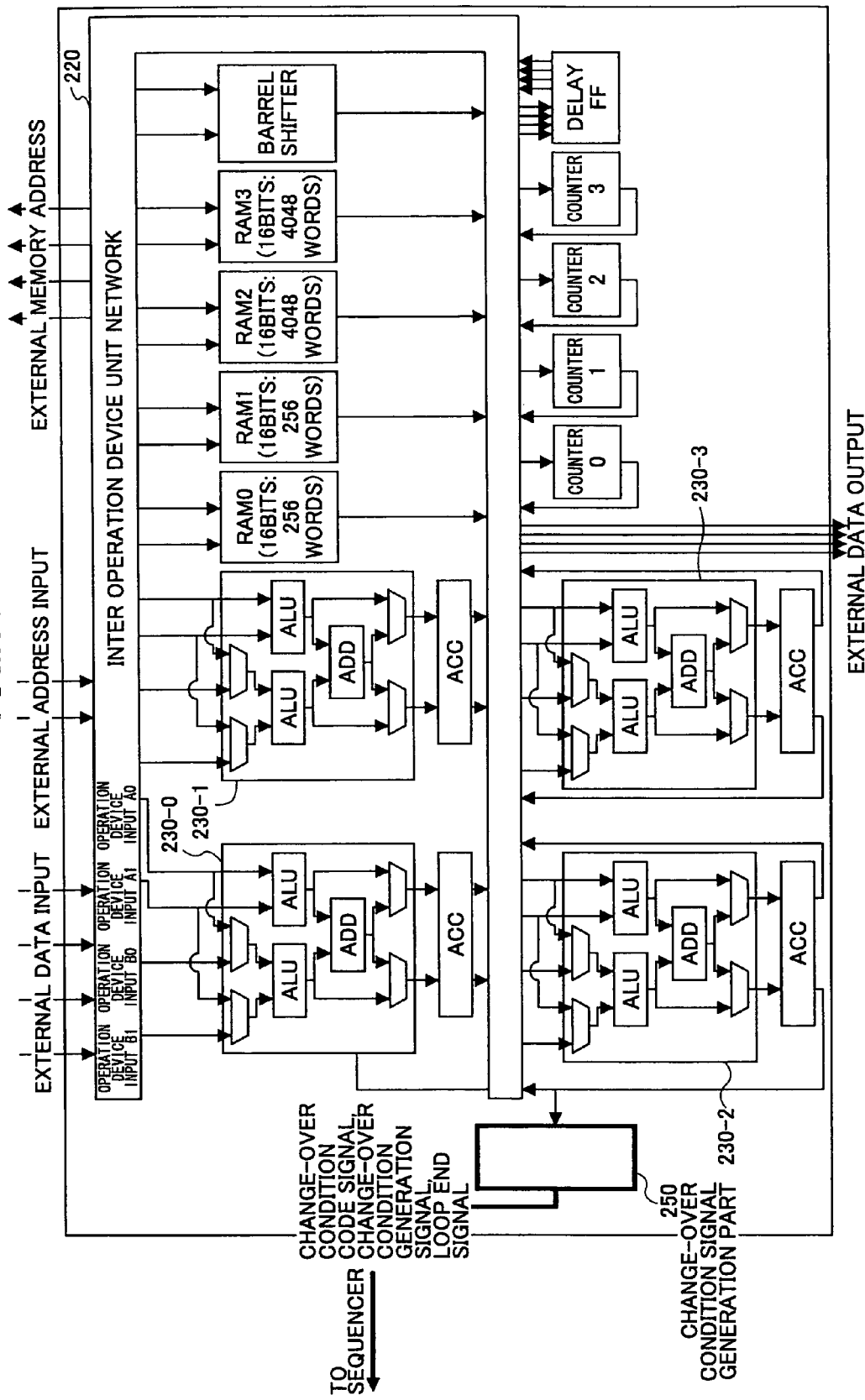
FIGS. 33 through 38 illustrate configurations of a change-over condition signal generation part according to an embodiment of the present invention.
Figure 34:
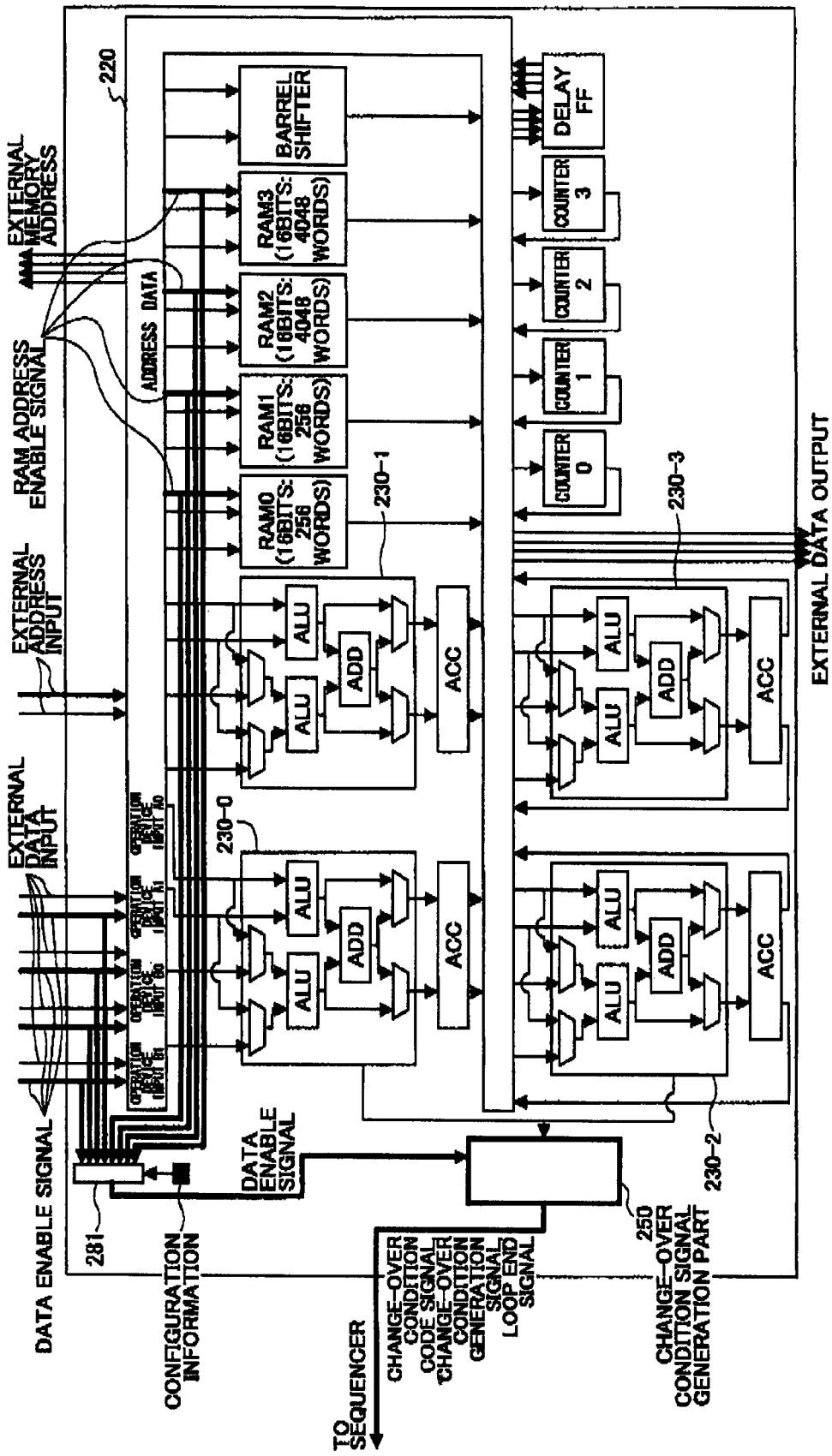

With reference to FIGS. 33 through 45, the configurations of generation of the change-over condition code signal and the change-over condition generation signal, applicable to each embodiment of the present invention, are described in detail. FIG. 33 shows a circuit diagram relating to generation of the change-over condition code signal and the change-over condition generation signal in the operation unit device group 230. FIG. 34 shows, in addition thereto, a configuration relating to data enable signal obtaining processing described later. FIGS. 35, 36, 37 and 38 show circuit configurations relating to generation of the change-over condition code signal and the change-over condition generation signal in further detail. FIGS. 39 through 45 show flow charts of processing carried out by these circuit configurations.

In FIG. 33, a signal obtained from the operation device unit 230-2 of the operation device units 230-0 through 230-3 included in the operation device unit group 230 is supplied to the change-over condition signal generation part 250. The change-over over condition signal generation part 250 carries out predetermined logical operation, and, as a result, generates the above-mentioned change-over condition code signal, change-over condition generation signal, loop end signal or such, and supplies it to the sequencer 100.

Further, as shown in FIG. 34, a data enable signal selection switch 281 is provided in the operation device unit group 230. Setting of a state of this switch 281 is carried out by the above-mentioned configuration information. According to the contents of this setting, one of many data enable signals supplied to the switch 281 is selected to be supplied to the change-over connection generation part 250. The many data enable signals supplied to the switch 281 include enable signals accompanying externally input data, a RAM address input signal and so forth, as shown in FIG. 34.

Figure 35:
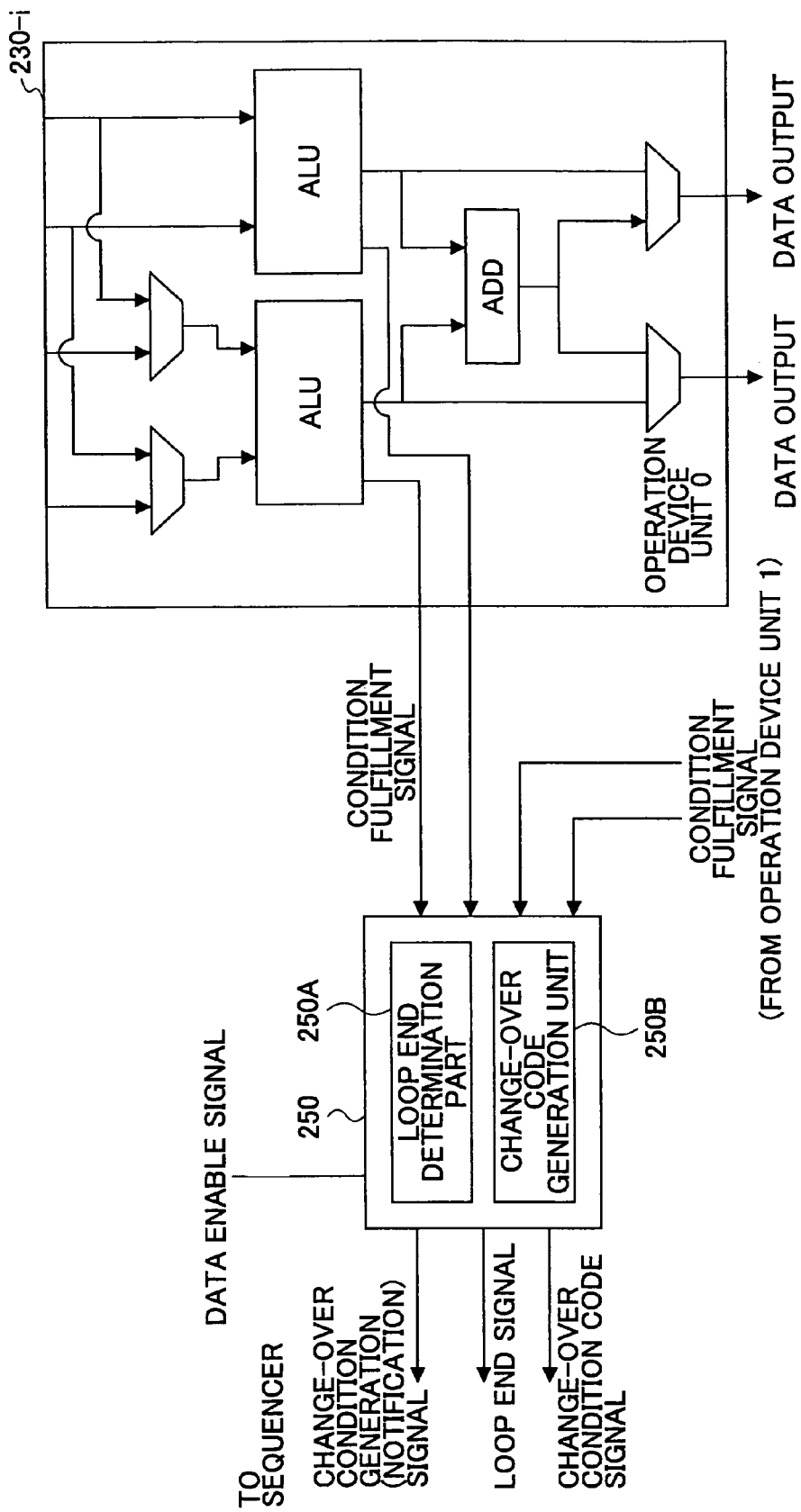

FIG. 35 shows a circuit diagram of the above-mentioned change-over condition signal generation part 250. As shown, the generation part 250 includes a loop end determination part 250A and a change-over condition code generation unit 250B. For example, when a 'coincidence' is obtained as a result of an ALU carrying out comparison processing in the operation device unit 230-$i$, a 'condition fulfillment signal' is output therefrom. Such signals output from the operation device units are then supplied to the change-over condition signal generation part 250. The change-over condition signal generation part 250 then carries out logical operation on these signals, and as a result, generates the change-over condition generation signal, the loop end signal, the change-over condition code signal or such, and supplies it to the sequencer 100.

Figure 36:
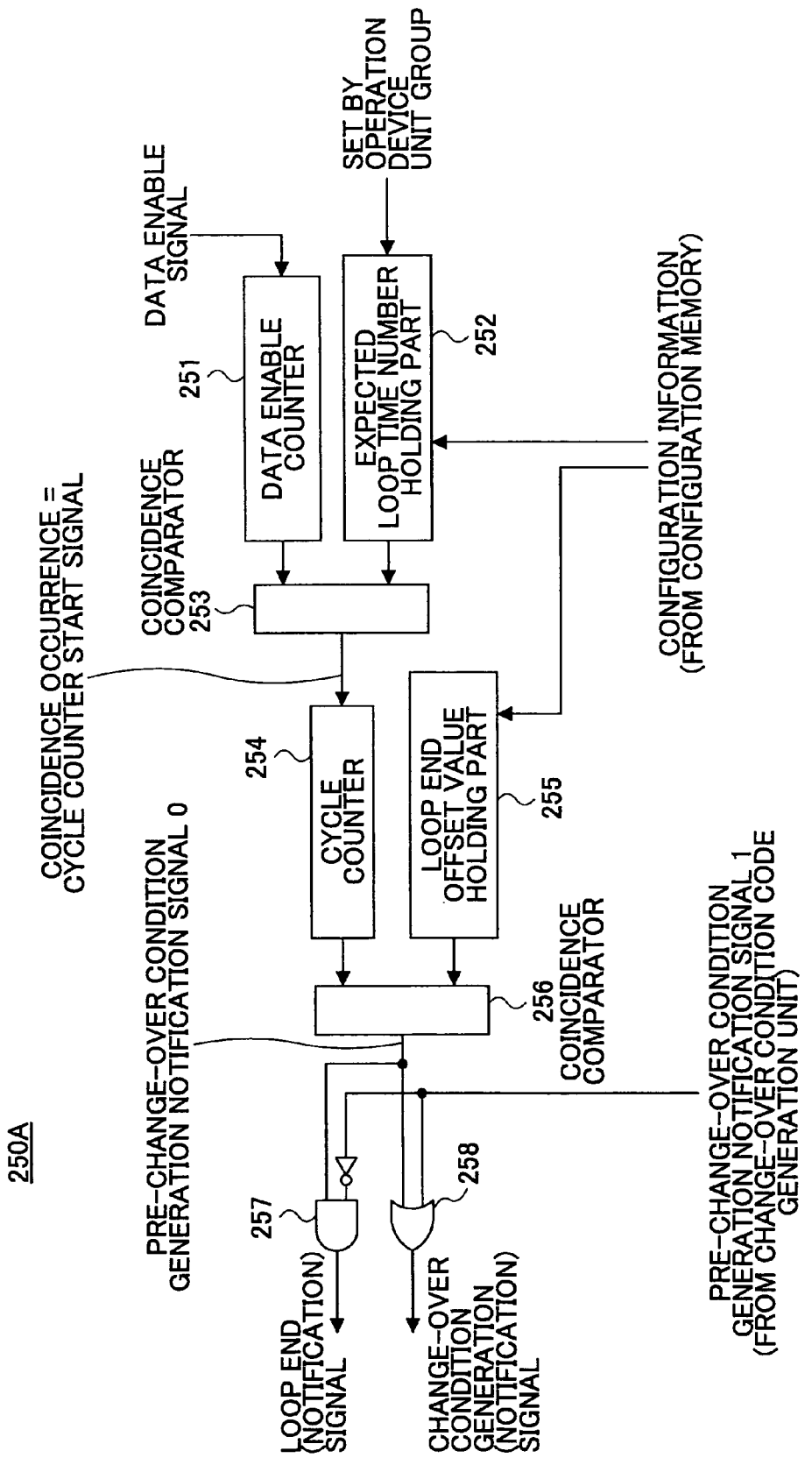

FIG. 36 shows a circuit diagram of the above-mentioned loop end determination part 250A. This includes a data enable counter 251 which receives and counts the above-mentioned data enable signal; an expected loop time number holding part 252 in which a reference value for the number of times of looping operations set as a result of operation processing in the operation device unit group 230, set by the configuration information or such; a comparator 253 comparing between the values of the counter 251 and the holding part 252; a cycle counter 254 which counts, for a predetermined number of times, clock pulses prepared inside of the apparatus, after receiving a 'coincidence' result from the comparator 253; a loop end offset holding part 255 which sets the above-mentioned predetermined number of times; a comparator 256 comparing between the values of the counter 254 and the holding part 255; an OR device 258 carrying out OR operation between the comparison result (pre-change-over condition generation notification signal 0) of the comparator 256 and a pre-change-over condition generation notification signal 1; and an AND device 257 carrying out AND operation between the inverted value of the change-over condition generation notification signal 1 and the pre-change-over condition generation notification signal 0. By this configuration, the loop end signal and the change-over condition generation signal can be generated in timing matching each particular given setting condition of data processing to be executed in the operation apparatus.

Figure 37:
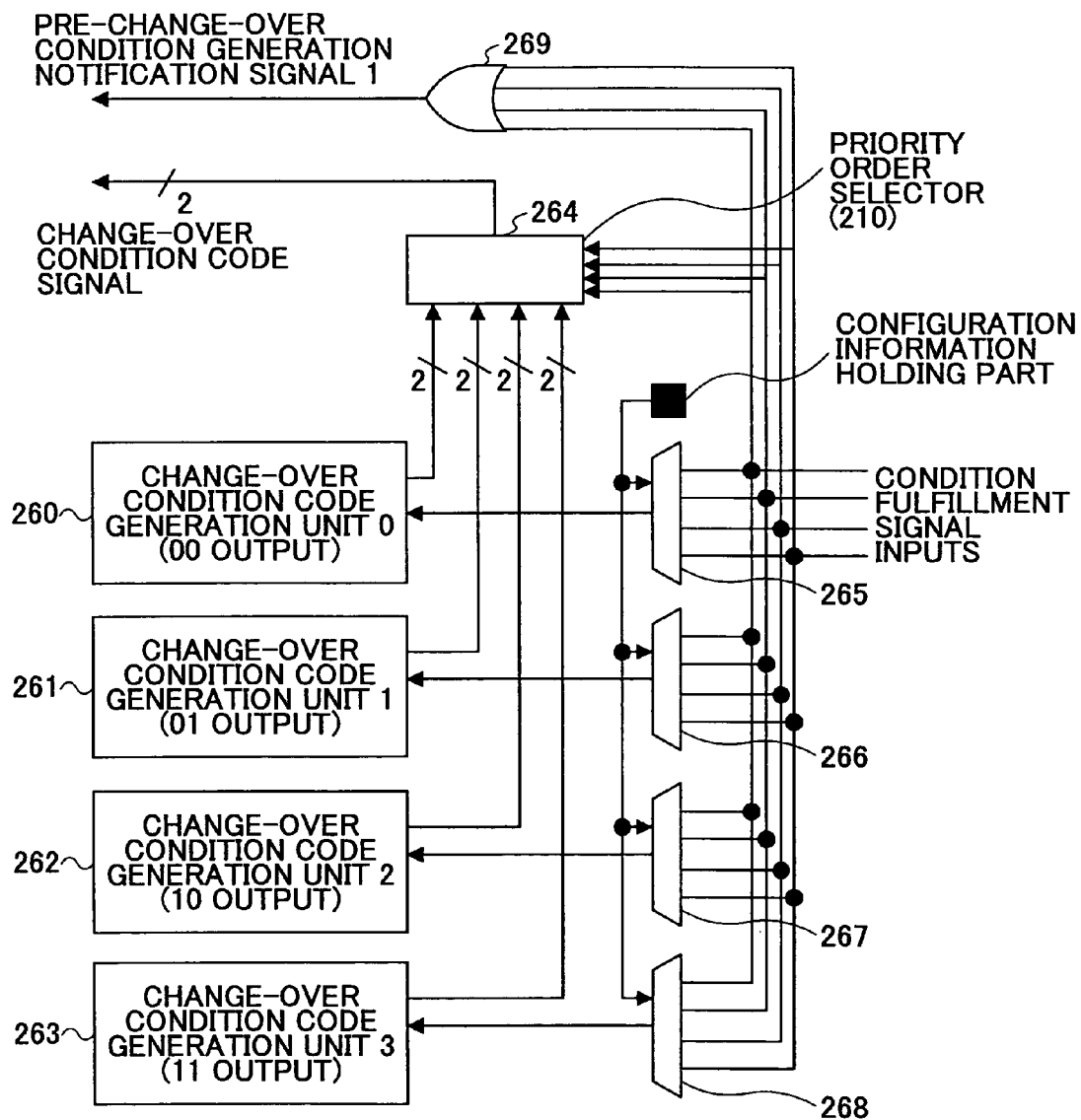

FIG. 37 shows a circuit diagram of the above-mentioned change-over condition code generation unit 250B. As shown, this generation unit 250B includes switches 265 through 268 receiving the above-mentioned condition fulfillment signals supplied by the operation device unit group 230, selecting therefrom according to a setting by the configuration information, and outputting the thus-selected signal to change-over condition code generation parts 260 through 263; the change-over condition code generation parts 260 through 263 which output unique change-over condition codes in response to the outputs from the switches 265 through 268; a selector with priority 264 (210) which gives priority to the thus-output change-over condition codes, carries out final selection and thus outputs the change-over condition code signal final; and an OR device 269 which receives the above-mentioned condition fulfillment signals and carries out OR operation thereon, and outputs the operation result as the above-mentioned pre-change-over condition generation notification signal 1.

Figure 38:
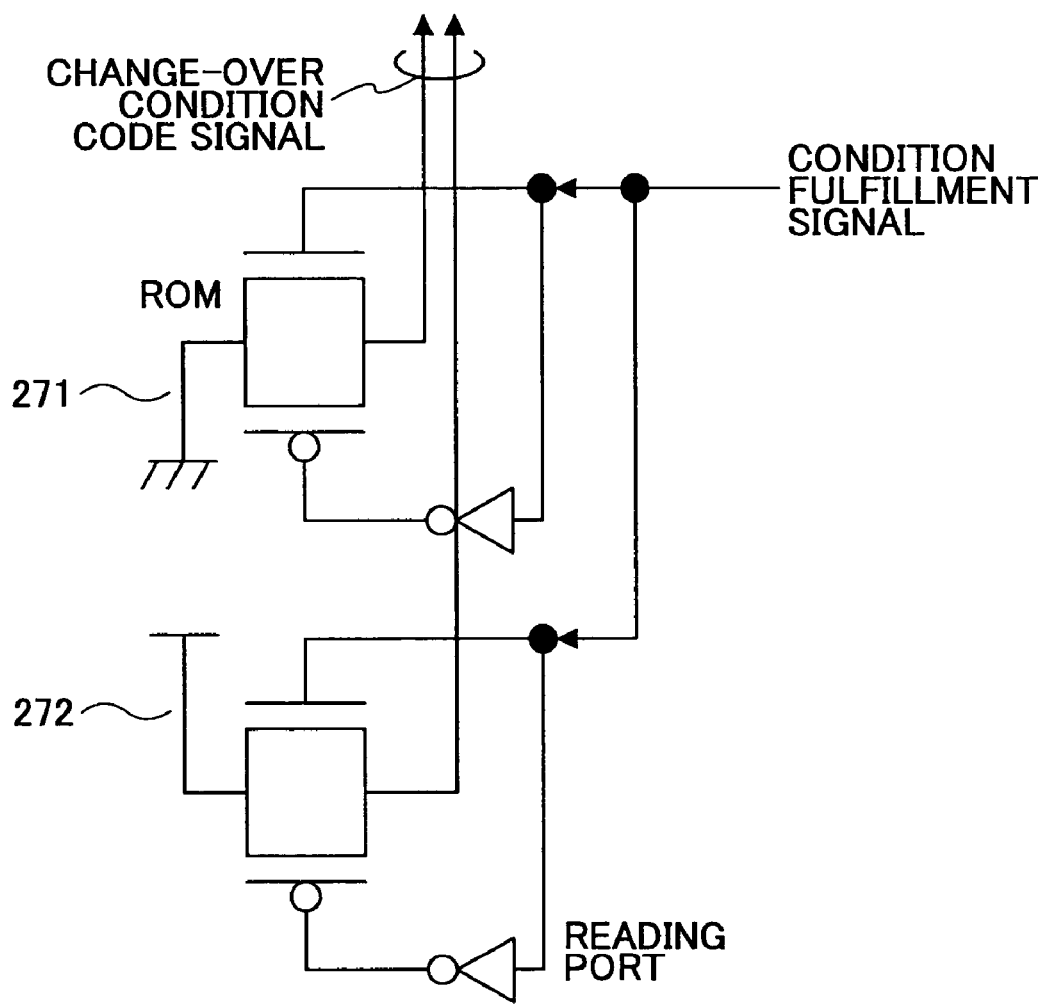

FIG. 38 shows a circuit diagram of each of the above-mentioned change-over condition code generation part. As shown, each change-over condition code generation part includes ROMs, and, upon reception of the condition fulfillment signal input thereto, the unique data is read out therefrom as the change-over condition code. In this example, the change-over condition code of two bits is output in response to the condition signal of four inputs, as shown in FIG. 37. However, other than this configuration, another configuration may be applied instead in which, in response to condition fulfillment signals of 5 through 8 inputs, the change-over condition code of 3 bits is generated. Further, a RAM-based configuration may be applied instead of the above-mentioned ROM-based configuration.

Figure 39:
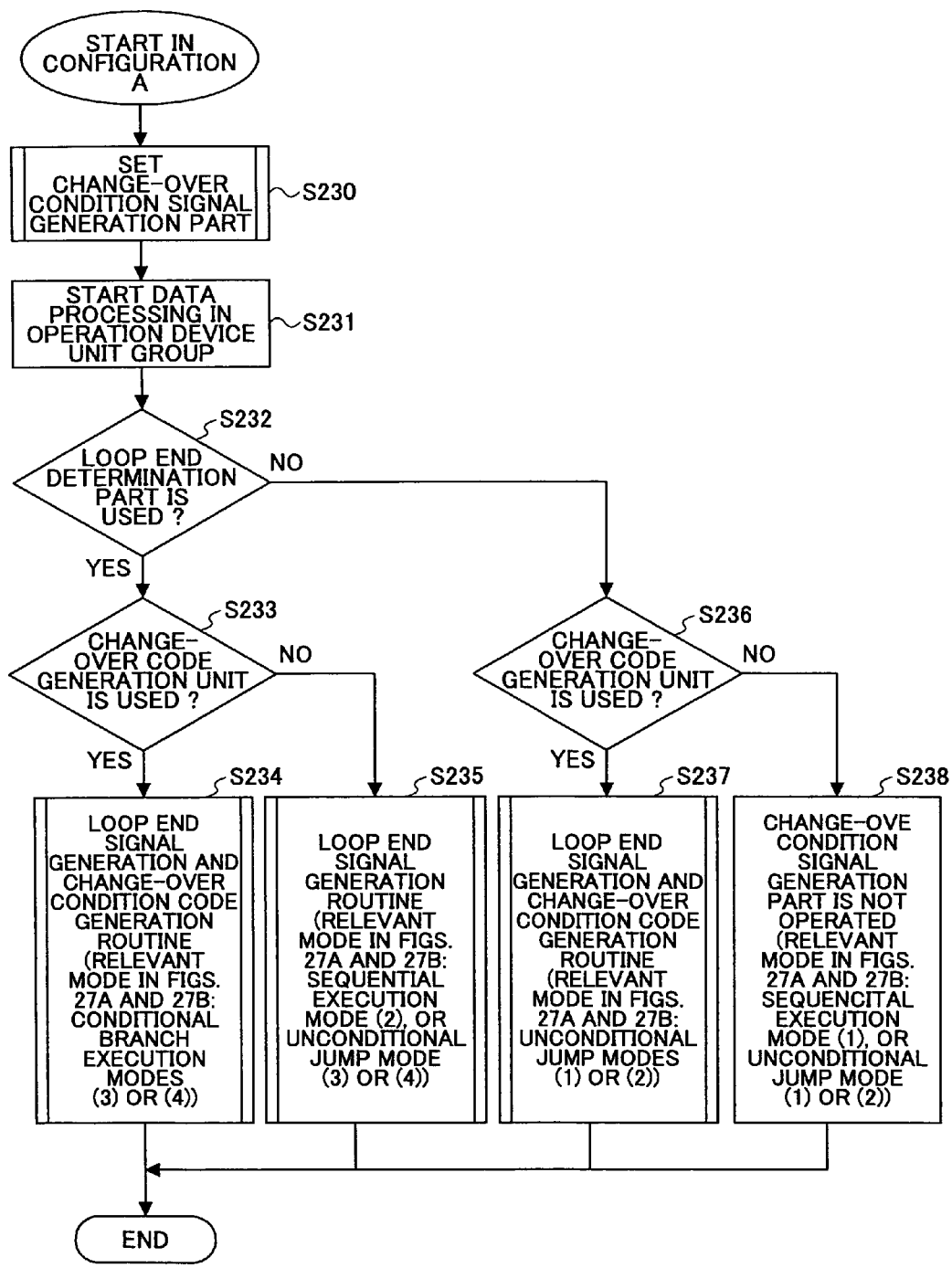
FIGS. 39 through 45 illustrate operation flow charts in the configurations shown in FIGS. 33 through 38.

Next, a flow of operation of the above-described change-over condition generation part 250 is described with reference to figures. In FIG. 39, the configuration information is applied to set a state of the change-over condition generation part 250 in Step S230. In Step S231, when operation of the operation device unit group 230 starts, it is determined in Step S232 whether or not the above-mentioned loop end determination part 250A should be applied. When the result is Yes, Step S233 is carried out, and thus, it is determined whether or not the above-mentioned change-over condition code generation unit 250B should be applied. When the result is Yes, processing of generating the loop end signal and the change-over condition generation signal is carried out in Step S234, as will be described later. This processing corresponds to the conditional branch execution mode (3) or (4) shown in FIGS. 27A and 27B.

When the result of Step S233 is No, Step S235 is carried out, and thus, processing of generating the loop end signal is carried out as will be described later. This processing corresponds to the sequential execution mode (2) or the unconditional jump mode (3) or (4) shown in FIGS. 27A and 27B. Further, when the result of Step S232 is No, Step S236 is carried out, and thus, it is determined whether or not the change-over condition code generation unit 250B should be applied. When the result is Yes, Step S237 is carried out, and thus, processing of generating the loop end signal and the change-over condition generation signal is carried out, as will be described later. This processing corresponds to the unconditional jump mode (1) or (2) shown in FIGS. 27A and 27B. Then, when the result of Step S236 is No, Step S238 is carried out, and thus, processing of not operating the change-over condition generation part 250 is carried out. This processing corresponds to the sequential execution mode (1) or the unconditional jump mode (1) or (2) shown in FIGS. 27A and 27B.

Figure 40:
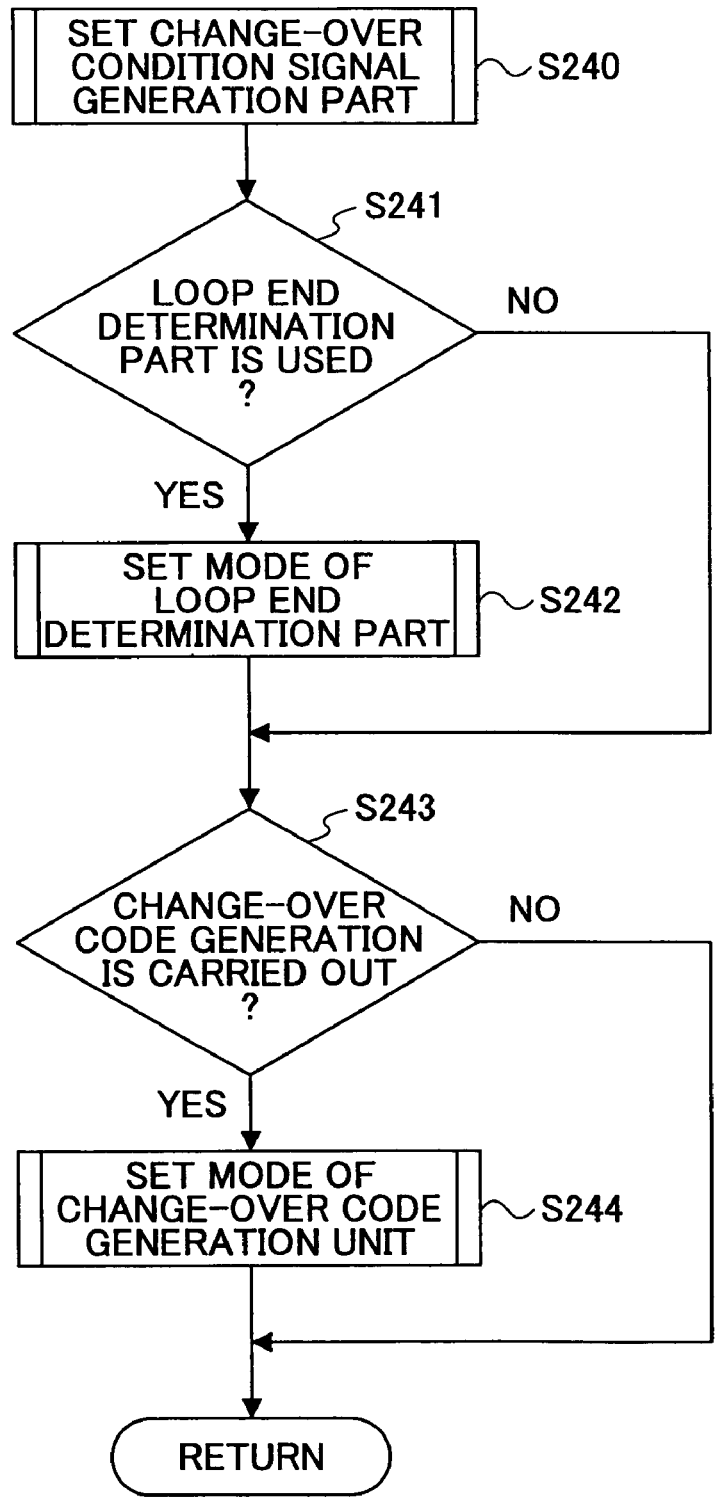

FIG. 40 shows setting operation for the change-over condition generation part 250 by means of the configuration information. In Step S241, based on the configuration information set, it is determined whether or not the loop end determination part 250A should be applied. When the result is Yes, mode setting of the loop end determination part 250A is carried out in Step 243. That is, setting of the expected number of times of looping operations, setting of the loop end offset value or such shown in FIG. 36 is carried out. In Step S243, it is determined whether or not the change-over condition code generation unit should carry out generation of the change-over condition code. When the result is Yes, mode setting of the change-over condition code generation unit is carried out in Step S244. That is, setting operation in Steps S265 through S268 shown in FIG. 37 is carried out.

Figure 41:
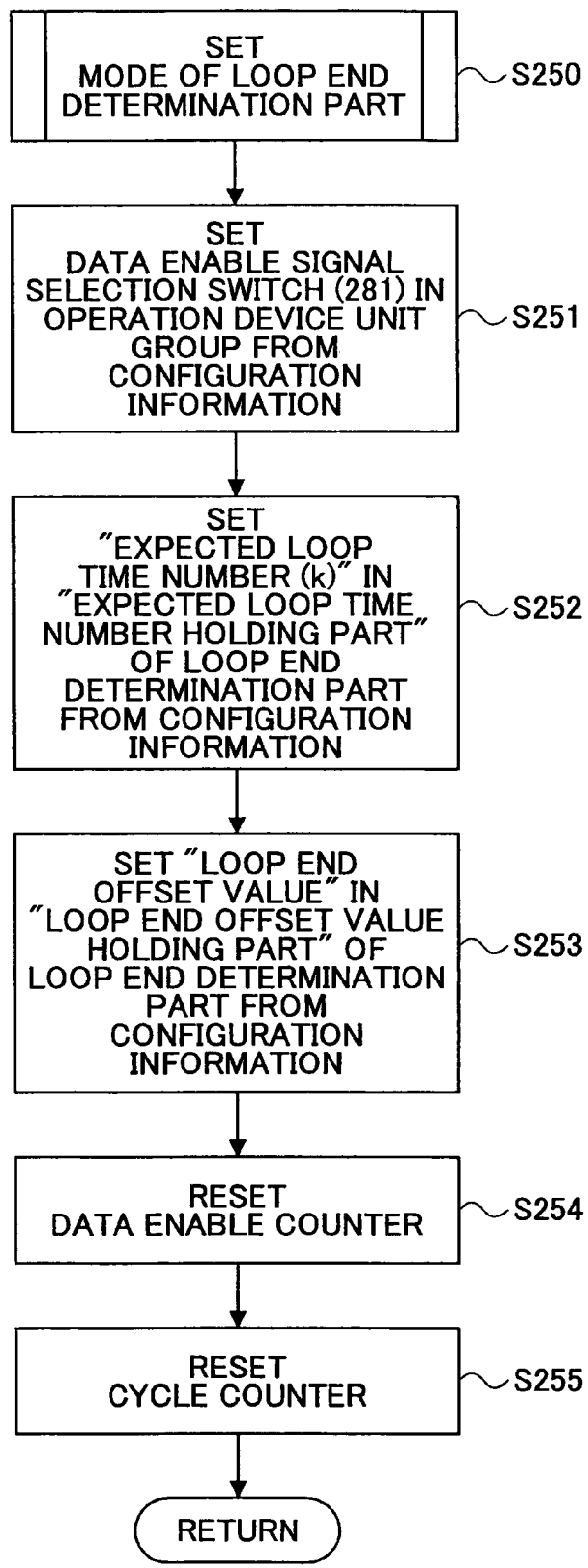

FIG. 41 shows details of the mode setting for the loop end determination part in Step S242. In Step S251, the configuration information is applied to set the above-mentioned data enable signal selection switch 281; the above-mentioned expected number of times of looping operations is carried out in Step S252; setting of the loop end offset value is carried out in Step S253; resetting of the data enable counter 251 is carried out in Step S254; and resetting of the cycle counter 254 is carried out in Step S255.

Figure 42:
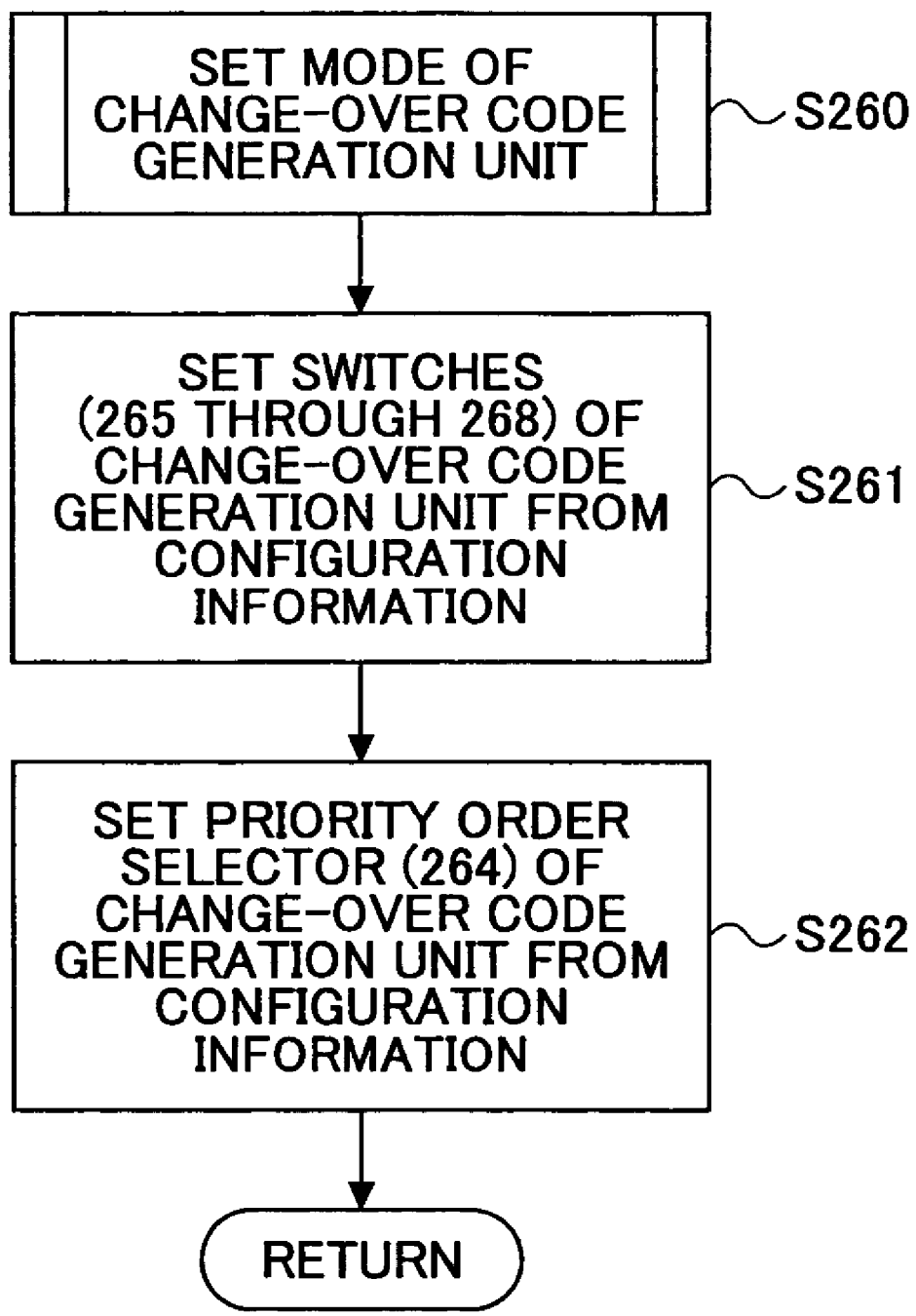

As shown in FIG. 42, setting of the change-over condition code generation unit includes setting of the above-mentioned switches 265 through 268 in Step S261; and setting of the above-mentioned selector with priority 264 in Step S262.

Figure 43:
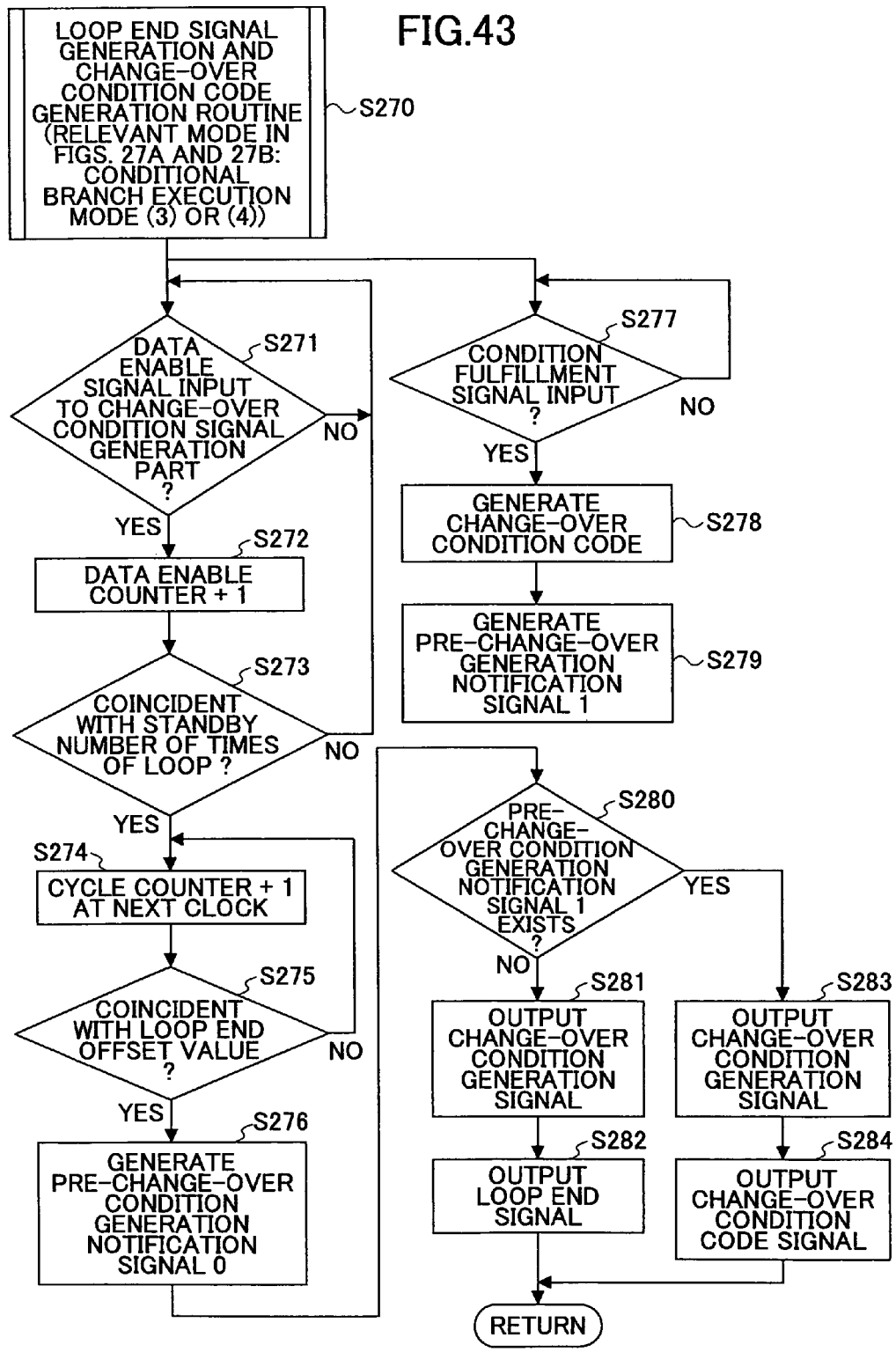

FIG. 43 shows details of the above-mentioned loop end signal generation and change-over condition code generation in the change-over condition generation part 250. As shown, in Step S271, it is determined whether or not the data enable signal is input to the change-over condition code generation unit. When the result is that the signal is input, the data enable counter 251 is incremented by one in Step S272, and the count value is compared with the expected number of times of looping operations in Step S273. When the comparison result is a 'coincidence', the cycle counter 254 is incremented by one at the subsequent clock timing in Step S274. Then when the count value thus incremented coincides with the loop end offset value (Yes in Step S275), the above-mentioned pre-change-over condition generation notification signal 0 is generated in Step S276.

After that, it is determined in Step S280 whether or not the pre-change-over condition generation notification signal 1 is generated. When it is determined that this signal 1 is generated, the change-over condition generation signal is generated in Step S283. Then, in Step S284, the change-over condition code signal generated by the change-over condition code generation unit 250B is output from the change-over condition generation part 250. When the result of Step S280 is No, the change-over condition generation signal is output in Step S281, and the loop end signal is output in Step S282.

In Step S277, the change-over condition code generation unit 250B determines whether or not the condition fulfillment signal is input. When the result is Yes, the change-over condition code is generated in Step S278, and, the above-mentioned pre-change-over condition generated notification signal 1 is generated.

Figure 44:
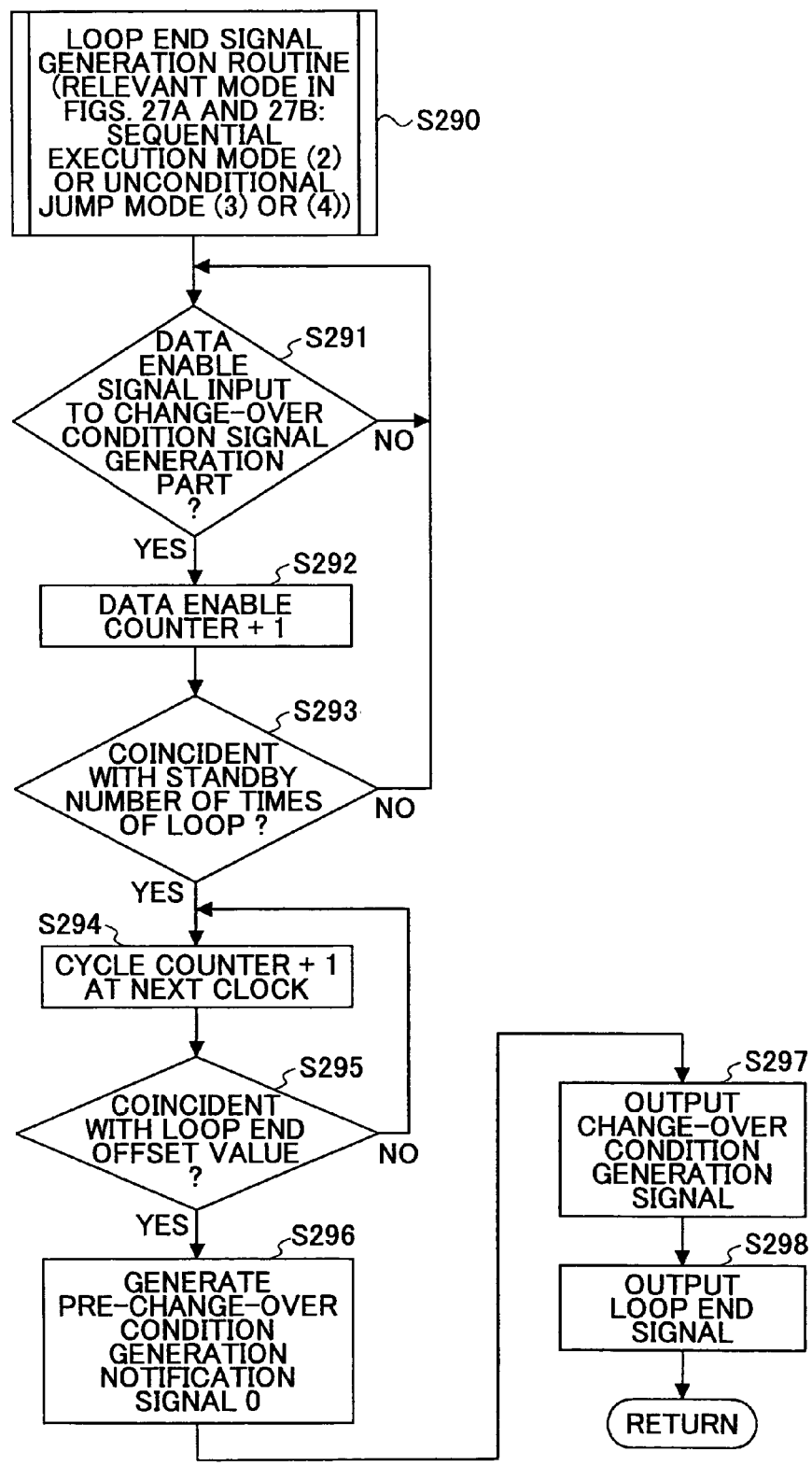

FIG. 44 shows loop end signal generation processing. In Step S291, it is determined whether or not the data enable signal is input to the change-over condition code generation unit. When the result is that the signal is input, the data enable counter 251 is incremented by one in Step S292. Then, this count value is compared with the expected number of times of looping operations in Step S293. Then, when the comparison result is a 'coincident', the cycle counter 254 is incremented by one at the subsequent clock timing in Step S294. When this count value coincides with the loop end offset value (Yes in Step S295), the above-mentioned change-over condition generation notification signal 0 is generated in Step S296. Then, in Step S297, the change-over condition generation signal is output, and, in Step S298, the loop end signal is output.

Figure 45:
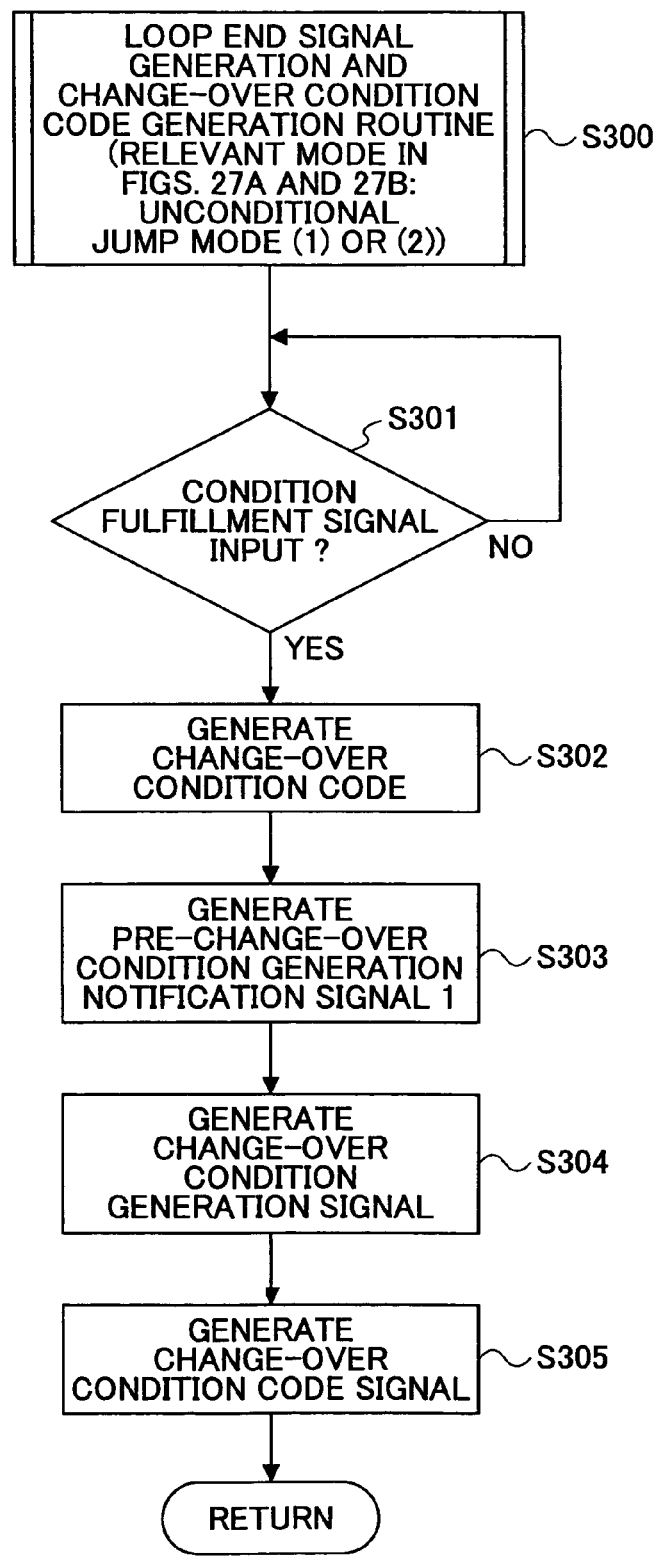

FIG. 45 shows generation of the loop end signal and the change-over condition code. In Step S301, when the condition fulfillment signal is input, the change-over condition code is generated in Step S302. Then, in Step S303, the pre-change-over condition generation notification signal 1 is generated; in Step S304, the change-over condition generation signal is output; and, in Step S305, the change-over condition code signal is output.

Figure 46B:
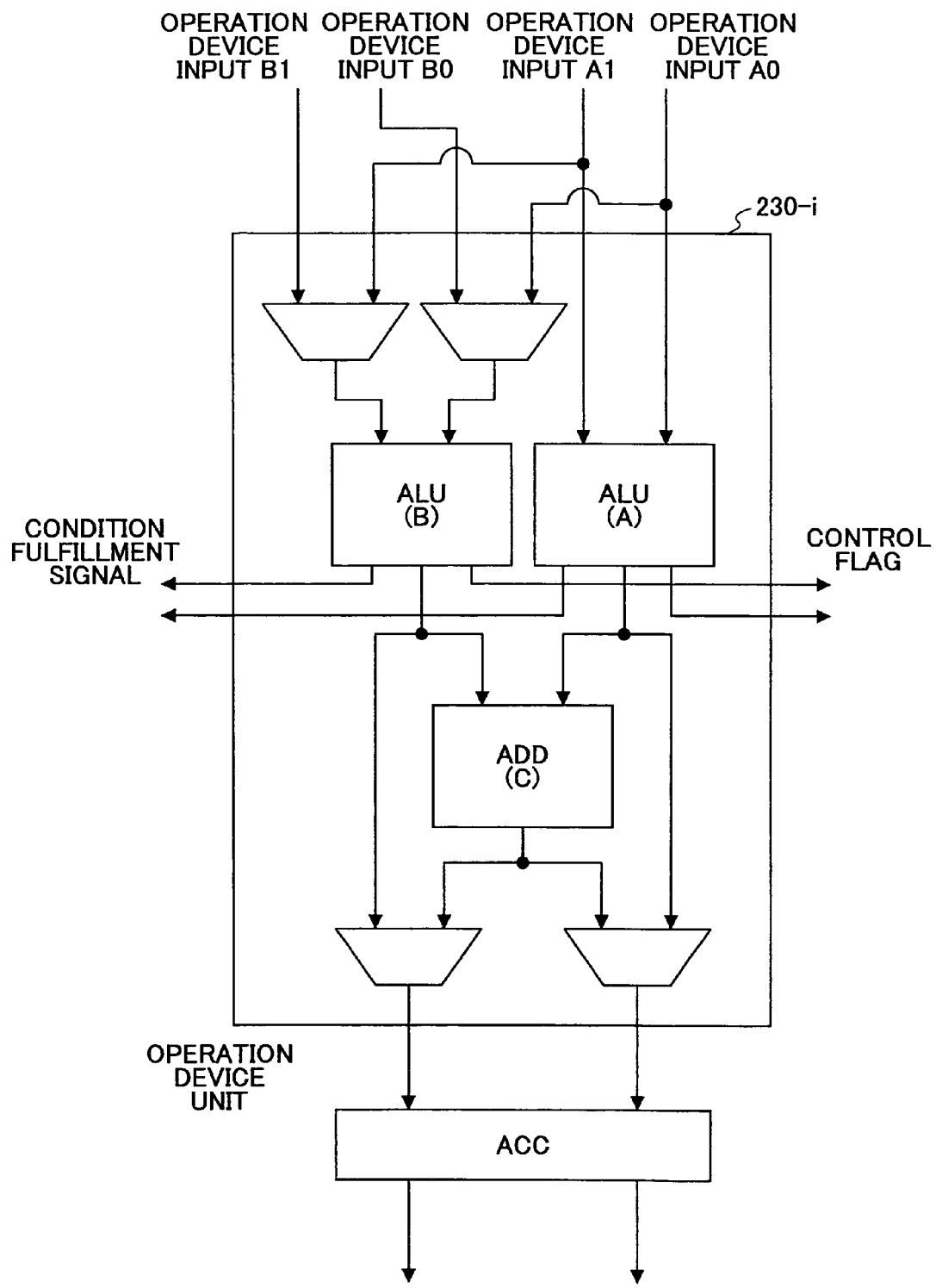

With reference to FIGS. 46A, 46B, 47A and 47B, an example of the above-mentioned configuration information applicable to each embodiment of the present invention is described next. FIG. 46A shows an example of the configuration information for setting a state of the operation device unit 230-$i$ having a circuit configuration such as that shown in FIG. 46B. In FIG. 46A, an item 'OPERATION MODE' indicates instruction contents for setting a state of an operation device A (ALU(A)) shown in FIG. 46B, is made of 4 bits of data, and indicates instructions, as will be mentioned. That is, for example, 0000 of this item indicates that the relevant operation device should not operate; 0001 indicates that the operation device should function as an adder; 0010 indicates that the operation device should function as a subractor; 0011 indicates that the operation device should function as a comparator; 0100 indicates that the operation device should compare a given value with an immediate value; 0101 indicates that the operation device should function as a MUL; . . . , 1000 indicates that the operation device should carry out a conditional adding function, . . . .

A next item 'OPERATION MODE B' indicates how to set a state of the operation device B (ALU(B)) in the same manner as that of the first item 'OPERATION MODE A' mentioned above. A further next item 'OPERATION MODE C' also indicates how to set a state of the operation device C (ALU(C)). However, this item has 1 bit, and, specifically, '0' indicates that this operation device should not operate; and '1' indicates that this operation devise unit should carry out adding operation. A next item 'INPUT SELECTION INFORMATION' has 1 bit. Specifically, '0' thereof indicates that an input to the above-mentioned operation devices A and B should be carried out separately. '1' thereof indicates that an operation result of the operation device A should be then input to each of the operation devices A and B.

A next item 'OUTPUT SELECTION INFORMATION' has 1 bit. '0' indicates that operation results of the operation devices A and B should be output separately. '1' indicates that operation result of the operation device C should be output. A next item 'ACC MODE' indicates a mode of an accumulator (ACC in FIG. 46B) and has 1 bit. '0' indicates the accumulator should not be used. '1' indicates that the same should be used.

'IMMEDIATE VALUE A' is immediate input data (16 bits) for the operation device A; and 'IMMEDIATE VALUE B' is immediate input data (16 bits) for the operation device B. 'CONTROL INFORMATION' indicates a control flag mode, and has 2 bits. '00' indicates that this flag should not be used; '01' indicates that it should function as a 'carry'; and '10' indicates that it should function as a 'predicate'.

Figure 47A:
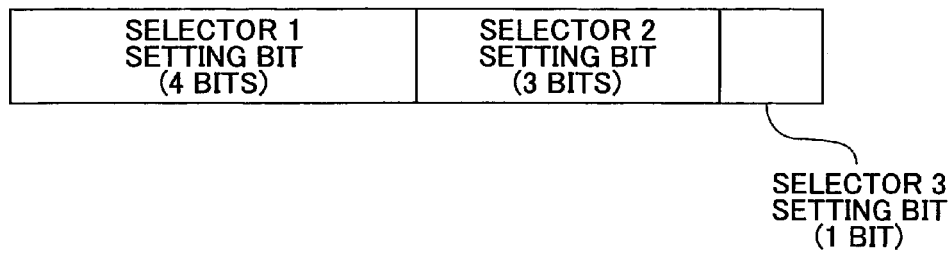
Figure 47B:
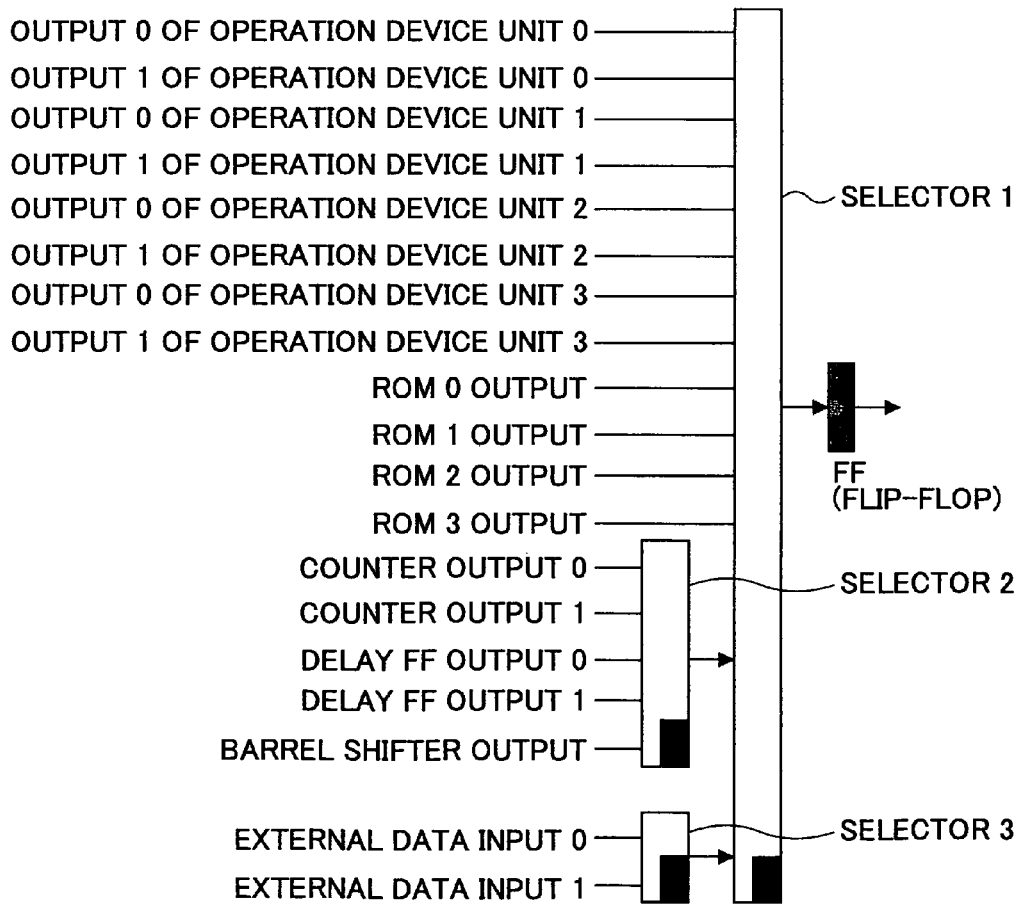

FIGS. 47A and 47B show an example of the configuration information for setting a select switch (or a selector, shown in FIG. 47B as an example) included in the above-mentioned inter operation device unit connection network 220. In FIG. 47A, 'SELECTOR 1 SETTING BIT' (4 BITS), 'SELECTOR 2 SETTING BIT' (3 BITS) and 'SELECTOR 3 SETTING BIT' (1 BIT) are the configuration information held in a configuration holding part (shown as a solid rectangle) of each of selectors 1, 2 and 3 shown in FIG. 47B. Such selector setting configuration information has a data format such that it has 1 bit of information for a two-input selector; 2 bits of information for a three or four-input selector; or 4 bits of information for a 16-input selector, for example.

Thus, according to the present invention, the operation apparatus is configured to include the state table 120 made of a simple single port memory (RAM or ROM) and storing the opcodes and the jump address offset values; and the transition destination address generation part 130 which carries out operation processing on the information of the state table 120 as well as the change-over condition signal or such sent from the operation device unit group 230 in a feedback manner. As a result, it is possible to effectively reduce the chip area required for accommodating the entire apparatus since a CAM or such a large-seized storage device is not applied.

Further, since it is possible to previously calculate branch destination candidates, access latency of the memory configuring the state table is virtually hidden, and thus, processing efficiency can be improved. That is, as described above, the change-over condition signal (the change-over condition generation signal, the change-over condition code signal, the loop end signal or such) is generated from logical operation mainly by means of the change-over signal generation part 250 in consideration of additional conditions set by the configuration information. On the other hand, the opcodes registered in the state table 120 are applied to determine a specific manner as to how to apply the thus-generated change-over condition signal (including as to whether or not this signal is actually applied), and, according to the thus-determined manner, the subsequent transition destination address to be supplied to the configuration memory 210 is determined by means of logical operation carried out by the transition destination address generation part 130. Accordingly, before a time at which the change-over condition signal is actually applied, that is, until a time is reached at which the state transition (including branch (address jump)) is actually applied in the operation device unit group 230 according to the change-over condition signal, operation processing relating to the generation of the change-over condition signal is previously carried out by means of the change-over condition signal generation part 250 and/or the transition destination address generation part 130. As a result, rapid state transition is achieved at a time of actual application of the change-over condition signal, and thus, it is possible to effectively achieve a smooth progress of operation processing carried out by the operation device unit group 230.

Further, the present invention is not limited to the above-described embodiments, and variations and modifications may be made without departing from the basic concept of the present invention claimed below.

The present application is based on Japanese Priority Application No. 2004-194798 filed on Jun. 30, 2004, the entire contents of which are hereby incorporated herein by reference.

What is claimed is:

1. An operation apparatus comprising:
  a plurality of operation device units;
  a configuration memory storing setting information provided for setting each predetermined state of the plurality of operation device units; and
  a sequencer controlling the plurality of operation device units by outputting transition destination addresses designating relevant information from configuration information stored in said configuration memory,
  wherein the sequencer carries out an operation based on task information previously loaded and a change-over condition signal output from the plurality of operation device units, and generates the transition destination address to the configuration memory based on the operation according to the change-over condition signal output from the plurality of operation device units,
  wherein the sequencer is configured to control the states of the plurality of operation devices units in a manner such that operation processing contents carried out by the plurality of operation device units are controlled and the plurality of operation device units are reconfigurable;
  wherein the sequencer comprises a state table having the current transition destination address of the configuration memory input thereto, and outputting an operation code for determining a predetermined transition destination address generating method and outputting a jump offset value depending on the contents of the operation code;
  wherein a transition destination address generating part determining the transition destination address to be subsequently applied, by means of operation based on the operation code, the jump offset value from said state table as well as the change-over condition signal; and
  wherein the operation code determining the predetermined transition destination address generating method designates any one of a sequential mode for adding 1 to a predetermined address value, an unconditional jump mode for changing an address unconditionally by a relevant jump offset value, and a conditional branch execution mode for changing the address by the jump offset value when receiving the change-over condition signal or simply adding one to the predetermined address value when not receiving the change-over condition signal.

2. The operation apparatus as claimed in claim 1, comprising a change-over condition signal generating part generating the change-over condition signal to the sequencer when a predetermined branch condition is detected as a result of operation of the plurality of operation device units.

3. The operation apparatus as claimed in claim 2, wherein:
  said change-over condition signal generating part is provided inside of the plurality of operation device units.

4. The operation apparatus as claimed in claim 1, wherein:
  a part is provided to externally input, to the configuration memory, the setting information provided for setting each state of the plurality of operation device units.

5. The operation apparatus as claimed in claim 1, wherein:
  the change-over condition signal output to the sequencer comprises a change-over condition code indicating the contents of a predetermined change-over condition generated from the inside of the plurality of operation device units, and a change-over condition generation signal indicating at timing of actually applying the change-over condition.

6. The operation apparatus as claimed in claim 1, comprising:
  a network part switching electric connection among the plurality of operation device units according to information designated by the transition destination address from the configuration information.

7. The operation apparatus as claimed in claim 1, wherein:
  said state table comprises a RAM or a ROM.

8. The operation apparatus as claimed in claim 1, wherein:
  a mode is provided for generating the transition destination address by adding the jump offset value to a jump register value determined by the plurality of operation device units.

9. The operation apparatus as claimed in claim 1, wherein:
  the jump offset value stored in the state table indicates an offset value with respect to a value set in a predetermined base address register.

10. An operation apparatus control method for controlling an operation apparatus which comprises a plurality of operation device units; a configuration memory storing setting information provided for setting each predetermined state of the plurality of operation device units; and a sequencer controlling the plurality of operation device units by outputting transition destination addresses designating relevant information from configuration information stored in said configuration memory, comprising, carried out by the sequencer:
  a) carrying out operation based on task information previously loaded and a change-over condition signal output from the plurality of operation device units; and b) generating the transition destination address to the configuration memory based on the operation according to the change-over condition signal output from the plurality of operation device unit, responding to the current transition destination address of the configuration memory for outputting an operation code for determining a predetermined transition destination address generating method and outputting a jump offset value depending on the contents of the operation code, determining the subsequent transition destination address by means of operation based on the operation code, the jump offset value provided from said state table as well as the change-over condition signal, and determining the predetermined transition destination address generating method designates any one of a sequential mode for adding 1 to a predetermined address value; an unconditional jump mode for changing an address unconditionally by a relevant jump offset value; and a conditional branch mode for changing the address by the jump offset value when receiving the change-over condition signal or adding one to the predetermined address value when not receiving the change-over condition signal; and wherein the sequencer is configured to control the states of the plurality of operation devices units in a manner such that operation processing contents carried out by the plurality of operation device units are controlled and the plurality of operation device units are reconfigurable.

11. The operation apparatus control method as claimed in claim 10, comprising:
   c) generating the change-over condition signal to the sequencer when a predetermined branch condition is detected as a result of operation of the plurality of operation device units.

12. The operation apparatus control method as claimed in claim 11, wherein:
   said step c) is carried out inside of the plurality of operation device units.

13. The operation apparatus control method as claimed in claim 10, comprising:
   c) inputting the setting information, provided for setting each state of the plurality of operation device units, to the configuration memory.

14. The operation apparatus control method as claimed in claim 10, wherein:
   the change-over condition signal output to the sequencer comprises a change-over condition code indicating the contents of a predetermined change-over condition generated from the inside of the plurality of operation device units, and a change-over condition generation signal indicating a timing of actually applying the change-over condition.

15. The operation apparatus control method as claimed in claim 10, further comprising:
   c) switching electric connection among the plurality of operation device units according to information designated by the transition destination address from the configuration information.

16. The operation apparatus control method as claimed in claim 10, further comprising:
   c) generating the transition destination address by adding the jump offset value to a jump register value determined by the plurality of operation device units.

17. The operation apparatus control method as claimed in claim 10, wherein:
   the jump offset value stored in the state table indicates an offset value with respect to a value set in a predetermined base address register.

* * * * *